(12) United States Patent
Jelken et al.

(10) Patent No.: US 11,397,884 B2
(45) Date of Patent: Jul. 26, 2022

(54) BRACKETS FOR AMPLIFYING ANTENNA GAIN ASSOCIATED WITH MOUNTABLE RFID TAGS

(71) Applicant: Fisher Controls International LLC, Marshalltown, IA (US)

(72) Inventors: Shannon Eugene Jelken, Marshalltown, IA (US); Kenneth William Junk, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 46 days.

(21) Appl. No.: 16/827,234

(22) Filed: Mar. 23, 2020

(65) Prior Publication Data
US 2021/0295128 A1    Sep. 23, 2021

(51) Int. Cl.
*G06K 19/077*    (2006.01)
*G06K 19/07*    (2006.01)

(52) U.S. Cl.
CPC ... *G06K 19/07745* (2013.01); *G06K 19/0723* (2013.01); *G06K 19/07773* (2013.01)

(58) Field of Classification Search
CPC .............................................. G06K 19/07745
See application file for complete search history.

(56) References Cited

U.S. PATENT DOCUMENTS

| 7,156,301 | B1 | 1/2007 | Bonalle et al. |
| 7,434,734 | B2 | 10/2008 | Huber |
| 8,608,086 | B1 | 12/2013 | Mizzo et al. |
| 9,361,570 | B2 | 6/2016 | Nitta |
| 9,918,537 | B2 | 3/2018 | Warther |
| 10,366,319 | B2 | 7/2019 | Junk et al. |
| 2002/0170213 | A1 | 11/2002 | Latschbacher et al. |
| 2006/0192677 | A1 | 8/2006 | Huber |

(Continued)

FOREIGN PATENT DOCUMENTS

WO    2019147246    8/2019

OTHER PUBLICATIONS

International Searching Authority, "International Search Report and Written Opinion," issued in connection with International Patent Application No. PCT/US2021/019205, dated Jun. 8, 2021, 14 pages.

(Continued)

*Primary Examiner* — Rafferty D Kelly
(74) *Attorney, Agent, or Firm* — Hanley, Flight & Zimmerman, LLC

(57) ABSTRACT

Brackets for amplifying antenna gain associated with mountable radio frequency identification (RFID) tags are disclosed. An example apparatus includes a bracket and an RFID tag. The bracket has a base, a first meandering amplification arm connected to and extending away from the base in a first direction, and a second meandering amplification arm connected to and extending away from the base in a second direction opposite the first direction. The RFID tag is mounted to the base of the bracket. The first meandering amplification arm and the second meandering amplification arm are respectively structured to at least one of: amplify an antenna gain associated with the RFID tag; or increase a communication range associated with the RFID tag.

30 Claims, 36 Drawing Sheets

(56) References Cited

U.S. PATENT DOCUMENTS

| | | |
|---|---|---|
| 2010/0140427 A1 | 6/2010 | Myers |
| 2010/0315545 A1 | 12/2010 | Tamura |
| 2012/0248283 A1 | 10/2012 | Chen |
| 2014/0021265 A1 | 1/2014 | Kai et al. |
| 2014/0240097 A1 | 8/2014 | Karani et al. |
| 2014/0361090 A1 | 12/2014 | Baba |
| 2016/0343175 A1 | 11/2016 | Nyalamadugu et al. |
| 2017/0236047 A1 | 8/2017 | Hansen |
| 2017/0256927 A1 | 9/2017 | Padilla et al. |
| 2018/0006378 A1* | 1/2018 | Abe .................. H01Q 1/24 |
| 2018/0075268 A1* | 3/2018 | Jun ................ G06K 7/10356 |
| 2018/0293481 A1* | 10/2018 | Zheng ................ G06K 19/04 |
| 2019/0065923 A1* | 2/2019 | Junk ................ F16M 13/02 |

OTHER PUBLICATIONS

HID Global, "IronTag Datasheet," [https://www.hidglobal.com/sites/detault/files/resource_files/hid-rfid-il-iron-tag-ds-en.pdf], retrieved on Aug. 30, 2017, dated Mar. 28, 2017, 2 pages.

HID Global White Paper, "HID Global Industrial RFID & BLE Tags: What to Use When," HID Global Corporation/ASSA ABLOY AB, dated Jun. 20, 2017, 16 pages.

International Searching Authority, "International Search Report and Written Opinion," issued in connection with International Patent Application No. PCT/US2018/045769, dated Nov. 14, 2018, 11 pages.

* cited by examiner

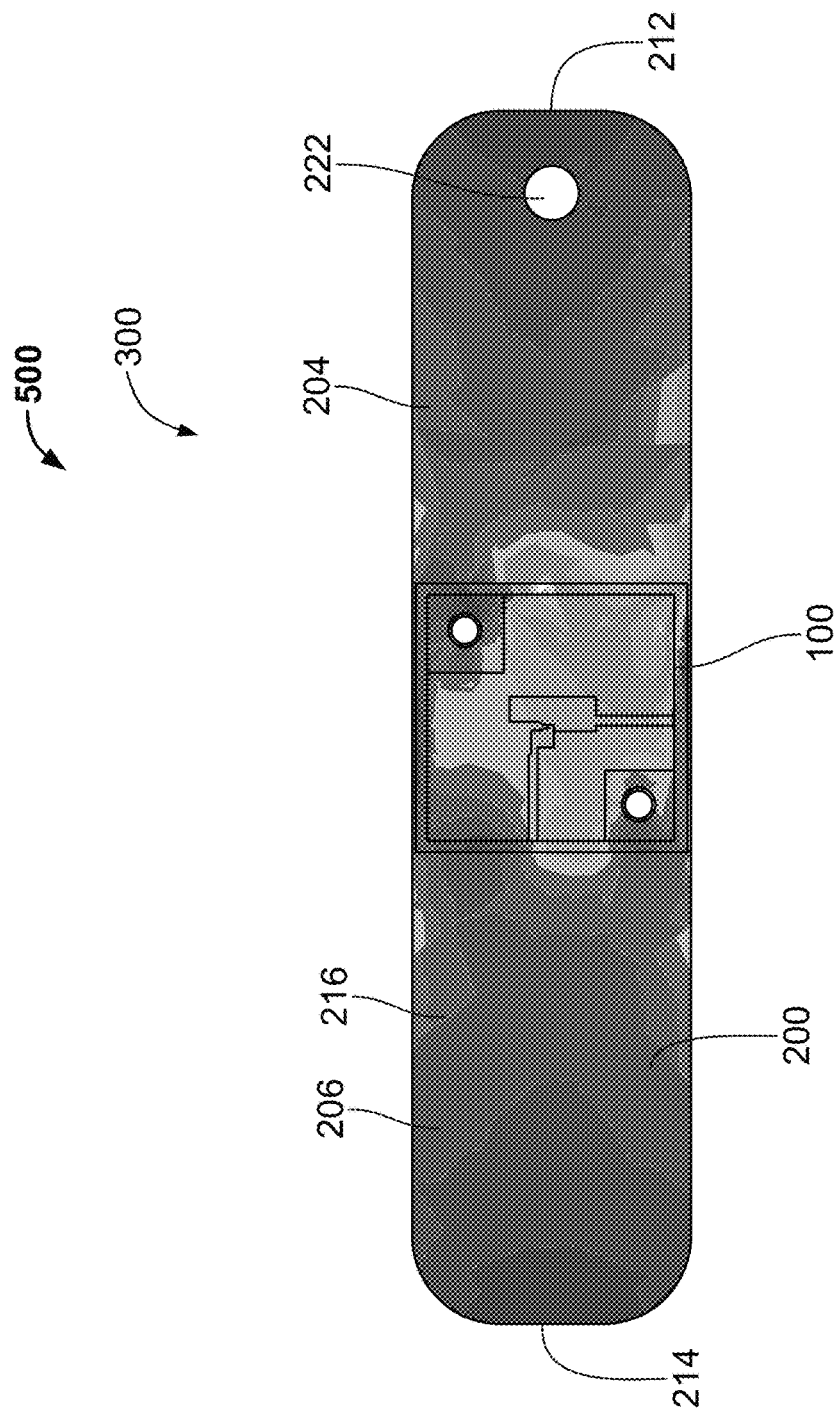
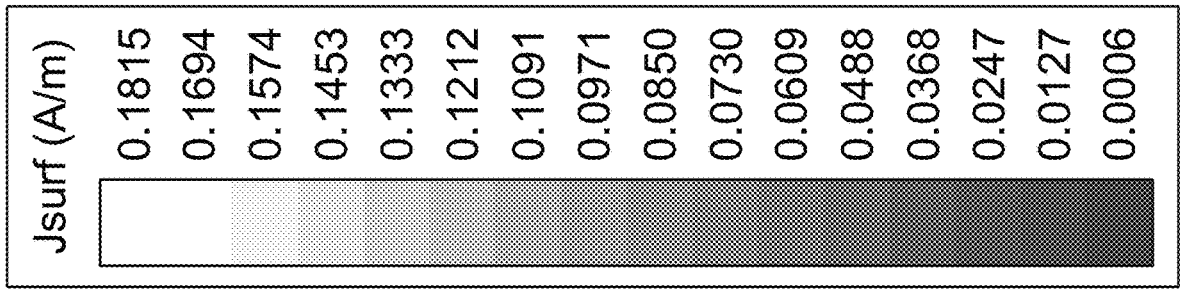
FIG. 5

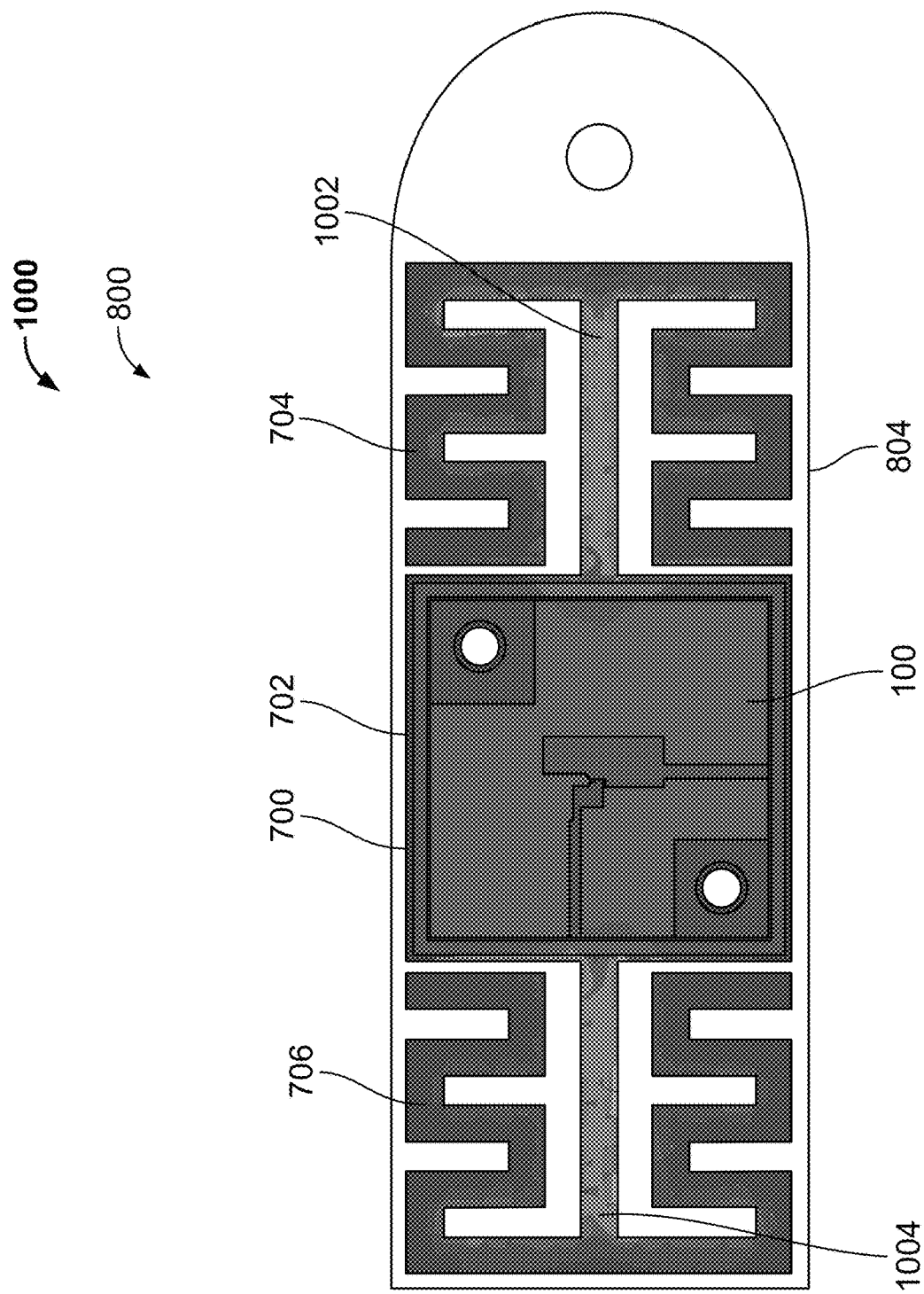
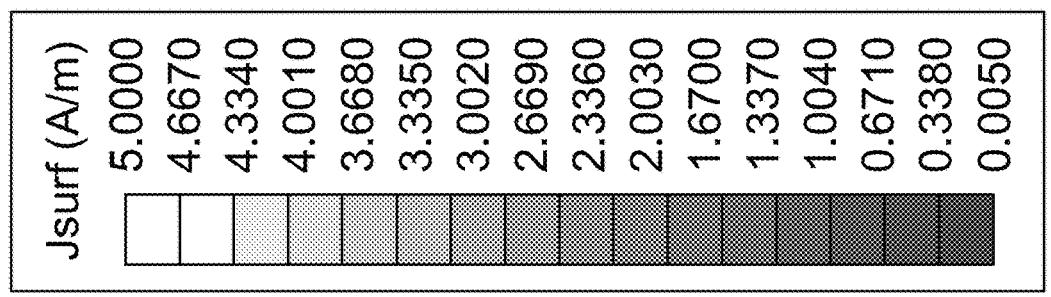
FIG. 10

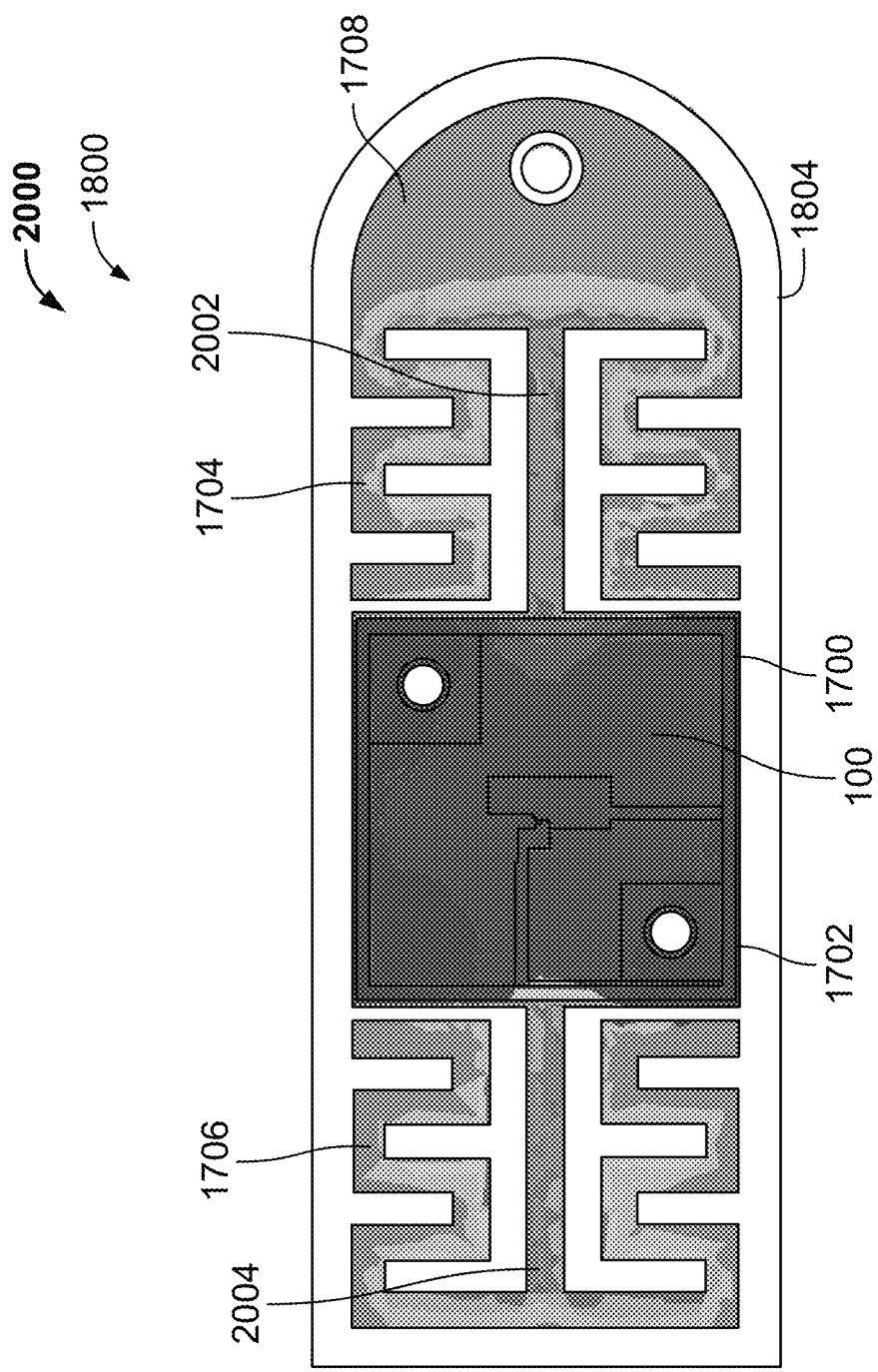
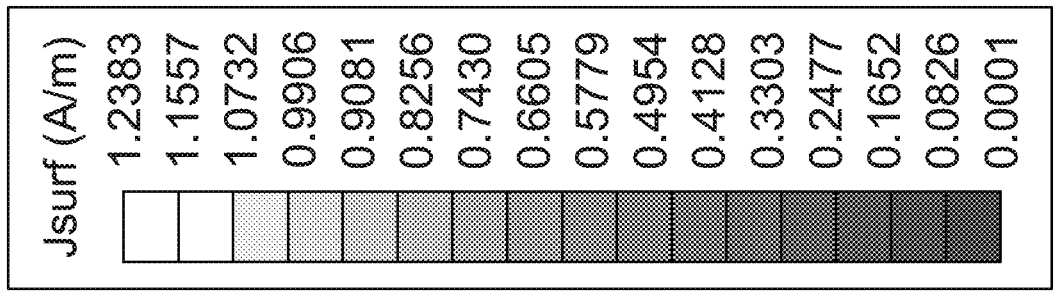
FIG. 20

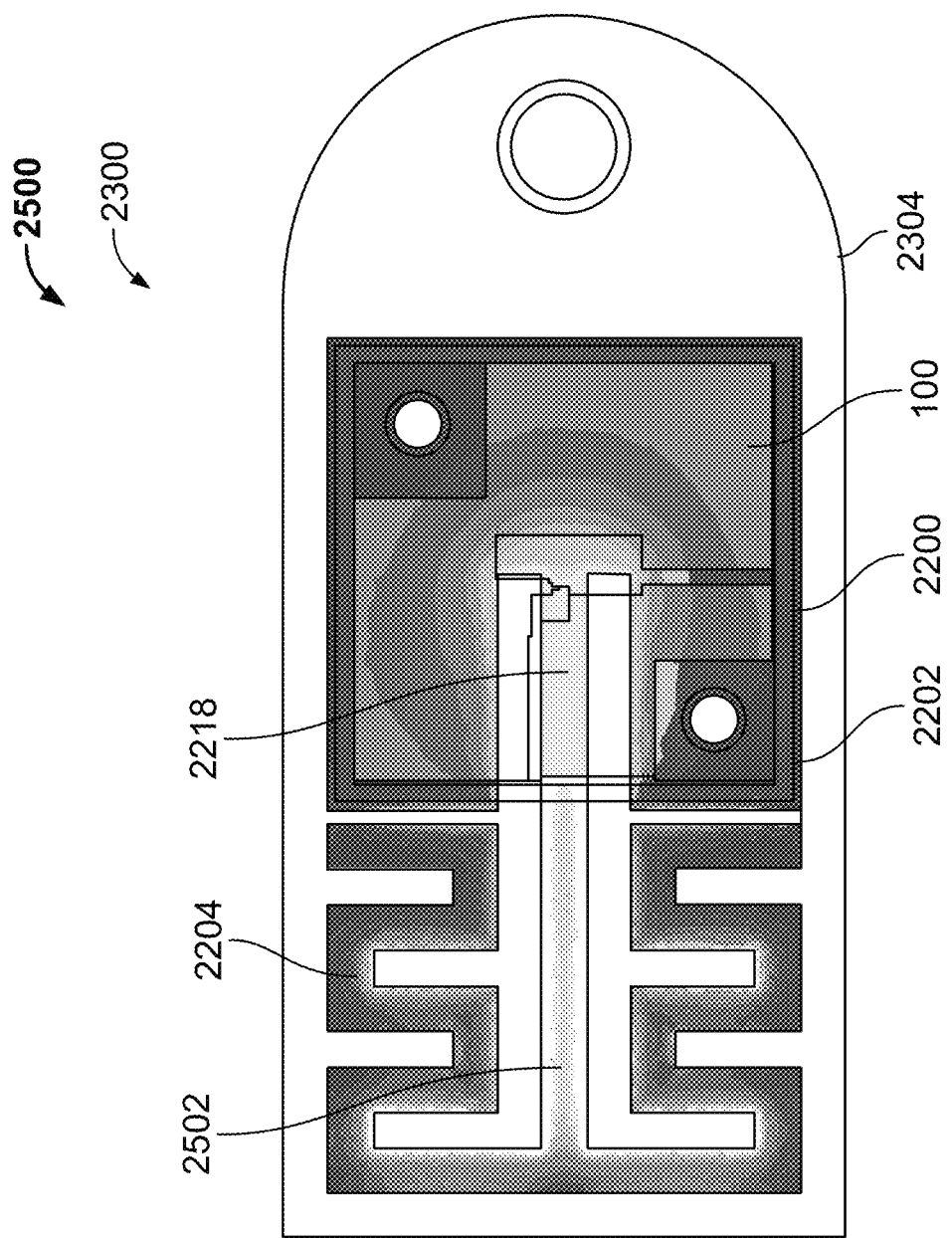
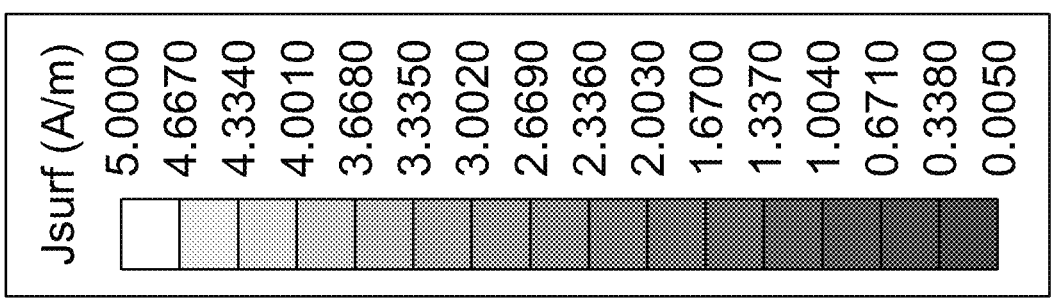
FIG. 25

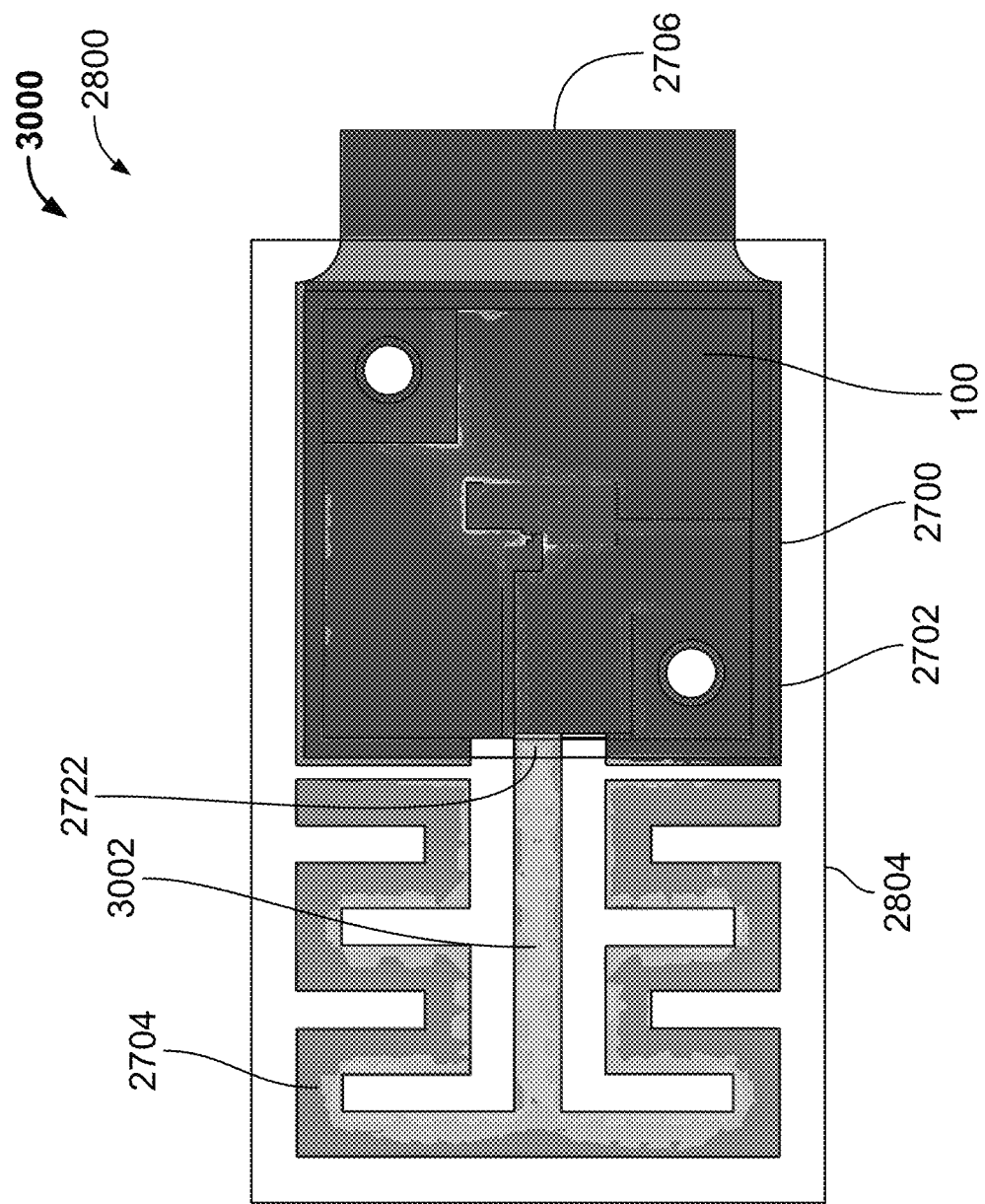
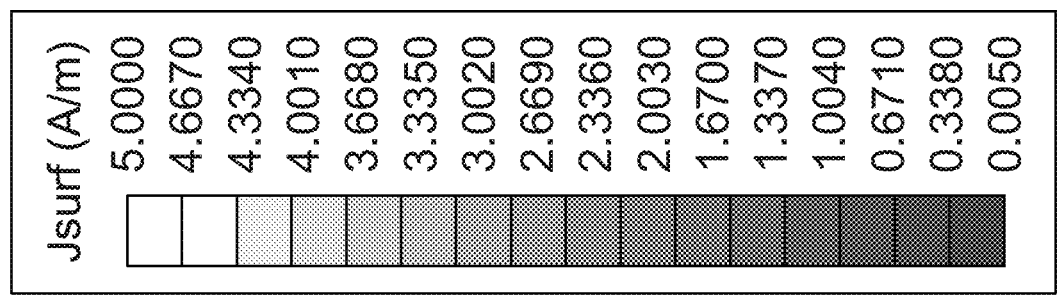
FIG. 30

BRACKETS FOR AMPLIFYING ANTENNA GAIN ASSOCIATED WITH MOUNTABLE RFID TAGS

FIELD OF THE DISCLOSURE

This disclosure relates generally to mountable radio frequency identification (RFID) tags and, more specifically, to brackets for amplifying antenna gain associated with mountable RFID tags.

BACKGROUND

RFID tags include radio frequency circuitry that enables data and/or information (e.g., identification information) stored on and/or stored in the RFID tag to be read by and/or otherwise communicated to a remotely-located RFID tag reader and/or interrogator to provide the identity and/or location of the RFID tag. In industrial process environments, RFID tags are commonly hung from and/or mounted to field devices and/or process equipment such that the identities and/or locations of such devices and/or equipment within the process environment may be remotely determined.

SUMMARY

Brackets for amplifying antenna gain associated with mountable RFID tags are disclosed herein. In some disclosed examples, an apparatus comprises a bracket and a radio frequency identification (RFID) tag. In some disclosed examples, the bracket includes a base, a first meandering amplification arm connected to and extending away from the base in a first direction, and a second meandering amplification arm connected to and extending away from the base in a second direction opposite the first direction. In some disclosed examples, the RFID tag is mounted to the base of the bracket. In some disclosed examples, the first meandering amplification arm and the second meandering amplification arm are respectively structured to at least one of: amplify an antenna gain associated with the RFID tag; or increase a communication range associated with the RFID tag.

In some disclosed examples, an apparatus comprises a bracket and a radio frequency identification (RFID) tag. In some disclosed examples, the bracket includes a base and a meandering amplification arm connected to and extending away from the base in a first direction. In some disclosed examples, the RFID tag is mounted to the base of the bracket. In some disclosed examples, the meandering amplification arm is structured to at least one of: amplify an antenna gain associated with the RFID tag; or increase a communication range associated with the RFID tag.

In some disclosed examples, an apparatus comprises a bracket and a radio frequency identification (RFID) tag. In some disclosed examples, the bracket includes a central portion, a first amplification arm connected to and extending away from the central portion in a first direction, and a second amplification arm connected to and extending away from the central portion in a second direction opposite the first direction. In some disclosed examples, the first amplification arm includes a through hole structured to receive a fastener to hang the bracket from an object. In some disclosed examples, the RFID tag is mounted to the central portion of the bracket. In some disclosed examples, the first amplification arm and the second amplification arm are respectively structured to at least one of: amplify an antenna gain associated with the RFID tag; or increase a communication range associated with the RFID tag.

BRIEF DESCRIPTION OF THE DRAWINGS

FIG. 5 is an example surface current density profile for the RFID hang tag of FIGS. 3 and 4.

FIG. 10 is an example surface current density profile for the RFID hang tag of FIGS. 8 and 9.

FIG. 20 is an example surface current density profile for the RFID hang tag of FIGS. 18 and 19.

FIG. 25 is an example surface current density profile for the RFID hang tag of FIGS. 23 and 24.

FIG. 30 is an example surface current density profile for the RFID mountable bracket of FIGS. 28 and 29.

Figure 1:
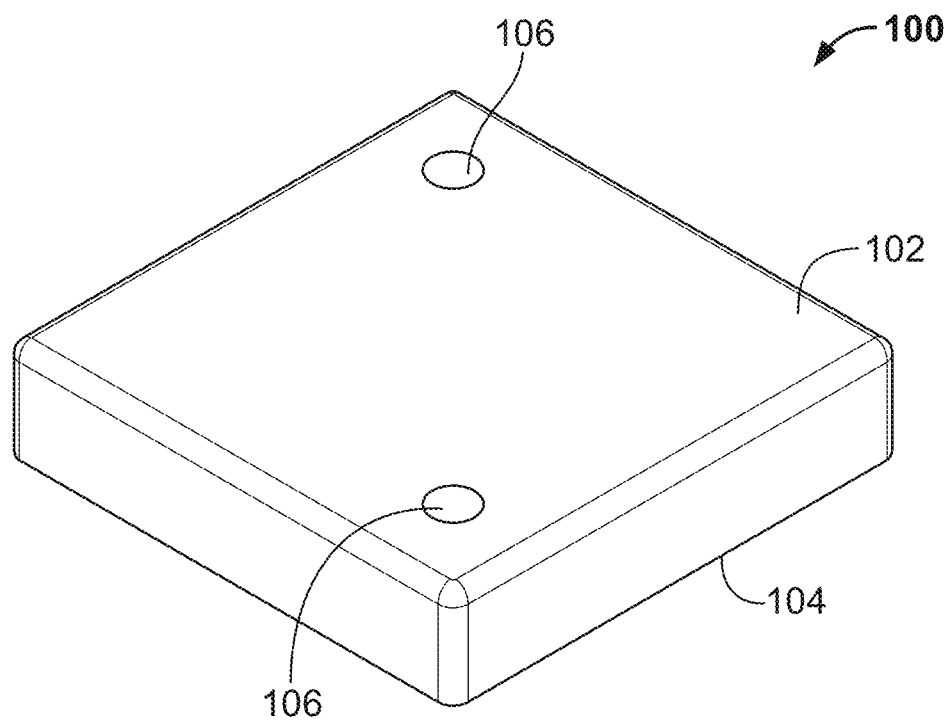
FIG. 1 is a perspective view of an example RFID tag constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In industrial process environments, RFID tags are commonly hung from and/or mounted to field devices and/or process equipment such that the identities and/or locations of such devices and/or equipment within the process environment may be remotely determined. In some instances, a field device or an item of process equipment to which an RFID tag is mounted may not be directly accessible, such as when the device or equipment is positioned in a restricted area, or when the device or equipment is blocked off by an obstacle. Attempting to directly access the field device or the item of process equipment in such instances may place workers at risk. Such risk may be reduced (e.g., eliminated) by increasing the communication range (e.g., the read range) associated with the RFID tag.

In isolation, known mountable RFID tags commonly have maximum antenna gains of −65 dBm or less, and maximum communication ranges (e.g., maximum read ranges) of five feet or less. When such known RFID tags are mounted to example brackets disclosed herein, the example brackets advantageously amplify the antenna gains associated with the RFID tags, and accordingly increase the maximum communication ranges (e.g., maximum read ranges) associated with the RFID tags. As used herein in connection with describing a gain associated with an antenna of an RFID tag, the term "amplify" and/or any derivative(s) thereof (e.g., "amplifies", "amplifying", etc.) means increasing the gain associated with the antenna of the RFID tag by coalescing an available electromagnetic field for more efficient power transmission by the RFID tag. In some examples, brackets disclosed herein can increase the maximum communication ranges (e.g., maximum read ranges) associated with the RFID tags to thirty feet or more. Example brackets disclosed herein accordingly enable an RFID tag reader and/or interrogator to determine, from a safely-positioned remote location, one or more of: (1) the identity and/or location of the RFID tag; (2) the identity and/or location an object (e.g., a field device) from which the bracket-mounted RFID tag is hung; and/or (3) the identity and/or location of an object (e.g., a field device) to which the bracket-mounted RFID tag is mounted.

FIG. 1 is a perspective view of an example RFID tag 100 constructed in accordance with the teachings of this disclosure. The RFID tag 100 of FIG. 1 includes an example front surface 102 and an example back surface 104 located opposite the front surface 102. In the illustrated example of FIG. 1, the front surface 102, the back surface 104, and/or, more generally, the RFID tag 100 has/have a rectangular shape. For example, as shown in FIG. 1, the RFID tag 100 has a length of approximately 31.0 millimeters, a width of approximately 31.0 millimeters, and a thickness of approximately 6.9 millimeters, where the length and width are the dimensions of the front surface 102 of the RFID tag 100 and the thickness is the dimension between the front surface 102 and the back surface 104 of the RFID tag 100. In other examples, the front surface 102, the back surface 104, and/or, more generally, the RFID tag 100 may have shapes and/or dimensions differing from those described above. For example, the front surface 102, the back surface 104, and/or, more generally, the RFID tag 100 may have a circular shape, an elliptical shape, a triangular shape, etc., or may have dimensions that are greater than or less than the dimensions described above.

In the illustrated example of FIG. 1, the RFID tag 100 also includes example through holes 106 passing from the front surface 102 of the RFID tag 100 through to the back surface 104 of the RFID tag 100. Respective ones of the through holes 106 are configured to receive a corresponding fastener to fasten, couple, and/or mount the RFID tag 100 to a bracket. The fastener(s) may include, for example, one or more screw(s), bolt(s), rivet(s), stud(s), boss(es), band(s), cable tie(s), etc. In the illustrated example of FIG. 1, the RFID tag 100 includes a total of two through holes 106, with the two through holes 106 being respectively located relative to one another at diagonally-opposed corners of the RFID tag 100. In other examples, the RFID tag 100 may include a different number of through holes 106 (e.g., one, three, four, etc.), and such through holes 106 may be located at positions differing from those shown in FIG. 1.

The RFID tag 100 of FIG. 1 includes radio frequency circuitry (e.g., located within the RFID tag 100 between the front surface 102 and the back surface 104 of FIG. 1) that enables data and/or information (e.g., identification information) stored on and/or stored in the RFID tag 100 to be read by and/or otherwise communicated to a remotely-located RFID tag reader and/or interrogator to provide the identity and/or location of the RFID tag 100. In some examples, the radio frequency circuitry of the RFID tag 100 of FIG. 1 operates at and/or is responsive to a radio frequency band having a center frequency of approximately 915 MHz. In some examples, the radio frequency circuitry of the RFID tag 100 of FIG. 1 includes one or more internal antenna(s) having an associated gain. In some examples, the maximum antenna gain associated with the RFID tag 100 of FIG. 1 in isolation (e.g., the RFID tag 100 not mounted to a bracket) is approximately −65 dBm. In some examples, the maximum communication range (e.g., the maximum read range) associated with the RFID tag 100 of FIG. 1 in isolation (e.g., the RFID tag 100 not mounted to a bracket) is less than five feet (e.g., about two to three feet).

Figure 2:
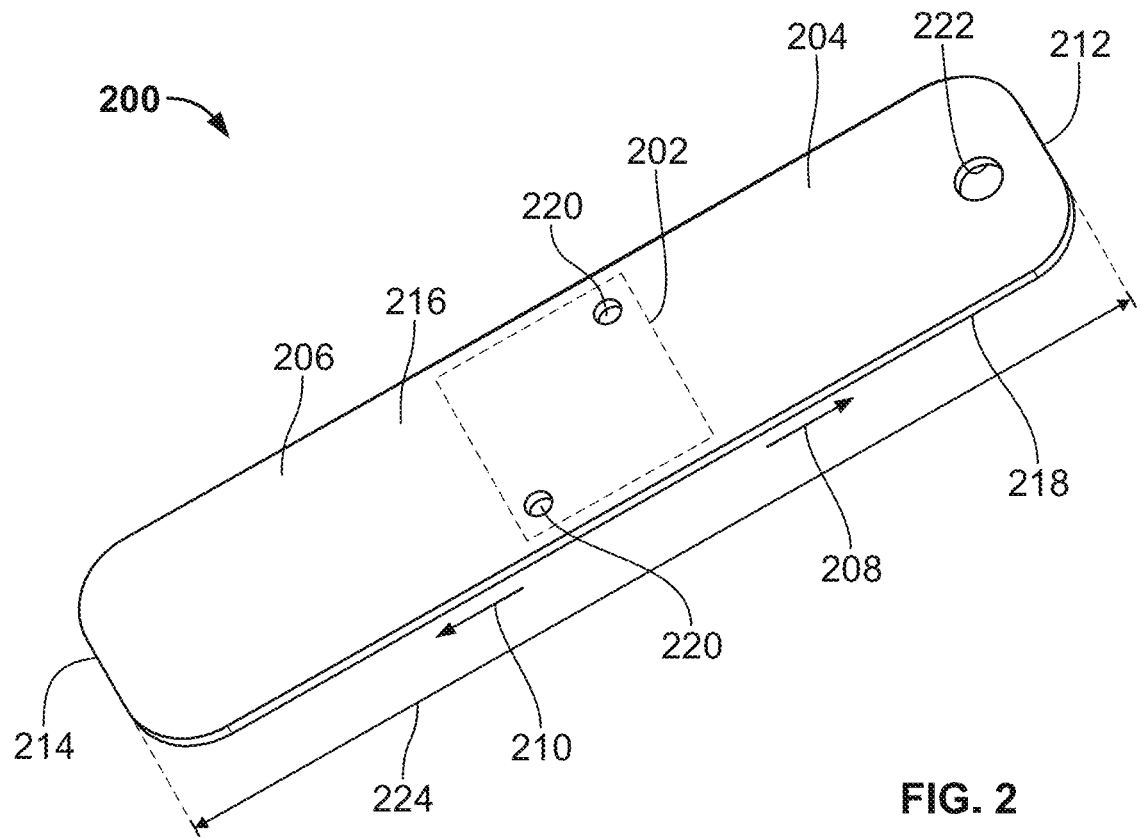
FIG. 2 is a perspective view of a first example bracket constructed in accordance with the teachings of this disclosure.

FIG. 2 is a perspective view of a first example bracket 200 constructed in accordance with the teachings of this disclosure. The bracket 200 of FIG. 2 includes an example central portion 202, a first example amplification arm 204, and a second example amplification arm 206. The first amplification arm 204 is connected to (e.g., integrally formed with) and extends away from the central portion 202 in an example first direction 208, and the second amplification arm 206 is connected to (e.g., integrally formed with) and extends away from the central portion 202 in an example second direction 210 opposite the first direction 208. The first amplification arm 204 forms and/or defines an example first end 212 of the bracket 200, and the second amplification arm 206 forms and/or defines an example second end 214 of the bracket 200 located opposite the first end 212 of the bracket 200. In the illustrated example of FIG. 2, the central portion 202, the first amplification arm 204, the second amplification arm 206, and/or, more generally, the bracket 200 has/have an example front surface 216 and an example back surface 218 located opposite the front surface 216. The central portion 202, the first amplification arm 204, the second amplification arm 206, and/or, more generally, the bracket 200 is/are preferably formed from one or more conductive metallic material(s) of any thickness (e.g., sheet metal, metallic tape, a signal trace on a printed circuit board, etc.).

The central portion 202 of the bracket 200 of FIG. 2 includes example through holes 220 passing from the front surface 216 of the central portion 202 through to the back surface 218 of the central portion 202. Respective ones of the through holes 220 are configured to receive a corresponding fastener to fasten, couple, and/or mount the RFID tag 100 of FIG. 1 to the central portion 202 of the bracket 200. The fastener(s) associated with the through hole(s) 220 may include, for example, one or more screw(s), bolt(s), rivet(s), stud(s), boss(es), band(s), cable tie(s), etc. In the illustrated example of FIG. 2, the central portion 202 of the bracket 200 includes a total of two through holes 220, with the two through holes 220 being respectively located relative to one another at diagonally-opposed corners of the central portion 202. In other examples, the central portion 202 of the bracket 200 may include a different number of through holes 220 (e.g., one, three, four, etc.), and such through holes 220 may be located at positions differing from those shown in FIG. 2.

In the illustrated example of FIG. 2, the central portion 202 of the bracket 200 has a flat, rectangular shape. For example, as shown in FIG. 2, the central portion 202 of the bracket 200 has a length of approximately 32.0 millimeters, a width of approximately 32.0 millimeters, and a thickness of approximately 2.0 millimeters, where the length and width are the dimensions of the front surface 216 of the central portion 202 and the thickness is the dimension between the front surface 216 and the back surface 218 of the central portion 202. In other examples, the central portion 202 of the bracket 200 of FIG. 2 may have a shape and/or dimensions differing from that/those described above. For example, the central portion 202 may have a circular shape, an elliptical shape, a triangular shape, etc., or may have dimensions that are greater than or less than the dimensions described above.

The first amplification arm 204 of the bracket 200 of FIG. 2 includes an example through hole 222 located proximate the first end 212 of the bracket 200 and passing from the front surface 216 of the first amplification arm 204 through to the back surface 218 of the first amplification arm 204. The through hole 222 is configured to receive a fastener to facilitate hanging the bracket 200 from and/or otherwise coupling the bracket 200 to an object (e.g., a field device). The fastener associated with the through hole 222 may include, for example, a cable tie, a cable, a wire, a string, a band, etc.

In the illustrated example of FIG. 2, the first amplification arm 204 and the second amplification arm 206 of the bracket 200 respectively have flat, generally rectangular shapes. For example, as shown in FIG. 2, the first amplification arm 204 of the bracket 200 has a length of approximately 54.0 millimeters, a width of approximately 32.0 millimeters, and a thickness of approximately 2.0 millimeters, where the length and width are the dimensions of the front surface 216 of the first amplification arm 204 and the thickness is the dimension between the front surface 216 and the back surface 218 of the first amplification arm 204. The second amplification arm 206 is similarly shaped and/or dimensioned to have a shape and/or dimensions that match that/those of the first amplification arm 204. In other examples, the first amplification arm 204 and/or the second amplification arm 206 of the bracket 200 of FIG. 2 may have a shape and/or dimensions differing from that/those described above. For example, the first amplification arm 204 and/or the second amplification arm 206 may have a circular shape, an elliptical shape, a triangular shape, etc., or may have dimensions that are greater than or less than the dimensions described above.

In the illustrated example of FIG. 2, an example distance 224 between the first end 212 and the second end 214 of the bracket 200 is approximately 140.0 millimeters. In other examples, the distance 224 between the first end 212 and the second end 214 of the bracket 200 may range in value from approximately 120.0 millimeters to approximately 160.0 millimeters. In some examples, the distance 224 between the first end 212 and the second end 214 of the bracket 200 preferably does not exceed a distance value equal to one-half of the wavelength of the radio frequency (e.g., a 915 Mhz center frequency) at which an RFID tag (e.g., the RFID tag 100 of FIG. 1) to be mounted to the bracket 200 operates and/or is responsive to.

Figure 3:
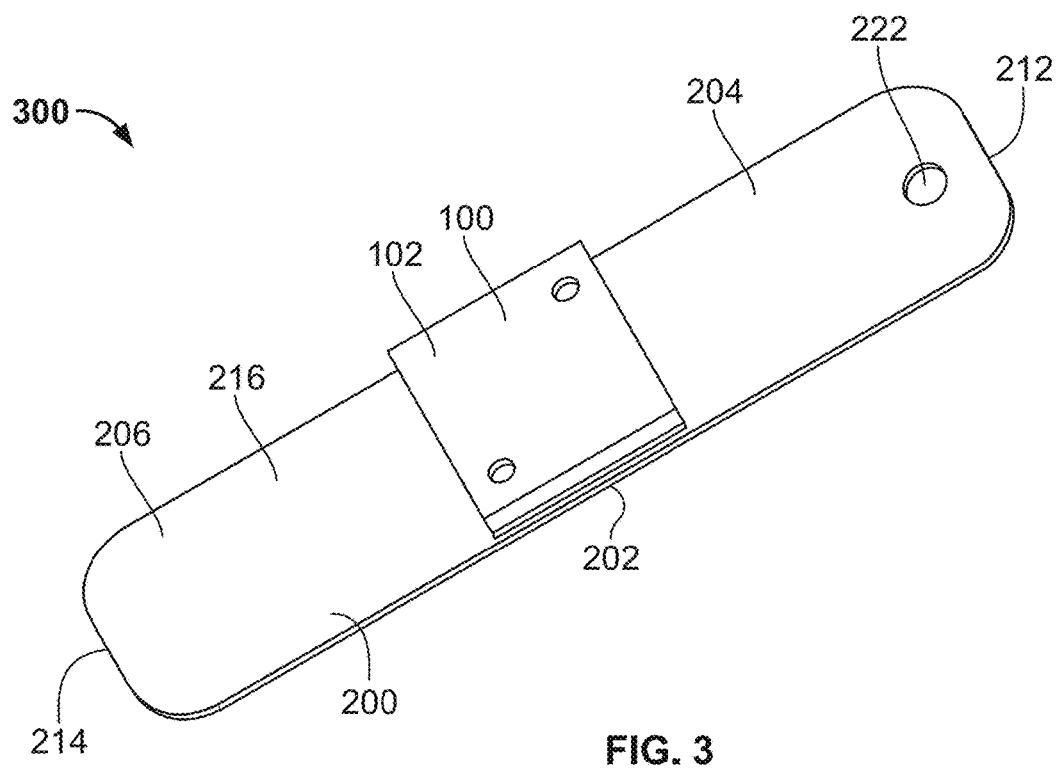
FIG. 3 is a perspective view of an example RFID hang tag including the RFID tag of FIG. 1 mounted to the bracket of FIG. 2.
Figure 4:
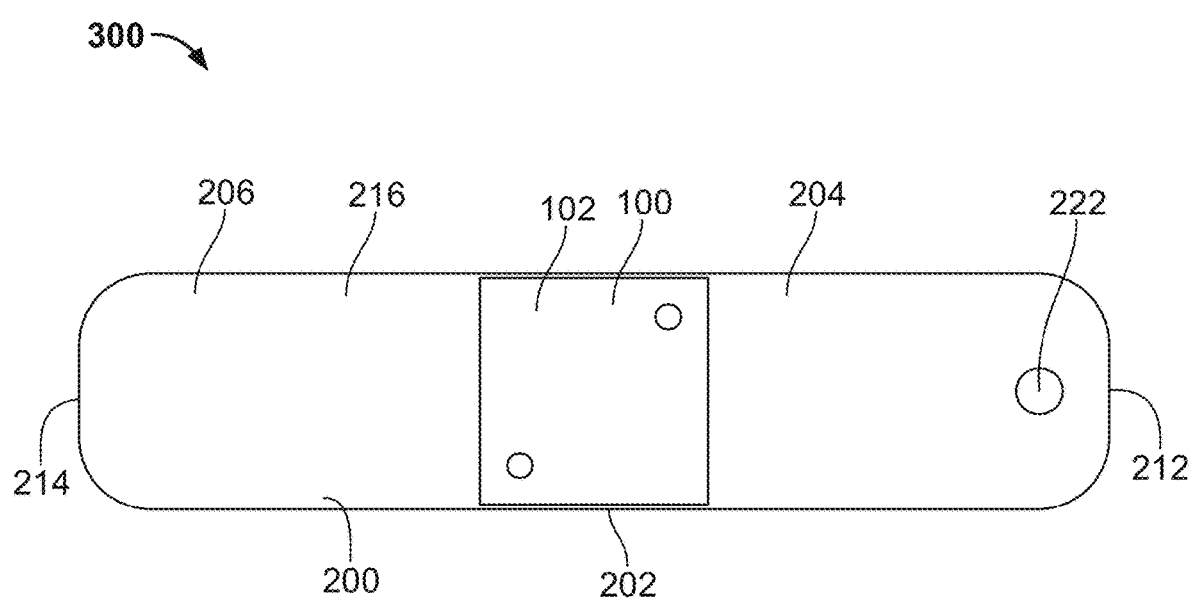
FIG. 4 is a rear view of the RFID hang tag of FIG. 3.

FIG. 3 is a perspective view of an example RFID hang tag 300 including the RFID tag 100 of FIG. 1 mounted to the bracket 200 of FIG. 2. FIG. 4 is a rear view of the RFID hang tag 300 of FIG. 3. In the illustrated example of FIGS. 3 and 4, the RFID hang tag 300 is formed by positioning the RFID tag 100 on the central portion 202 of the bracket 200 such that the back surface 104 of the RFID tag 100 faces and/or is in contact with the front surface 216 of the central portion 202 of the bracket 200. When positioned on the bracket 200 as shown in FIGS. 3 and 4, the RFID tag 100 can be fastened, coupled, and/or mounted to the bracket 200 via fasteners (e.g., threaded rivets) passing from the back surface 218 of the central portion 202 of the bracket 200, through the through holes 220 of the central portion 202 of the bracket 200, and into the through holes 106 of the RFID tag 100. The assembled RFID hang tag 300 of FIGS. 3 and 4 is structured to be hung from an object (e.g., a field device) via a fastener (e.g., a cable tie, a cable, a wire, a string, a band, etc.) passing through the through hole 222 formed in the first amplification arm 204 of the bracket 200.

In the illustrated example of FIGS. 3 and 4, the first amplification arm 204 and the second amplification arm 206 of the bracket 200 respectively amplify an antenna gain associated with the RFID tag 100 (e.g., a gain of an internal antenna of the RFID tag 100). By amplifying the antenna gain associated with the RFID tag 100, the first amplification arm 204 and the second amplification arm 206 collectively operate as a dipole antenna that increases the maximum communication range (e.g., the maximum read range) associated with the RFID tag 100. For example, when the RFID tag 100 is mounted to the central portion 202 of the bracket 200 to form the RFID hang tag 300 of FIGS. 3 and 4 as described above, the first amplification arm 204 and the second amplification arm 206 may increase the maximum communication range (e.g., the maximum read range) associated with the RFID tag 100 by a distance of fifteen feet or more. In such examples, the maximum communication range associated with the mounted RFID tag 100 of the RFID hang tag 300 may be twenty feet or more at a center frequency of 915 MHz, in comparison to the maximum communication range of the RFID tag 100 in isolation (e.g., not mounted to the bracket 200 of FIG. 2) being just five feet or less at a center frequency of 915 MHz.

FIG. 5 is an example surface current density profile 500 for the RFID hang tag 300 of FIGS. 3 and 4. The surface current density profile 500 of FIG. 5 shows the surface current density for the RFID hang tag 300 at a center frequency of 915 MHz. As shown in FIG. 5, the first amplification arm 204 and the second amplification arm 206 of the bracket 200 collectively operate as a dipole antenna and/or resonator for the RFID tag 100, with a majority of the resonant behavior occurring along the edges of the first amplification arm 204 and the second amplification arm 206 of the bracket 200. The through hole 222 formed in the first amplification arm 204 of the bracket 200 is located in a quiescent region of the first amplification arm 204, thereby enabling the RFID hang tag 300 of FIGS. 3 and 4 to be hung in a vertical orientation from a metallic object (e.g., a metallic casing of a field device) via a metallic fastener (e.g., a metal wire) passing through the through hole 222 without the metallic fastener crossing the resonating edges of the first amplification arm 204 and/or the second amplification arm 206 of the bracket 200.

Figure 6:
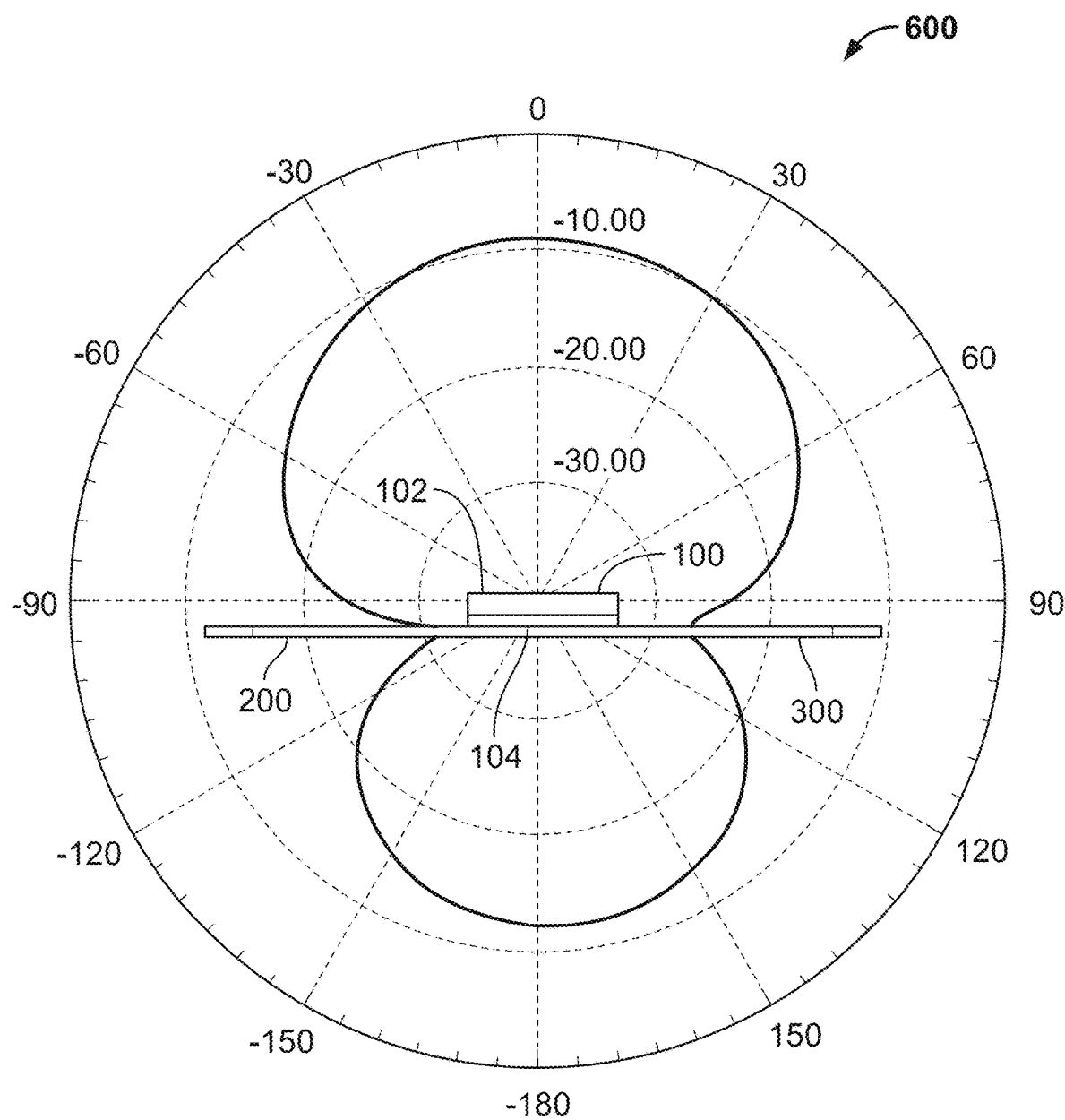
FIG. 6 is an example graph of antenna gain as a function of azimuthal angle for the RFID hang tag of FIGS. 3 and 4.

FIG. 6 is an example graph 600 of antenna gain as a function of azimuthal angle for the RFID hang tag 300 of FIGS. 3 and 4. In the illustrated example of FIG. 6, an azimuthal angle of zero degrees (0°) corresponds to the front surface 102 of the RFID tag 100, and an azimuthal angle of one hundred eighty degrees (180°) corresponds to the back surface 104 of the RFID tag 100. The maximum antenna gain associated with the RFID tag 100 in isolation is approximately −65 dBm at both the front surface 102 (e.g., at (0°) and the back surface (e.g., 180°) of the RFID tag 100. By comparison, the graph 600 of FIG. 6 shows that the maximum antenna gain associated with the RFID hang tag 300 is approximately −9 dBm at the front surface 102 (e.g., at 0°) of the RFID tag 100, and approximately −13 dBm at the back surface (e.g., 180°) of the RFID tag 100. Thus, the maximum antenna gain associated with the RFID tag 100 increases substantially in response to the RFID tag 100 being mounted to the bracket 200 to form the RFID hang tag 300 of FIGS. 3 and 4.

Figure 7:
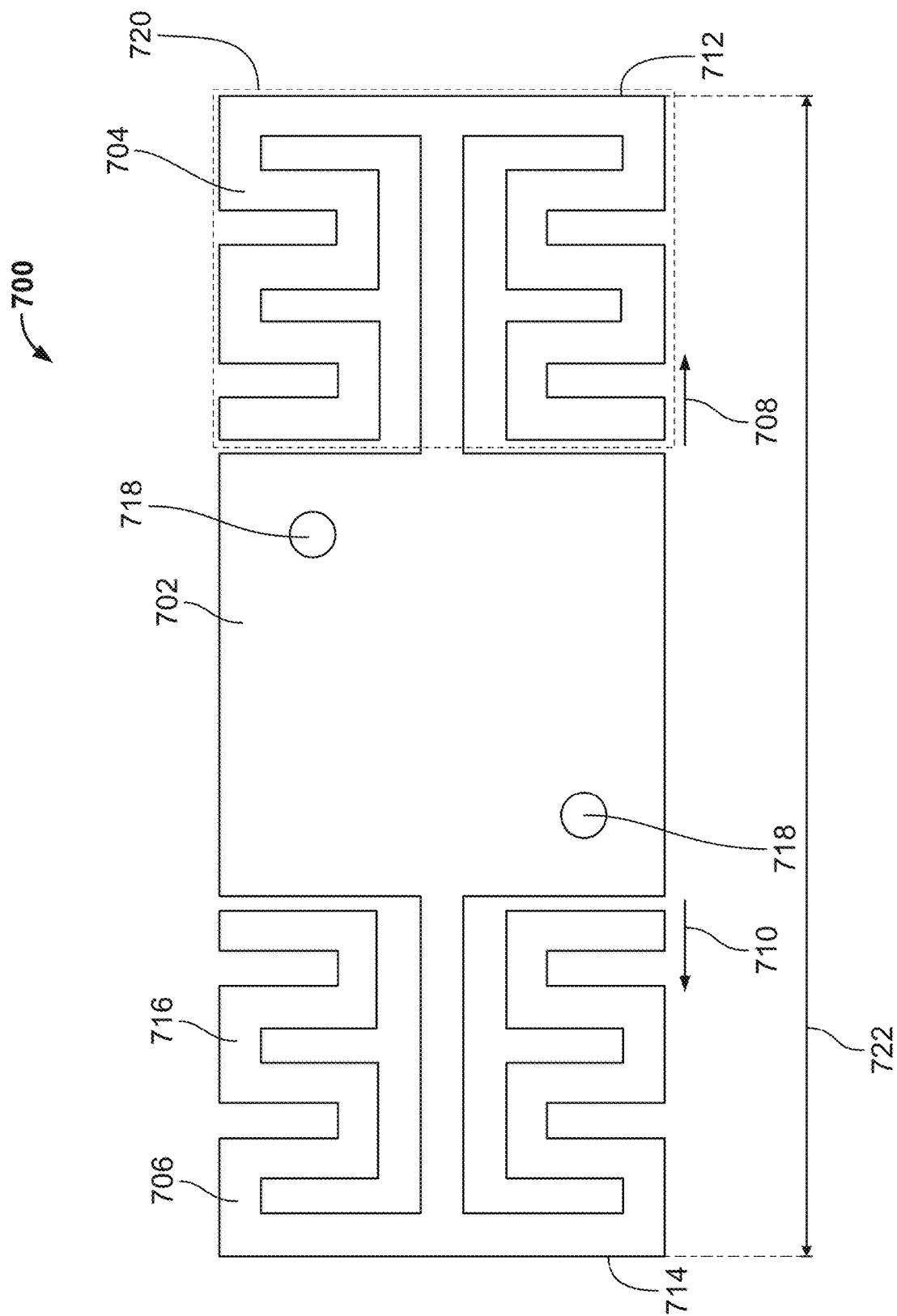
FIG. 7 is a front view of a second example bracket constructed in accordance with the teachings of this disclosure.
Figure 8:
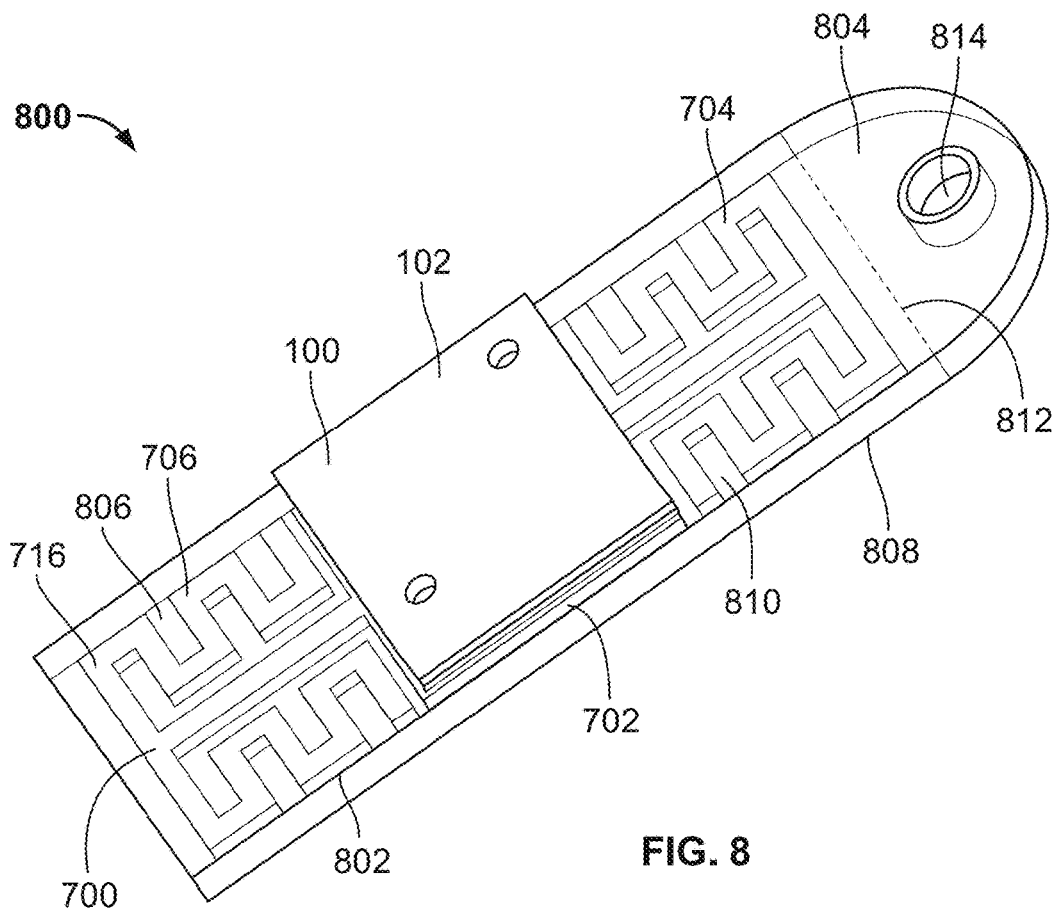
FIG. 8 is a perspective view of an example RFID hang tag including the RFID tag of FIG. 1 mounted to the bracket of FIG. 7.

FIG. 7 is a front view of a second example bracket 700 constructed in accordance with the teachings of this disclosure. The bracket 700 of FIG. 7 includes an example base 702, a first example meandering amplification arm 704, and a second example meandering amplification arm 706. The first meandering amplification arm 704 is peripherally located relative to, and/or is connected to (e.g., integrally formed with) and generally extends away from the base 702 in an example first direction 708, and the second meandering amplification arm 706 is peripherally located relative to, and/or is connected to (e.g., integrally formed with) and generally extends away from the base 702 in an example second direction 710 opposite the first direction 708. The first meandering amplification arm 704 forms and/or defines an example first end 712 of the bracket 700, and the second meandering amplification arm 706 forms and/or defines an example second end 714 of the bracket 700 located opposite the first end 712 of the bracket 700. In the illustrated example of FIG. 7, the base 702, the first meandering amplification arm 704, the second meandering amplification arm 706, and/or, more generally, the bracket 700 has/have an example front surface 716 and an example back surface 802 (e.g., as shown in FIG. 8) located opposite the front surface 716. The base 702, the first meandering amplification arm 704, the second meandering amplification arm 706, and/or, more generally, the bracket 700 is/are preferably formed from one or more conductive metallic material(s) of any thickness (e.g., sheet metal, metallic tape, a signal trace on a printed circuit board, etc.).

The base 702 of the bracket 700 of FIG. 7 includes example through holes 718 passing from the front surface 716 of the base 702 through to the back surface 802 of the base 702. Respective ones of the through holes 718 are configured to receive a corresponding fastener to fasten, couple, and/or mount the RFID tag 100 of FIG. 1 to the base 702 of the bracket 700. The fastener(s) associated with the through hole(s) 718 may include, for example, one or more screw(s), bolt(s), rivet(s), stud(s), boss(es), band(s), cable tie(s), etc. In the illustrated example of FIG. 7, the base 702 of the bracket 700 includes a total of two through holes 718, with the two through holes 718 being respectively located relative to one another at diagonally-opposed corners of the base 702. In other examples, the base 702 of the bracket 700 may include a different number of through holes 718 (e.g., one, three, four, etc.), and such through holes 718 may be located at positions differing from those shown in FIG. 7.

In the illustrated example of FIG. 7, the base 702 of the bracket 700 has a flat, rectangular shape. For example, as shown in FIG. 7, the base 702 of the bracket 700 has a length of approximately 32.0 millimeters and a width of approximately 32.0 millimeters, where the length and width are the dimensions of the front surface 716 of the base 702. The base 702 of the bracket 700 additionally has a thickness of approximately 2.0 millimeters, where the thickness is the dimension between the front surface 716 and the back surface 802 of the base 702. In other examples, the base 702 of the bracket 700 of FIG. 7 may have a shape and/or dimensions differing from that/those described above. For example, the base 702 may have a circular shape, an elliptical shape, a triangular shape, etc., or may have dimensions that are greater than or less than the dimensions described above.

The first meandering amplification arm 704 of the bracket 700 of FIG. 7 has an example meandering configuration 720 that facilitates amplifying an antenna gain associated with an RFID tag (e.g., the RFID tag 100 of FIG. 1) to be mounted to the bracket 700. The meandering configuration 720 of the first meandering amplification arm 704 is described in greater detail below in connection with FIG. 38. In the illustrated example of FIG. 7, the second meandering amplification arm 706 of the bracket 700 has the same meandering configuration 720 implemented by the first meandering amplification arm 704 of the bracket 700. In other examples, the second meandering amplification arm 706 of the bracket 700 can have a meandering configuration that differs from the meandering configuration 720 implemented by the first meandering amplification arm 704 of the bracket 700. Example alternate meandering configurations that may be implemented by either or both of the first meandering amplification arm 704 and/or the second meandering amplification arm 706 of the bracket 700 of FIG. 7 are described in greater detail below in connection with FIGS. 39 and 44.

In the illustrated example of FIG. 7, the first meandering amplification arm 704 and the second meandering amplification arm 706 of the bracket 700 respectively have flat, generally rectangular shapes. For example, as shown in FIG. 7, the first meandering amplification arm 704 of the bracket 700 has an overall length of approximately 26.0 millimeters and an overall width of approximately 32.0 millimeters, where the overall length and overall width are the general dimensions of the front surface 716 of the first meandering amplification arm 704. The first meandering amplification arm 704 of the bracket 700 additionally has a thickness of approximately 2.0 millimeters, where the thickness is the dimension between the front surface 716 and the back surface 802 of the first meandering amplification arm 704. The second meandering amplification arm 706 is similarly shaped and/or dimensioned to have a shape and/or dimensions that match that/those of the first meandering amplification arm 704. In other examples, the first meandering amplification arm 704 and/or the second meandering amplification arm 706 of the bracket 700 of FIG. 7 may have a shape and/or dimensions differing from that/those described above. For example, the first meandering amplification arm 704 and/or the second meandering amplification arm 706 may have a circular shape, an elliptical shape, a triangular shape, etc., or may have dimensions that are greater than or less than the dimensions described above.

In the illustrated example of FIG. 7, an example distance 722 between the first end 712 and the second end 714 of the bracket 700 is approximately 84.0 millimeters. In other examples, the distance 722 between the first end 712 and the second end 714 of the bracket 700 may range in value from approximately 64.0 millimeters to approximately 104.0 millimeters. In some examples, the distance 722 between the first end 712 and the second end 714 of the bracket 700 preferably does not exceed a distance value equal to one-half of the wavelength of the radio frequency (e.g., a 915 Mhz center frequency) at which an RFID tag (e.g., the RFID tag 100 of FIG. 1) to be mounted to the bracket 700 operates and/or is responsive to.

Figure 9:
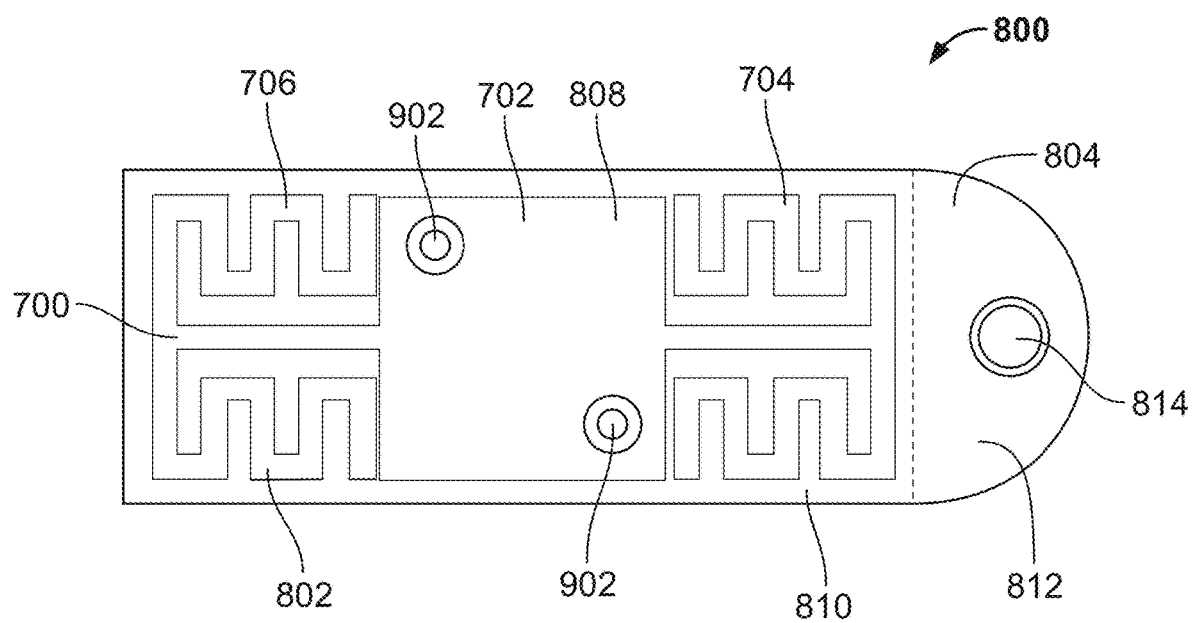
FIG. 9 is a rear view of the RFID hang tag of FIG. 8.

FIG. 8 is a perspective view of an example RFID hang tag 800 including the RFID tag 100 of FIG. 1 mounted to the bracket 700 of FIG. 7. FIG. 9 is a rear view of the RFID hang tag 800 of FIG. 8. The RFID hang tag 800 of FIGS. 8 and 9 includes an example casing 804 having an example front surface 806 oriented in a same direction as the front surface 716 of the bracket 700, and an example back surface 808 located opposite the front surface 806 and oriented in a same direction as the back surface 802 of the bracket 700. The casing 804 supports and/or encases the first meandering amplification arm 704 and the second meandering amplification arm 706 of the bracket 700 to increase the mechanical integrity thereof relative to the base 702 of the bracket 700 (e.g., to prevent bending of the first meandering amplification arm 704 and/or the second meandering amplification arm 706 relative to the base 702 of the bracket 700).

The casing 804 of FIGS. 8 and 9 is configured (e.g., sized, shaped, and/or structured to cover, house, and/or encase at least a portion (e.g., substantially all) of the bracket 700 of FIG. 7. For example, as shown in FIGS. 8 and 9, the casing 804 covers, houses, and/or encases the substantial entirety of the bracket 700 of FIG. 7 with the exception of the front surface 716 of the of the base 702 of the bracket 700, which is an area reserved for placement and/or mounting of the RFID tag 100. The casing 804 is preferably formed from a non-conductive material, such as plastic, rubber, ceramic, or porcelain. Forming the casing 804 from such a non-conductive material advantageously shields and/or insulates the encased components (e.g., the first meandering amplification arm 704 and the second meandering amplification arm 706) of the bracket 700 of the RFID hang tag 800 from contacting one or more metallic component(s) of an object (e.g., a field device) from which the RFID hang tag 800 may be hung, or to which the RFID hang tag 800 may be coupled.

The casing 804 of FIGS. 8 and 9 includes an example first portion 810 configured (e.g., sized, shaped, and/or structured) to cover, house, and/or encase the bracket 700 as described above, and an example second portion 812 connected to and extending away from the first portion 810 and configured (e.g., sized, shaped, and/or structured) to support a through hole to be spaced apart from the bracket 700. In the illustrated example of FIGS. 8 and 9, the first portion 810 of the casing 804 has a flat, generally rectangular shape corresponding to the flat, generally rectangular shape of the bracket 700. The second portion 812 of the casing 804 has a flat, generally hemispherical shape corresponding in width to the width of the first portion 810 of the casing 804. In other examples, the first portion 810 and/or the second portion 812 of the casing 804 may have a shape that differs from that shown in FIGS. 8 and 9.

In the illustrated example of FIGS. 8 and 9, the first portion 810 of the casing 804 includes example through holes 902 passing through the back surface 808 of the casing 804 and positioned in alignment with the above-described through holes 718 of the base 702 of the bracket 700. The RFID hang tag 800 of FIGS. 8 and 9 is formed by positioning the RFID tag 100 on the base 702 of the bracket 700 (e.g., with the bracket 700 being at least partially encased by the casing 804) such that the back surface 104 of the RFID tag 100 faces and/or is in contact with the front surface 716 of the base 702 of the bracket 700. When positioned on the bracket 700 as shown in FIGS. 8 and 9, the RFID tag 100 can be fastened, coupled, and/or mounted to the bracket 700 via fasteners (e.g., threaded rivets) passing from the back surface 808 of the casing 804, through the through holes 902 of the casing 804, through the through holes 718 of the base 702 of the bracket 700, and into the through holes 106 of the RFID tag 100.

In the illustrated example of FIGS. 8 and 9, the second portion 812 of the casing 804 includes an example through hole 814 spaced apart from the bracket 700 and passing from the front surface 806 of the casing 804 through to the back surface 808 of the casing 804. The assembled RFID hang tag 800 of FIGS. 8 and 9 is structured to be hung from an object (e.g., a field device) via a fastener (e.g., a cable tie, a cable, a wire, a string, a band, etc.) passing through the through hole 814 formed in the casing 804.

In the illustrated example of FIGS. 8 and 9, the first meandering amplification arm 704 and the second meandering amplification arm 706 of the bracket 700 respectively amplify an antenna gain associated with the RFID tag 100 (e.g., a gain of an internal antenna of the RFID tag 100). By amplifying the antenna gain associated with the RFID tag 100, the first meandering amplification arm 704 and the second meandering amplification arm 706 collectively operate as a meandering dipole antenna that increases the maximum communication range (e.g., the maximum read range) associated with the RFID tag 100. For example, when the RFID tag 100 is mounted to the base 702 of the bracket 700 to form the RFID hang tag 800 of FIGS. 8 and 9 as described above, the first meandering amplification arm 704 and the second meandering amplification arm 706 may increase the maximum communication range (e.g., the maximum read range) associated with the RFID tag 100 by a distance of twenty-five feet or more. In such examples, the maximum communication range associated with the mounted RFID tag 100 of the RFID hang tag 800 may be thirty feet or more at a center frequency of 915 MHz, in comparison to the maximum communication range of the RFID tag 100 in isolation (e.g., not mounted to the bracket 700 of FIG. 7) being just five feet or less at a center frequency of 915 MHz.

FIG. 10 is an example surface current density profile 1000 for the RFID hang tag 800 of FIGS. 8 and 9. The surface current density profile 1000 of FIG. 10 shows the surface current density for the RFID hang tag 800 at a center frequency of 915 MHz. As shown in FIG. 10, the first meandering amplification arm 704 and the second meandering amplification arm 706 of the bracket 700 collectively operate as a meandering dipole antenna and/or resonator for the RFID tag 100, with a majority of the resonant behavior occurring along a first example feed arm 1002 of the first meandering amplification arm 704 and a second example feed arm 1004 of the second meandering amplification arm 706.

Figure 11:
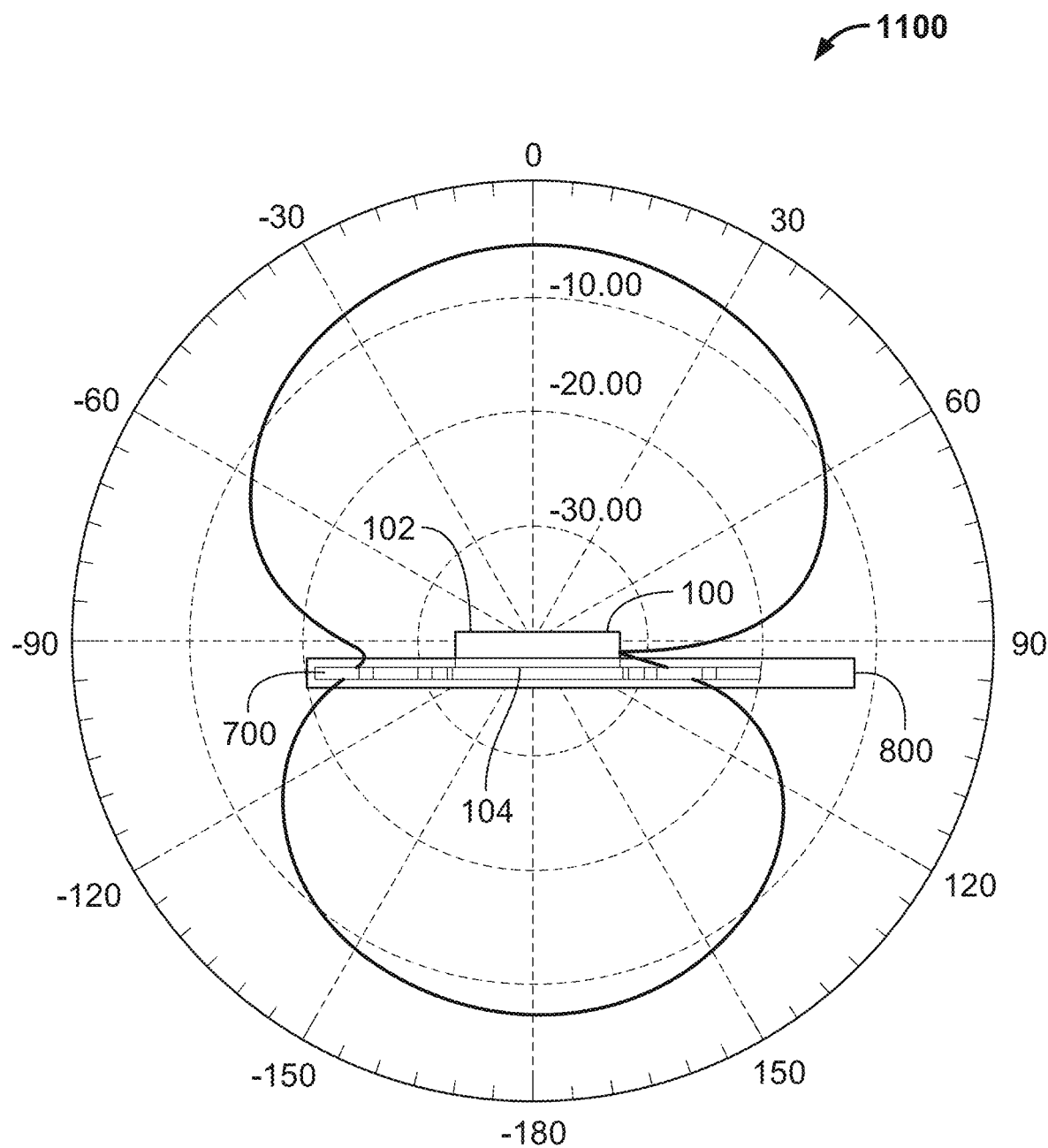
FIG. 11 is an example graph of antenna gain as a function of azimuthal angle for the RFID hang tag of FIGS. 8 and 9.

FIG. 11 is an example graph 1100 of antenna gain as a function of azimuthal angle for the RFID hang tag 800 of FIGS. 8 and 9. In the illustrated example of FIG. 11, an azimuthal angle of zero degrees (0°) corresponds to the front surface 102 of the RFID tag 100, and an azimuthal angle of one hundred eighty degrees (180°) corresponds to the back surface 104 of the RFID tag 100. The maximum antenna gain associated with the RFID tag 100 in isolation is approximately −65 dBm at both the front surface 102 (e.g., at 0°) and the back surface (e.g., 180°) of the RFID tag 100. By comparison, the graph 1100 of FIG. 11 shows that the maximum antenna gain associated with the RFID hang tag 800 is approximately −6 dBm at the front surface 102 (e.g., at 0°) of the RFID tag 100, and approximately −8 dBm at the back surface (e.g., 180°) of the RFID tag 100. Thus, the maximum antenna gain associated with the RFID tag 100 increases substantially in response to the RFID tag 100 being mounted to the bracket 700 to form the RFID hang tag 800 of FIGS. 8 and 9.

Figure 12:
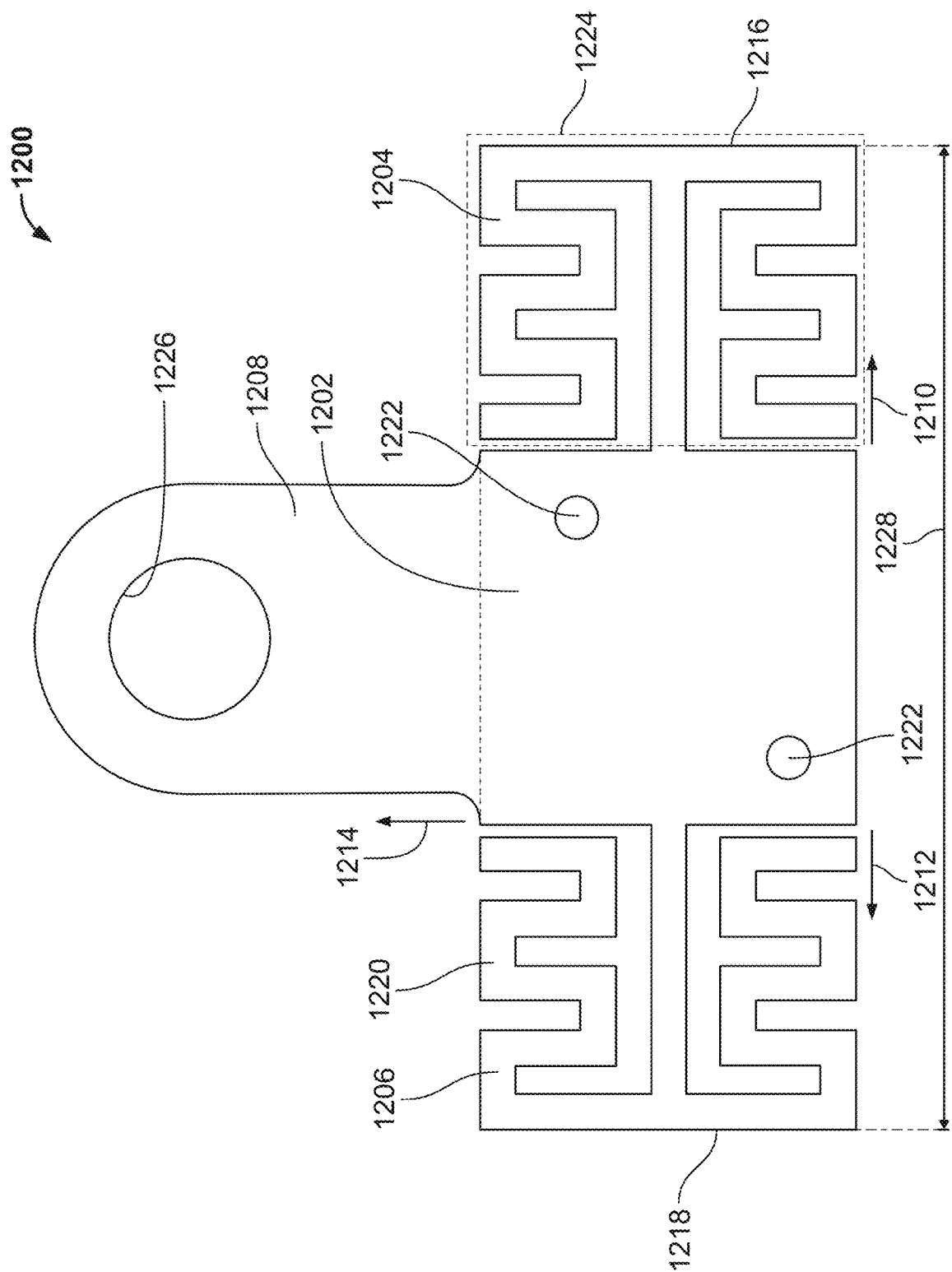
FIG. 12 is a front view of a third example bracket constructed in accordance with the teachings of this disclosure.
Figure 13:
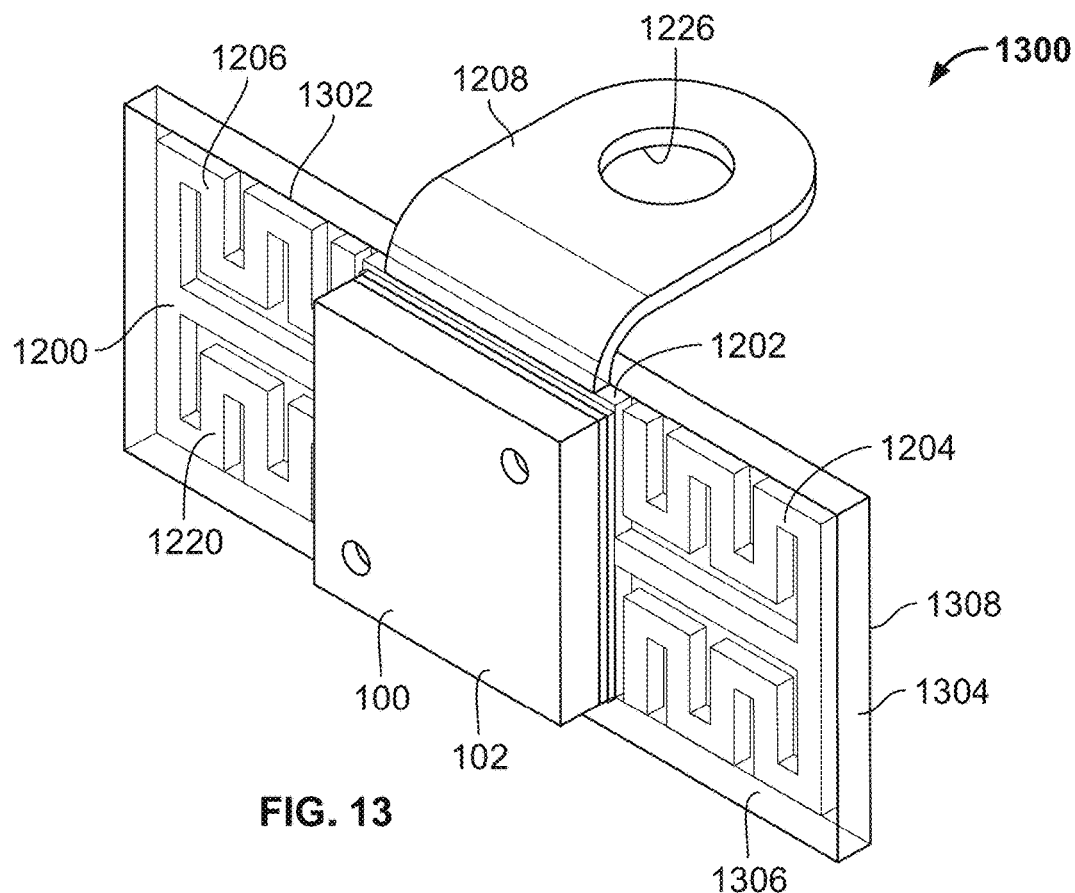
FIG. 13 is a perspective view of an example RFID mountable bracket including the RFID tag of FIG. 1 mounted to the bracket of FIG. 12.

FIG. 12 is a front view of a third example bracket 1200 constructed in accordance with the teachings of this disclosure. The bracket 1200 of FIG. 12 includes an example base 1202, a first example meandering amplification arm 1204, a second example meandering amplification arm 1206, and an example mounting arm 1208. The first meandering amplification arm 1204 is peripherally located relative to, and/or is connected to (e.g., integrally formed with) and generally extends away from the base 1202 in an example first direction 1210. The second meandering amplification arm 1206 is peripherally located relative to, and/or is connected to (e.g., integrally formed with) and generally extends away from the base 1202 in an example second direction 1212 opposite the first direction 1210. The mounting arm 1208 is peripherally located relative to, and/or is connected to (e.g., integrally formed with) and extends away from the base 1202 in an example third direction 1214 oriented orthogonally relative to the first direction 1210 and the second direction 1212. The first meandering amplification arm 1204 forms and/or defines an example first end 1216 of the bracket 1200, and the second meandering amplification arm 1206 forms and/or defines an example second end 1218 of the bracket 1200 located opposite the first end 1216 of the bracket 1200. In the illustrated example of FIG. 12, the base 1202, the first meandering amplification arm 1204, the second meandering amplification arm 1206, the mounting arm 1208 and/or, more generally, the bracket 1200 has/have an example front surface 1220 and an example back surface 1302 (e.g., as shown in FIG. 13) located opposite the front surface 1220. The base 1202, the first meandering amplification arm 1204, the second meandering amplification arm 1206, the mounting arm 1208, and/or, more generally, the bracket 1200 is/are preferably formed from one or more conductive metallic material(s) of any thickness (e.g., sheet metal, metallic tape, a signal trace on a printed circuit board, etc.).

The base 1202 of the bracket 1200 of FIG. 12 includes example through holes 1222 passing from the front surface 1220 of the base 1202 through to the back surface 1302 of the base 1202. Respective ones of the through holes 1222 are configured to receive a corresponding fastener to fasten, couple, and/or mount the RFID tag 100 of FIG. 1 to the base 1202 of the bracket 1200. The fastener(s) associated with the through hole(s) 1222 may include, for example, one or more screw(s), bolt(s), rivet(s), stud(s), boss(es), band(s), cable tie(s), etc. In the illustrated example of FIG. 12, the base 1202 of the bracket 1200 includes a total of two through holes 1222, with the two through holes 1222 being respectively located relative to one another at diagonally-opposed corners of the base 1202. In other examples, the base 1202 of the bracket 1200 may include a different number of through holes 1222 (e.g., one, three, four, etc.), and such through holes 1222 may be located at positions differing from those shown in FIG. 12.

In the illustrated example of FIG. 12, the base 1202 of the bracket 1200 has a flat, rectangular shape. For example, as shown in FIG. 12, the base 1202 of the bracket 1200 has a length of approximately 32.0 millimeters and a width of approximately 32.0 millimeters, where the length and width are the dimensions of the front surface 1220 of the base 1202. The base 1202 of the bracket 1200 additionally has a thickness of approximately 2.0 millimeters, where the thickness is the dimension between the front surface 1220 and the back surface 1302 of the base 1202. In other examples, the base 1202 of the bracket 1200 of FIG. 12 may have a shape and/or dimensions differing from that/those described above. For example, the base 1202 may have a circular shape, an elliptical shape, a triangular shape, etc., or may have dimensions that are greater than or less than the dimensions described above.

The first meandering amplification arm 1204 of the bracket 1200 of FIG. 12 has an example meandering configuration 1224 that facilitates amplifying an antenna gain associated with an RFID tag (e.g., the RFID tag 100 of FIG. 1) to be mounted to the bracket 1200. The meandering configuration 1224 of the first meandering amplification arm 1204 is described in greater detail below in connection with FIG. 38. In the illustrated example of FIG. 12, the second meandering amplification arm 1206 of the bracket 1200 has the same meandering configuration 1224 implemented by the first meandering amplification arm 1204 of the bracket 1200. In other examples, the second meandering amplification arm 1206 of the bracket 1200 can have a meandering configuration that differs from the meandering configuration 1224 implemented by the first meandering amplification arm 1204 of the bracket 1200. Example alternate meandering configurations that may be implemented by either or both of the first meandering amplification arm 1204 and/or the second meandering amplification arm 1206 of the bracket 1200 of FIG. 12 are described in greater detail below in connection with FIGS. 39 and 44.

In the illustrated example of FIG. 12, the first meandering amplification arm 1204 and the second meandering amplification arm 1206 of the bracket 1200 respectively have flat, generally rectangular shapes. For example, as shown in FIG. 12, the first meandering amplification arm 1204 of the bracket 1200 has an overall length of approximately 26.0 millimeters and an overall width of approximately 32.0 millimeters, where the overall length and overall width are the general dimensions of the front surface 1220 of the first meandering amplification arm 1204. The first meandering amplification arm 1204 of the bracket 1200 additionally has a thickness of approximately 2.0 millimeters, where the thickness is the dimension between the front surface 1220 and the back surface 1302 of the first meandering amplification arm 1204. The second meandering amplification arm 1206 is similarly shaped and/or dimensioned to have a shape and/or dimensions that match that/those of the first meandering amplification arm 1204. In other examples, the first meandering amplification arm 1204 and/or the second meandering amplification arm 1206 of the bracket 1200 of FIG. 12 may have a shape and/or dimensions differing from that/those described above. For example, the first meandering amplification arm 1204 and/or the second meandering amplification arm 1206 may have a circular shape, an elliptical shape, a triangular shape, etc., or may have dimensions that are greater than or less than the dimensions described above.

Figure 14:
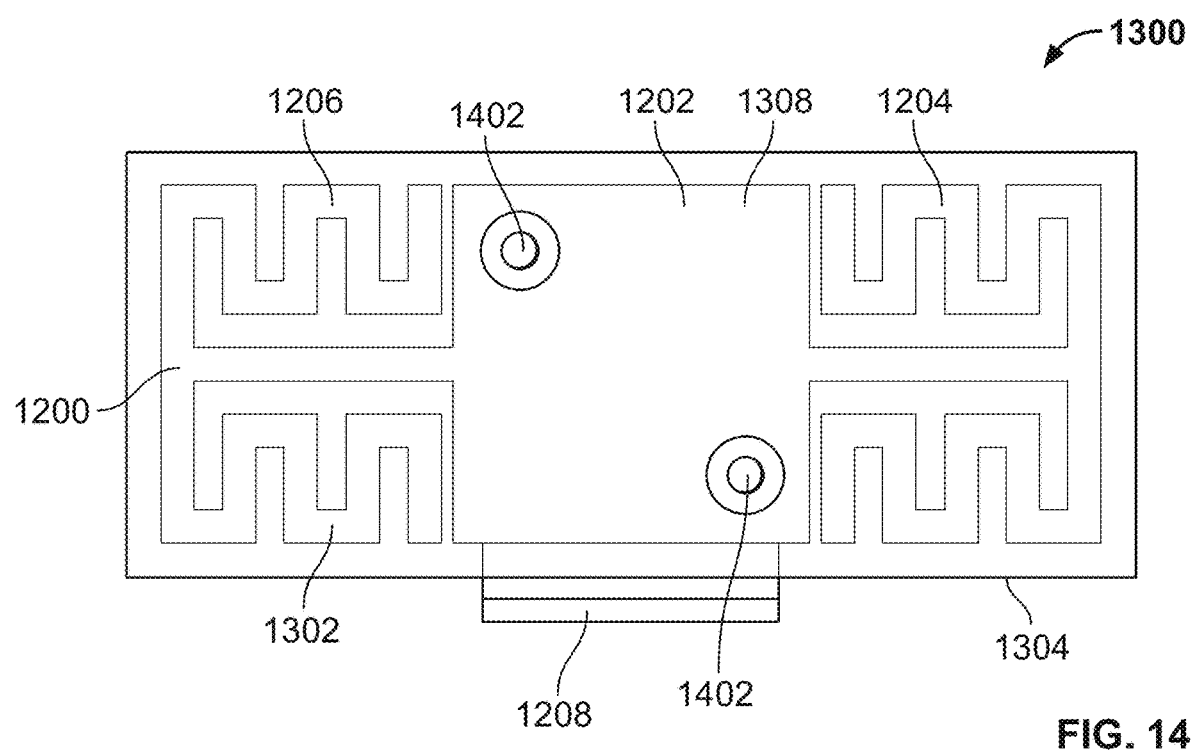
FIG. 14 is a rear view of the RFID mountable bracket of FIG. 13.

The mounting arm 1208 of the bracket 1200 of FIG. 12 includes an example through hole 1226 passing from the front surface 1220 of the mounting arm 1208 through to the back surface 1302 of the mounting arm 1208. The through hole 1226 is configured to receive a fastener to facilitate mounting the bracket 1200 to an object (e.g., a field device). The fastener associated with the through hole 1226 may include, for example, a screw, a bolt, a rivet, a stud, a boss, a band, a cable tie, etc. The mounting arm 1208 of the bracket 1200 of FIG. 12 has a flat, generally rectangular shape terminating in a rounded edge. As shown in FIG. 12, the mounting arm 1208 of the bracket 1200 is coplanar with the base 1202 of the bracket 1200. In other examples, the mounting arm 1208 of the bracket 1200 can instead be bent and/or positioned at an angle relative to the base 1202 of the bracket 1200. For example, as shown in FIGS. 13 and 14 described below, the mounting arm 1208 of the bracket 1200 is bent and/or positioned at an angle of approximately ninety degrees (90°) relative to the base 1202 of the bracket 1200. Bending and/or positioning the mounting arm 1208 of the bracket 1200 at an angle relative to the base 1202 of the bracket 1200 as shown in FIGS. 13 and 14 advantageously reduces the profile and/or form factor of the bracket 1200 when viewed from the front (e.g., from the front surface 1220 of the base 1202 of the bracket 1200).

In the illustrated example of FIG. 12, an example distance 1228 between the first end 1216 and the second end 1218 of the bracket 1200 is approximately 84.0 millimeters. In other examples, the distance 1228 between the first end 1216 and the second end 1218 of the bracket 1200 may range in value from approximately 64.0 millimeters to approximately 104.0 millimeters. In some examples, the distance 1228 between the first end 1216 and the second end 1218 of the bracket 1200 preferably does not exceed a distance value equal to one-half of the wavelength of the radio frequency (e.g., a 915 Mhz center frequency) at which an RFID tag (e.g., the RFID tag 100 of FIG. 1) to be mounted to the bracket 1200 operates and/or is responsive to.

FIG. 13 is a perspective view of an example RFID mountable bracket 1300 including the RFID tag of FIG. 1 mounted to the bracket 1200 of FIG. 12. FIG. 14 is a rear view of the RFID mountable bracket 1300 of FIG. 13. The RFID mountable bracket 1300 of FIGS. 13 and 14 includes an example casing 1304 having an example front surface 1306 oriented in a same direction as the front surface 1220 of the base 1202 of the bracket 1200, and an example back surface 1308 located opposite the front surface 1306 and oriented in a same direction as the back surface 1302 of the base 1202 of the bracket 1200. The casing 1304 supports and/or encases the first meandering amplification arm 1204 and the second meandering amplification arm 1206 of the bracket 1200 to increase the mechanical integrity thereof relative to the base 1202 of the bracket 1200 (e.g., to prevent bending of the first meandering amplification arm 1204 and/or the second meandering amplification arm 1206 relative to the base 1202 of the bracket 1200).

The casing 1304 of FIGS. 13 and 14 is configured (e.g., sized, shaped, and/or structured to cover, house, and/or encase at least a portion of the bracket 1200 of FIG. 12. For example, as shown in FIGS. 13 and 14, the casing 1304 covers, houses, and/or encases the substantial entirety of the bracket 1200 of FIG. 12 with the exception of the mounting arm 1208 of the bracket 1200, and with further exception to the front surface 1220 of the of the base 1202 of the bracket 1200, which is an area reserved for placement and/or mounting of the RFID tag 100. The casing 1304 is preferably formed from a non-conductive material, such as plastic, rubber, ceramic, or porcelain. Forming the casing 1304 from such a non-conductive material advantageously shields and/or insulates the encased components (e.g., the first meandering amplification arm 1204 and the second meandering amplification arm 1206) of the bracket 1200 of the RFID mountable bracket 1300 from contacting one or more metallic component(s) of an object (e.g., a field device) to which the RFID mountable bracket 1300 may be coupled, The casing 1304 of FIGS. 13 and 14 has a flat, generally rectangular shape corresponding to the flat, generally rectangular shape defined by the base 1202, the first meandering amplification arm 1204, and the second meandering amplification arm 1206 of the bracket 1000. In other examples, the casing 1304 may have a shape that differs from that shown in FIGS. 13 and 14. In the illustrated example of FIGS. 13 and 14, the casing 1304 includes example through holes 1402 passing through the back surface 1308 of the casing 1304 and positioned in alignment with the above-described through holes 1222 of the base 1202 of the bracket 1200. The RFID mountable bracket 1300 of FIGS. 13 and 14 is formed by positioning the RFID tag 100 on the base 1202 of the bracket 1200 (e.g., with the bracket 1200 being at least partially encased by the casing 1304) such that the back surface 104 of the RFID tag 100 faces and/or is in contact with the front surface 1220 of the base 1202 of the bracket 1200. When positioned on the bracket 1200 as shown in FIGS. 13 and 14, the RFID tag 100 can be fastened, coupled, and/or mounted to the bracket 1200 via fasteners (e.g., threaded rivets) passing from the back surface 1308 of the casing 1304, through the through holes 1402 of the casing 1304, through the through holes 1222 of the base 1202 of the bracket 1200, and into the through holes 106 of the RFID tag 100. The assembled RFID mountable bracket 1300 of FIGS. 13 and 14 is structured to be mounted to an object (e.g., a field device) via a fastener (e.g., a screw, a bolt, a rivet, a stud, a boss, a band, a cable tie, etc.) passing through the through hole 1226 formed in the mounting arm 1208 of the bracket 1200.

In the illustrated example of FIGS. 13 and 14, the first meandering amplification arm 1204 and the second meandering amplification arm 1206 of the bracket 1200 respectively amplify an antenna gain associated with the RFID tag 100 (e.g., a gain of an internal antenna of the RFID tag 100). By amplifying the antenna gain associated with the RFID tag 100, the first meandering amplification arm 1204 and the second meandering amplification arm 1206 collectively operate as a meandering dipole antenna that increases the maximum communication range (e.g., the maximum read range) associated with the RFID tag 100. For example, when the RFID tag 100 is mounted to the base 1202 of the bracket 1200 to form the RFID mountable bracket 1300 of FIGS. 13 and 14 as described above, the first meandering amplification arm 1204 and the second meandering amplification arm 1206 may increase the maximum communication range (e.g., the maximum read range) associated with the RFID tag 100 by a distance of twenty-five feet or more. In such examples, the maximum communication range associated with the mounted RFID tag 100 of the RFID mountable bracket 1300 of FIGS. 13 and 14 may be thirty feet or more at a center frequency of 915 MHz, in comparison to the maximum communication range of the RFID tag 100 in isolation (e.g., not mounted to the bracket 1200 of FIG. 12) being just five feet or less at a center frequency of 915 MHz.

Figure 15:
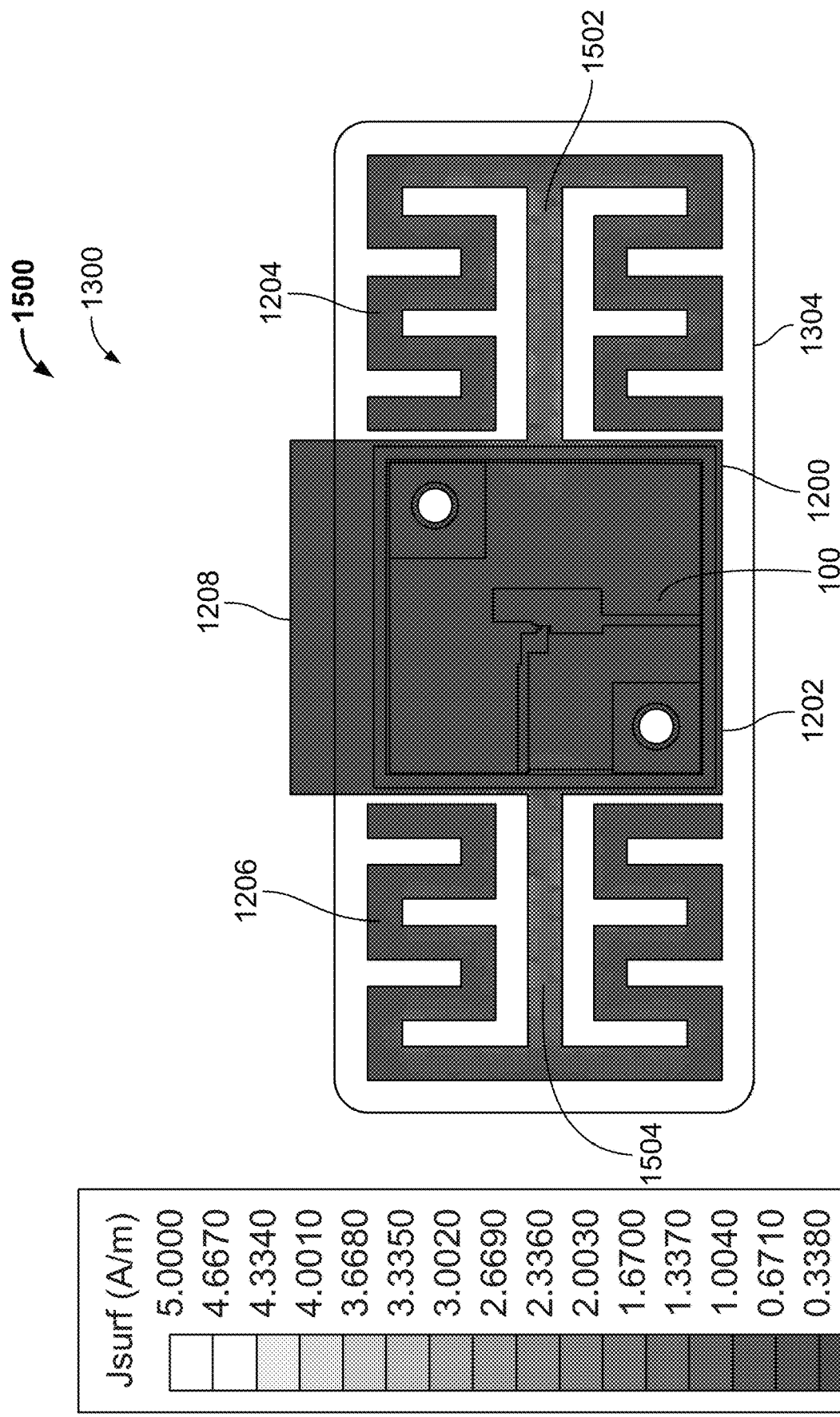
FIG. 15 is an example surface current density profile for the RFID mountable bracket of FIGS. 13 and 14.

FIG. 15 is an example surface current density profile 1500 for the RFID mountable bracket 1300 of FIGS. 13 and 14. The surface current density profile 1500 of FIG. 15 shows the surface current density for the RFID mountable bracket 1300 at a center frequency of 915 MHz. As shown in FIG. 15, the first meandering amplification arm 1204 and the second meandering amplification arm 1206 of the bracket 1200 collectively operate as a meandering dipole antenna and/or resonator for the RFID tag 100, with a majority of the resonant behavior occurring along a first example feed arm 1502 of the first meandering amplification arm 1204 and a second example feed arm 1504 of the second meandering amplification arm 1206.

Figure 16:
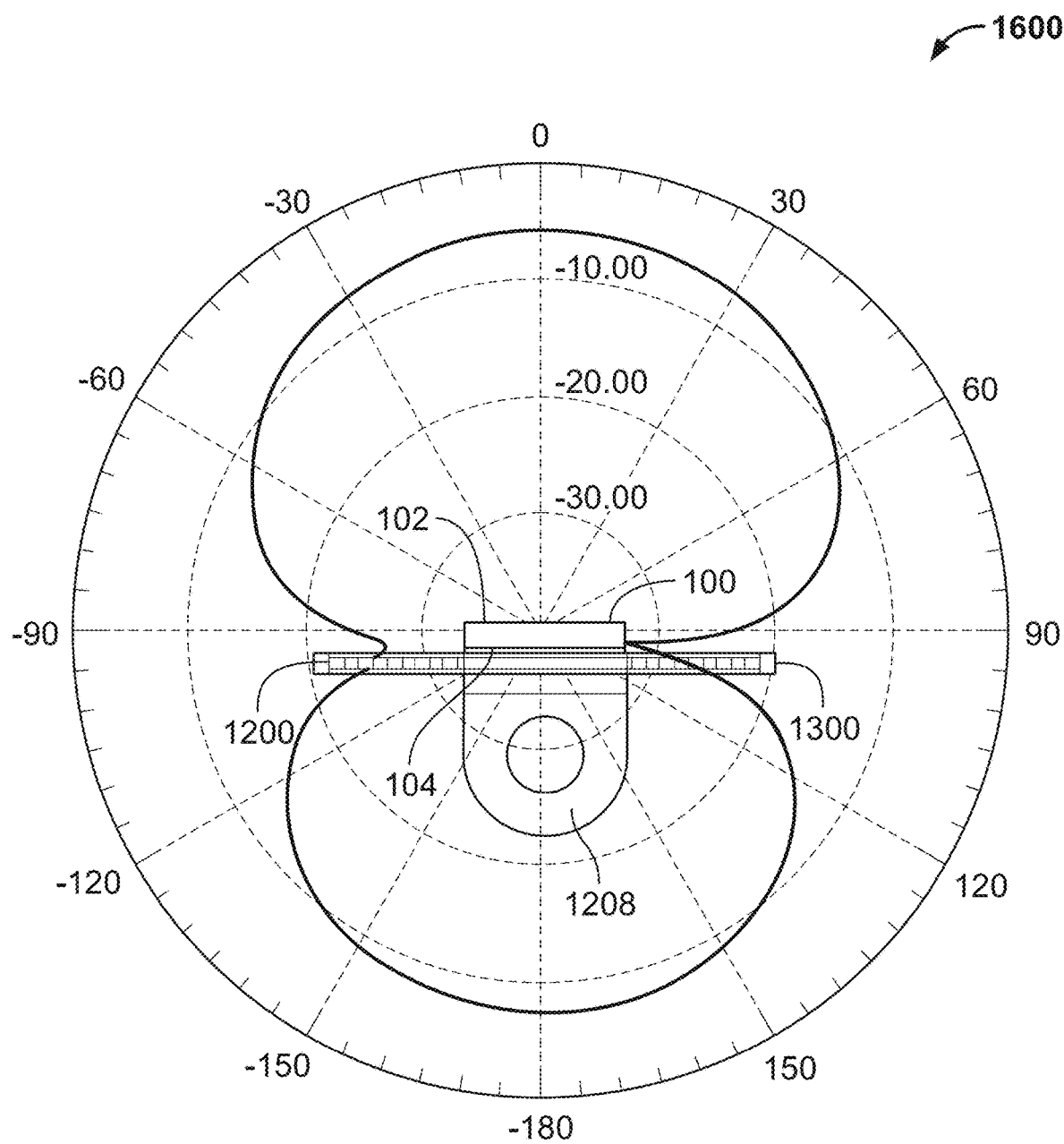
FIG. 16 is an example graph of antenna gain as a function of azimuthal angle for the RFID mountable bracket of FIGS. 13 and 14.

FIG. 16 is an example graph 1600 of antenna gain as a function of azimuthal angle for the RFID mountable bracket 1300 of FIGS. 13 and 14. In the illustrated example of FIG. 16, an azimuthal angle of zero degrees (0°) corresponds to the front surface 102 of the RFID tag 100, and an azimuthal angle of one hundred eighty degrees (180°) corresponds to the back surface 104 of the RFID tag 100. The maximum antenna gain associated with the RFID tag 100 in isolation is approximately −65 dBm at both the front surface 102 (e.g., at 0°) and the back surface (e.g., 180°) of the RFID tag 100. By comparison, the graph 1600 of FIG. 16 shows that the maximum antenna gain associated with the RFID mountable bracket 1300 is approximately −6 dBm at the front surface 102 (e.g., at 0°) of the RFID tag 100, and approximately −8 dBm at the back surface (e.g., 180°) of the RFID tag 100. Thus, the maximum antenna gain associated with the RFID tag 100 increases substantially in response to the RFID tag 100 being mounted to the bracket 1200 to form the RFID mountable bracket 1300 of FIGS. 13 and 14.

Figure 17:
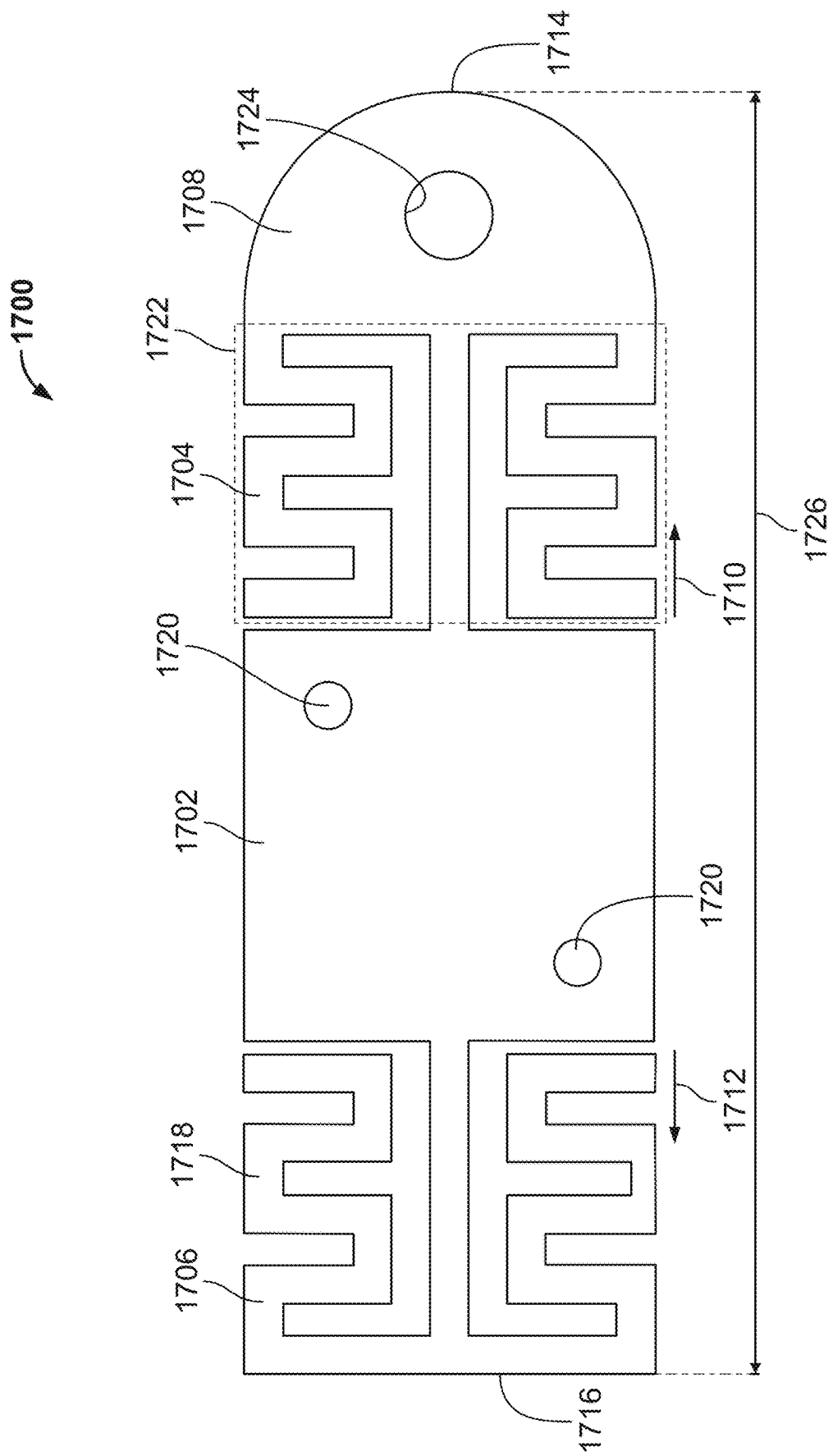
FIG. 17 is a front view of a fourth example bracket constructed in accordance with the teachings of this disclosure.
Figure 18:
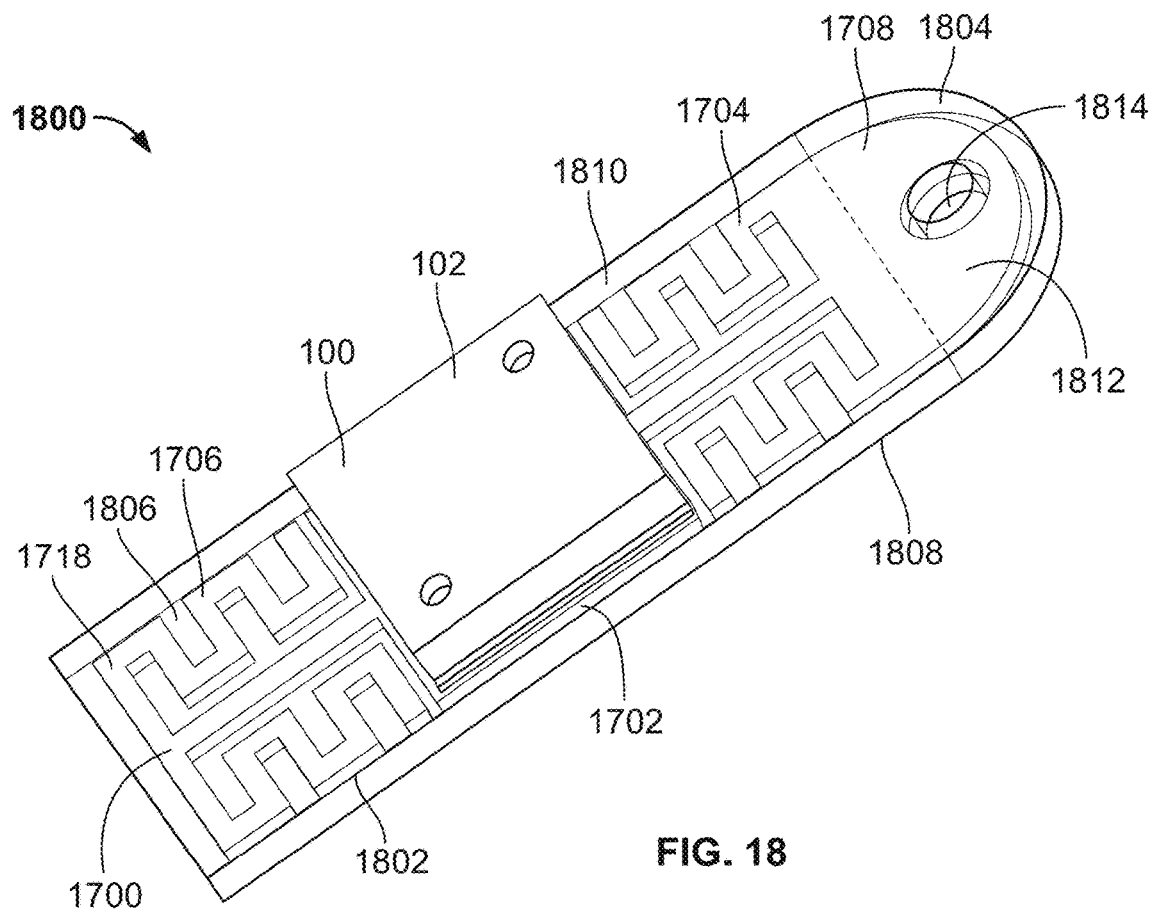
FIG. 18 is a perspective view of an example RFID hang tag including the RFID tag of FIG. 1 mounted to the bracket of FIG. 17.

FIG. 17 is a front view of a fourth example bracket 1700 constructed in accordance with the teachings of this disclosure. The bracket 1700 of FIG. 17 includes an example base 1702, a first example meandering amplification arm 1704, a second example meandering amplification arm 1706, and a hang tab 1708. The first meandering amplification arm 1704 is peripherally located relative to, and/or is connected to (e.g., integrally formed with) and generally extends away from the base 1702 in an example first direction 1710. The second meandering amplification arm 1706 is peripherally located relative to, and/or is connected to (e.g., integrally formed with) and generally extends away from the base 1702 in an example second direction 1712 opposite the first direction 1710. The hang tab 1708 is peripherally located relative to, and/or is connected to (e.g., integrally formed with) and extends away from the first meandering amplification arm 1704 in the first direction 1710. The hang tab 1708 forms and/or defines an example first end 1714 of the bracket 1700, and the second meandering amplification arm 1706 forms and/or defines an example second end 1716 of the bracket 1700 located opposite the first end 1714 of the bracket 1700. In the illustrated example of FIG. 17, the base 1702, the first meandering amplification arm 1704, the second meandering amplification arm 1706, the hang tab 1708 and/or, more generally, the bracket 1700 has/have an example front surface 1718 and an example back surface 1802 (e.g., as shown in FIG. 18) located opposite the front surface 1718. The base 1702, the first meandering amplification arm 1704, the second meandering amplification arm 1706, the hang tab 1708 and/or, more generally, the bracket 1700 is/are preferably formed from one or more conductive metallic material(s) of any thickness (e.g., sheet metal, metallic tape, a signal trace on a printed circuit board, etc.).

The base 1702 of the bracket 1700 of FIG. 17 includes example through holes 1720 passing from the front surface 1718 of the base 1702 through to the back surface 1802 of the base 1702. Respective ones of the through holes 1720 are configured to receive a corresponding fastener to fasten, couple, and/or mount the RFID tag 100 of FIG. 1 to the base 1702 of the bracket 1700. The fastener(s) associated with the through hole(s) 1720 may include, for example, one or more screw(s), bolt(s), rivet(s), stud(s), boss(es), band(s), cable tie(s), etc. In the illustrated example of FIG. 17, the base 1702 of the bracket 1700 includes a total of two through holes 1720, with the two through holes 1720 being respectively located relative to one another at diagonally-opposed corners of the base 1702. In other examples, the base 1702 of the bracket 1700 may include a different number of through holes 1720 (e.g., one, three, four, etc.), and such through holes 1720 may be located at positions differing from those shown in FIG. 17.

In the illustrated example of FIG. 17, the base 1702 of the bracket 1700 has a flat, rectangular shape. For example, as shown in FIG. 17, the base 1702 of the bracket 1700 has a length of approximately 32.0 millimeters and a width of approximately 32.0 millimeters, where the length and width are the dimensions of the front surface 1718 of the base 1702. The base 1702 of the bracket 1700 additionally has a thickness of approximately 2.0 millimeters, where the thickness is the dimension between the front surface 1718 and the back surface 1802 of the base 1702. In other examples, the base 1702 of the bracket 1700 of FIG. 17 may have a shape and/or dimensions differing from that/those described above. For example, the base 1702 may have a circular shape, an elliptical shape, a triangular shape, etc., or may have dimensions that are greater than or less than the dimensions described above.

The first meandering amplification arm 1704 of the bracket 1700 of FIG. 17 has an example meandering configuration 1722 that facilitates amplifying an antenna gain associated with an RFID tag (e.g., the RFID tag 100 of FIG. 1) to be mounted to the bracket 1700. The meandering configuration 1722 of the first meandering amplification arm 1704 is described in greater detail below in connection with FIG. 38. In the illustrated example of FIG. 17, the second meandering amplification arm 1706 of the bracket 1700 has the same meandering configuration 1722 implemented by the first meandering amplification arm 1704 of the bracket 1700. In other examples, the second meandering amplification arm 1706 of the bracket 1700 can have a meandering configuration that differs from the meandering configuration 1722 implemented by the first meandering amplification arm 1704 of the bracket 1700. Example alternate meandering configurations that may be implemented by either or both of the first meandering amplification arm 1704 and/or the second meandering amplification arm 1706 of the bracket 1700 of FIG. 17 are described in greater detail below in connection with FIGS. 39 and 44.

In the illustrated example of FIG. 17, the first meandering amplification arm 1704 and the second meandering amplification arm 1706 of the bracket 1700 respectively have flat, generally rectangular shapes. For example, as shown in FIG. 17, the first meandering amplification arm 1704 of the bracket 1700 has an overall length of approximately 17.0 millimeters and an overall width of approximately 32.0 millimeters, where the overall length and overall width are the general dimensions of the front surface 1718 of the first meandering amplification arm 1704. The first meandering amplification arm 1704 of the bracket 1700 additionally has a thickness of approximately 2.0 millimeters, where the thickness is the dimension between the front surface 1718 and the back surface 1802 of the first meandering amplification arm 1704. The second meandering amplification arm 1706 is similarly shaped and/or dimensioned to have a shape and/or dimensions that match that/those of the first meandering amplification arm 1704. In other examples, the first meandering amplification arm 1704 and/or the second meandering amplification arm 1706 of the bracket 1700 of FIG. 17 may have a shape and/or dimensions differing from that/those described above. For example, the first meandering amplification arm 1704 and/or the second meandering amplification arm 1706 may have a circular shape, an elliptical shape, a triangular shape, etc., or may have dimensions that are greater than or less than the dimensions described above.

The hang tab 1708 of the bracket 1700 of FIG. 17 includes an example through hole 1724 located proximate the first end 1714 of the bracket 1700 and passing from the front surface 1718 of the hang tab 1708 through to the back surface 1802 of the hang tab 1708. The through hole 1724 is configured to receive a fastener to facilitate hanging the bracket 1700 from and/or otherwise coupling the bracket 1700 to an object (e.g., a field device). The fastener associated with the through hole 1724 may include, for example, a cable tie, a cable, a wire, a string, a band, etc. As shown in FIG. 17, the hang tab 1708 of the bracket 1700 is coplanar with the base 1702, the first meandering amplification arm 1704, and the second meandering amplification arm 1706 of the bracket 1700. In other examples, the hang tab 1708 of the bracket 1700 can instead be bent and/or positioned at an angle relative to one or more of the base 1702, the first meandering amplification arm 1704, and/or the second meandering amplification arm 1706 of the bracket 1700.

In the illustrated example of FIG. 17, the hang tab 1708 of the bracket 1700 has a flat, generally hemispherical shape. For example, as shown in FIG. 17, the hang tab 1708 of the bracket 1700 has an overall length of approximately 16.0 millimeters and an overall width of approximately 32.0 millimeters, where the overall length and overall width are the general dimensions of the front surface 1718 of the hang tab 1708. The hang tab 1708 of the bracket 1700 additionally has a thickness of approximately 2.0 millimeters, where the thickness is the dimension between the front surface 1718 and the back surface 1802 of the hang tab 1708. In other examples, the hang tab 1708 of the bracket 1700 of FIG. 17 may have a shape and/or dimensions differing from that/those described above. For example, the hang tab 1708 may have an annular and/or arc-like shape, a circular shape, a rectangular shape, an elliptical shape, a triangular shape, etc., or may have dimensions that are greater than or less than the dimensions described above.

In the illustrated example of FIG. 17, an example distance 1726 between the first end 1714 and the second end 1716 of the bracket 1700 is approximately 100.0 millimeters. In other examples, the distance 1726 between the first end 1714 and the second end 1716 of the bracket 1700 may range in value from approximately 80.0 millimeters to approximately 120.0 millimeters. In some examples, the distance 1726 between the first end 1714 and the second end 1716 of the bracket 1700 preferably does not exceed a distance value equal to one-half of the wavelength of the radio frequency (e.g., a 915 Mhz center frequency) at which an RFID tag (e.g., the RFID tag 100 of FIG. 1) to be mounted to the bracket 1700 operates and/or is responsive to.

Figure 19:
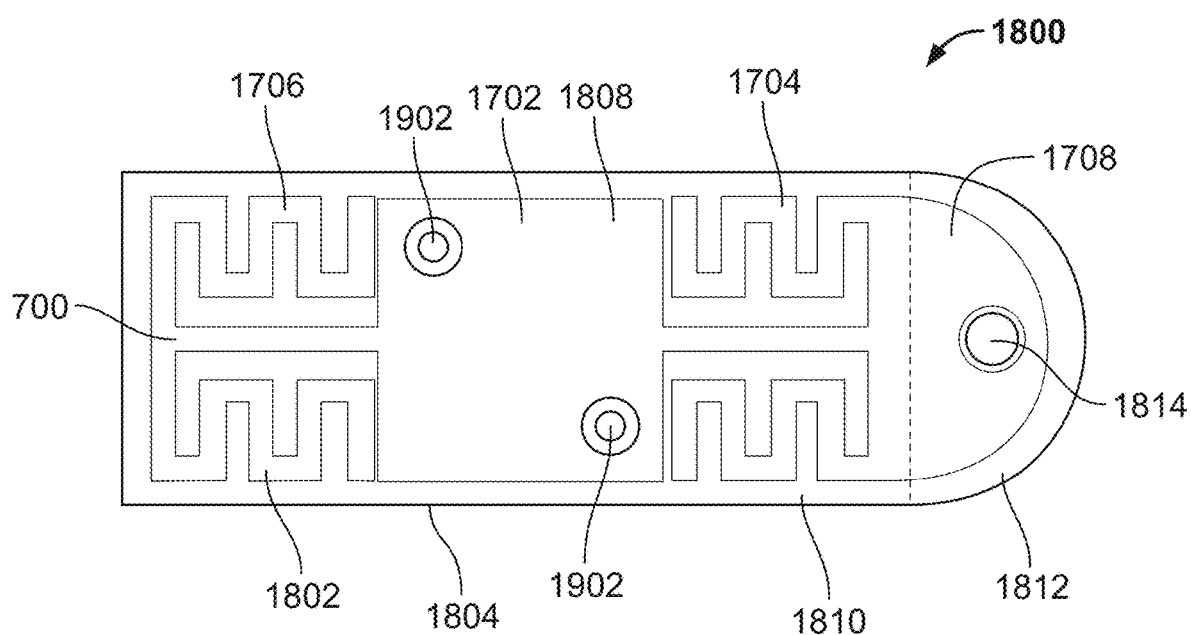
FIG. 19 is a rear view of the RFID hang tag of FIG. 18.

FIG. 18 is a perspective view of an example RFID hang tag 1800 including the RFID tag 100 of FIG. 1 mounted to the bracket 1700 of FIG. 17. FIG. 19 is a rear view of the RFID hang tag 1800 of FIG. 18. The RFID hang tag 1800 of FIGS. 18 and 19 includes an example casing 1804 having an example front surface 1806 oriented in a same direction as the front surface 1718 of the bracket 1700, and an example back surface 1808 located opposite the front surface 1806 and oriented in a same direction as the back surface 1802 of the bracket 1700. The casing 1804 supports and/or encases the first meandering amplification arm 1704 and the second meandering amplification arm 1706 of the bracket 1700 to increase the mechanical integrity thereof relative to the base 1702 of the bracket 1700 (e.g., to prevent bending of the first meandering amplification arm 1704 and/or the second meandering amplification arm 1706 relative to the base 1702 of the bracket 1700).

The casing 1804 of FIGS. 18 and 19 is configured (e.g., sized, shaped, and/or structured to cover, house, and/or encase at least a portion (e.g., substantially all) of the bracket 1700 of FIG. 17. For example, as shown in FIGS. 18 and 19, the casing 1804 covers, houses, and/or encases the substantial entirety of the bracket 1700 of FIG. 17 with the exception of the front surface 1718 of the of the base 1702 of the bracket 1700, which is an area reserved for placement and/or mounting of the RFID tag 100. The casing 1804 is preferably formed from a non-conductive material, such as plastic, rubber, ceramic, or porcelain. Forming the casing 1804 from such a non-conductive material advantageously shields and/or insulates the encased components (e.g., the first meandering amplification arm 1704 and the second meandering amplification arm 1706) of the bracket 1700 of the RFID hang tag 1800 from contacting one or more metallic component(s) of an object (e.g., a field device) from which the RFID hang tag 1800 may be hung, or to which the RFID hang tag 1800 may be coupled, The casing 1804 of FIGS. 18 and 19 includes an example first portion 1810 configured (e.g., sized, shaped, and/or structured) to cover, house, and/or encase the base 1702, the first meandering amplification arm 1704, and the second meandering amplification arm 1706 of the bracket 1700 as described above, and an example second portion 1812 connected to and extending away from the first portion 1810 and configured (e.g., sized, shaped, and/or structured) to encase the hang tab 1708 of the bracket 1700 as described above. In the illustrated example of FIGS. 18 and 19, the first portion 1810 of the casing 1804 has a flat, generally rectangular shape corresponding to the flat, generally rectangular shape of the base 1702, the first meandering amplification arm 1704, and the second meandering amplification arm 1706 of the bracket 1700. The second portion 1812 of the casing 1804 has a flat, generally hemispherical shape corresponding to the flat, generally hemispherical shape of the hang tab 1708 of the bracket 1700. In other examples, the first portion 1810 and/or the second portion 1812 of the casing 1804 may have a shape that differs from that shown in FIGS. 18 and 19.

In the illustrated example of FIGS. 18 and 19, the first portion 1810 of the casing 1804 includes example through holes 1902 passing through the back surface 1808 of the casing 1804 and positioned in alignment with the above-described through holes 1720 of the base 1702 of the bracket 1700. The RFID hang tag 1800 of FIGS. 18 and 19 is formed by positioning the RFID tag 100 on the base 1702 of the bracket 1700 (e.g., with the bracket 1700 being at least partially encased by the casing 1804) such that the back surface 104 of the RFID tag 100 faces and/or is in contact with the front surface 1718 of the base 1702 of the bracket 1700. When positioned on the bracket 1700 as shown in FIGS. 18 and 19, the RFID tag 100 can be fastened, coupled, and/or mounted to the bracket 1700 via fasteners (e.g., threaded rivets) passing from the back surface 1808 of the casing 1804, through the through holes 1902 of the casing 1804, through the through holes 1720 of the base 1702 of the bracket 1700, and into the through holes 106 of the RFID tag 100.

In the illustrated example of FIGS. 18 and 19, the second portion 1812 of the casing 1804 includes an example through hole 1814 passing from the front surface 1806 of the casing 1804 through to the back surface 1808 of the casing 1804, and positioned in alignment with the above-described through hole 1724 of the hang tab 1708 of the bracket 1700. The assembled RFID hang tag 1800 of FIGS. 18 and 19 is structured to be hung from an object (e.g., a field device) via a fastener (e.g., a cable tie, a cable, a wire, a string, a band, etc.) passing through the through hole 1814 formed in the casing 1804 and the through hole 1724 formed in the hang tab 1708.

In the illustrated example of FIGS. 18 and 19, the first meandering amplification arm 1704 and the second meandering amplification arm 1706 of the bracket 1700 respectively amplify an antenna gain associated with the RFID tag 100 (e.g., a gain of an internal antenna of the RFID tag 100). By amplifying the antenna gain associated with the RFID tag 100, the first meandering amplification arm 1704 and the second meandering amplification arm 1706 collectively operate as a meandering dipole antenna that increases the maximum communication range (e.g., the maximum read range) associated with the RFID tag 100. For example, when the RFID tag 100 is mounted to the base 1702 of the bracket 1700 to form the RFID hang tag 1800 of FIGS. 18 and 19 as described above, the first meandering amplification arm 1704 and the second meandering amplification arm 1706 may increase the maximum communication range (e.g., the maximum read range) associated with the RFID tag 100 by a distance of fifteen feet or more. In such examples, the maximum communication range associated with the mounted RFID tag 100 of the RFID hang tag 1800 may be twenty feet or more at a center frequency of 915 MHz, in comparison to the maximum communication range of the RFID tag 100 in isolation (e.g., not mounted to the bracket 1700 of FIG. 17) being just five feet or less at a center frequency of 915 MHz.

FIG. 20 is an example surface current density profile 2000 for the RFID hang tag 1800 of FIGS. 18 and 19. The surface current density profile 2000 of FIG. 20 shows the surface current density for the RFID hang tag 1800 at a center frequency of 915 MHz. As shown in FIG. 20, the first meandering amplification arm 1704 and the second meandering amplification arm 1706 of the bracket 1700 collectively operate as a meandering dipole antenna and/or resonator for the RFID tag 100, with a majority of the resonant behavior occurring along a first example feed arm 2002 of the first meandering amplification arm 1704 and a second example feed arm 2004 of the second meandering amplification arm 1706. The through hole 1724 formed in the hang tab 1708 of the bracket 1700 is located in a quiescent region of the hang tab 1708, thereby enabling the RFID hang tag 1800 of FIGS. 18 and 19 to be hung in a vertical orientation from a metallic object (e.g., a metallic casing of a field device) via a metallic fastener (e.g., a metal wire) passing through the through hole 1724 without the metallic fastener crossing the resonating portions of the first meandering amplification arm 1704 and/or the second meandering amplification arm 1706 of the bracket 1700.

Figure 21:
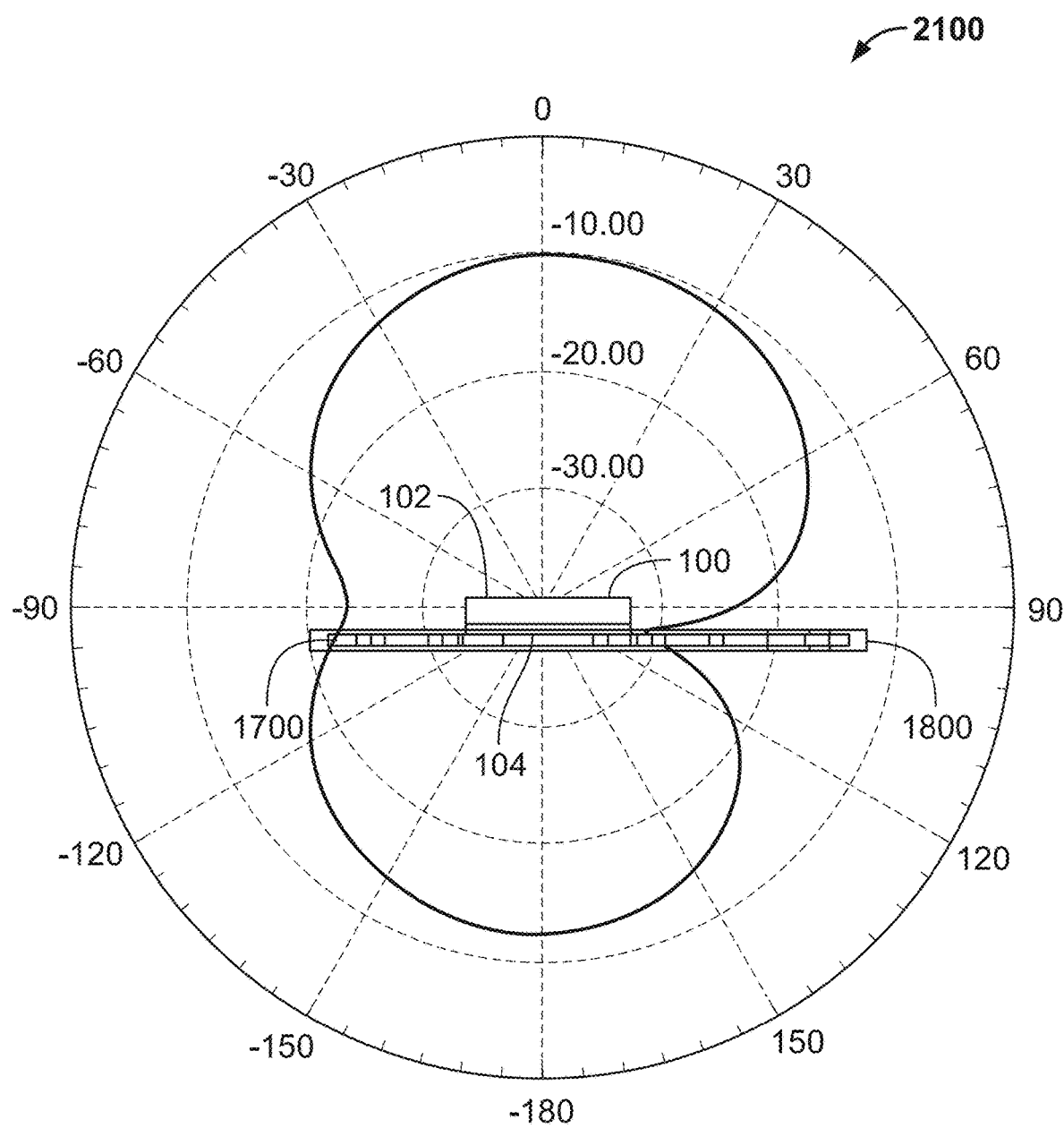
FIG. 21 is an example graph of antenna gain as a function of azimuthal angle for the RFID hang tag of FIGS. 18 and 19.

FIG. 21 is an example graph 2100 of antenna gain as a function of azimuthal angle for the RFID hang tag 1800 of FIGS. 18 and 19. In the illustrated example of FIG. 21, an azimuthal angle of zero degrees (0°) corresponds to the front surface 102 of the RFID tag 100, and an azimuthal angle of one hundred eighty degrees (180°) corresponds to the back surface 104 of the RFID tag 100. The maximum antenna gain associated with the RFID tag 100 in isolation is approximately −65 dBm at both the front surface 102 (e.g., at 0°) and the back surface (e.g., 180°) of the RFID tag 100. By comparison, the graph 2100 of FIG. 21 shows that the maximum antenna gain associated with the RFID hang tag 1800 is approximately −10 dBm at the front surface 102 (e.g., at 0°) of the RFID tag 100, and approximately −12 dBm at the back surface (e.g., 180°) of the RFID tag 100. Thus, the maximum antenna gain associated with the RFID tag 100 increases substantially in response to the RFID tag 100 being mounted to the bracket 1700 to form the RFID hang tag 1800 of FIGS. 18 and 19.

Figure 22:
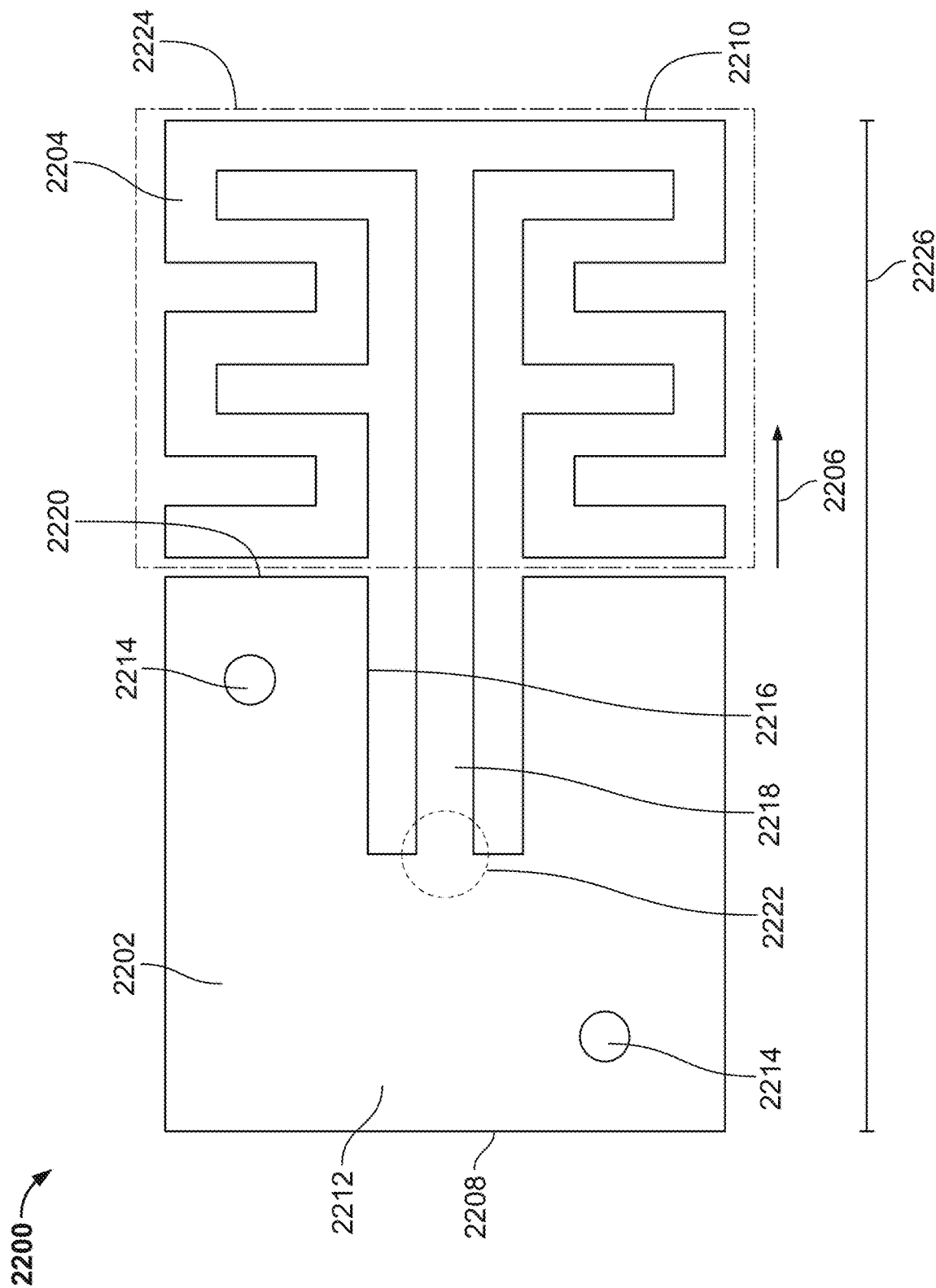
FIG. 22 is a front view of a fifth example bracket constructed in accordance with the teachings of this disclosure.
Figure 23:
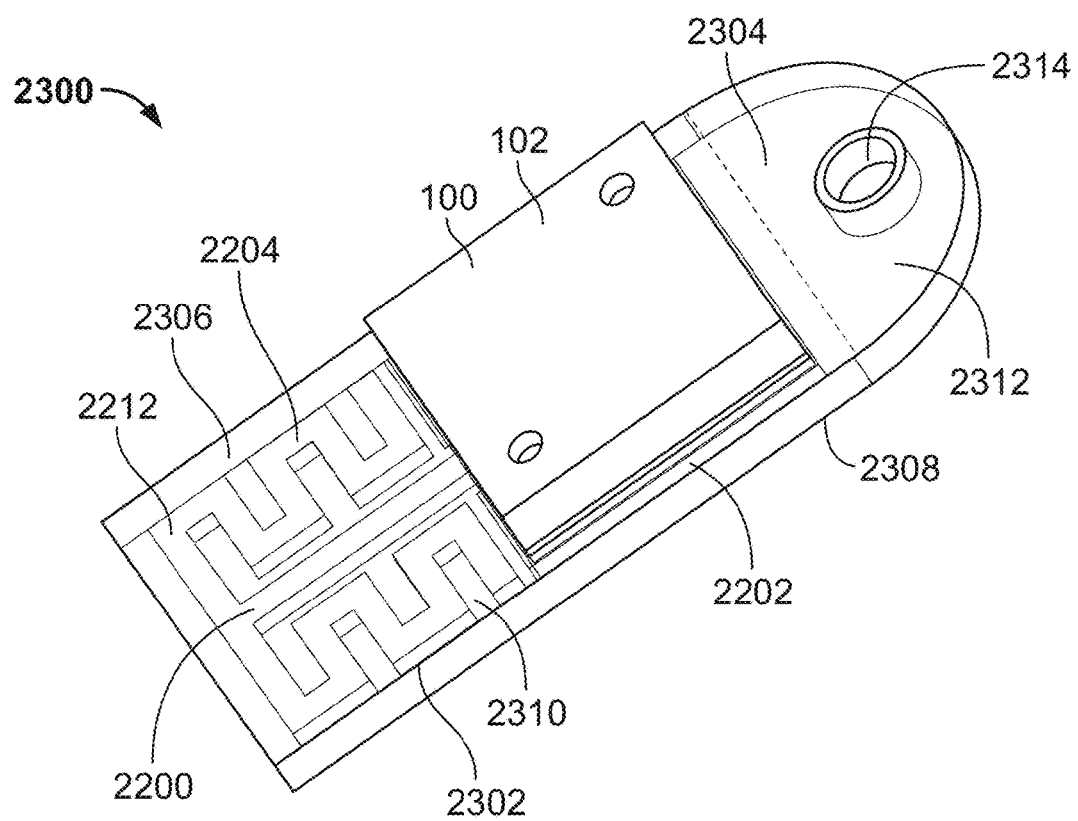
FIG. 23 is a perspective view of an example RFID hang tag including the RFID tag of FIG. 1 mounted to the bracket of FIG. 22.

FIG. 22 is a front view of a fifth example bracket 2200 constructed in accordance with the teachings of this disclosure. The bracket 2200 of FIG. 22 includes an example base 2202 and an example meandering amplification arm 2204. The meandering amplification arm 2204 is peripherally located relative to, and/or is connected to (e.g., integrally formed with) and generally extends away from the base 2202 in an example first direction 2206. The base 2202 forms and/or defines an example first end 2208 of the bracket 2200, and the meandering amplification arm 2204 forms and/or defines an example second end 2210 of the bracket 2200 located opposite the first end 2208 of the bracket 2200. In the illustrated example of FIG. 22, the base 2202, the meandering amplification arm 2204, and/or, more generally, the bracket 2200 has/have an example front surface 2212 and an example back surface 2302 (e.g., as shown in FIG. 23) located opposite the front surface 2212. The base 2202, the meandering amplification arm 2204, and/or, more generally, the bracket 2200 is/are preferably formed from one or more conductive metallic material(s) of any thickness (e.g., sheet metal, metallic tape, a signal trace on a printed circuit board, etc.).

The base 2202 of the bracket 2200 of FIG. 22 includes example through holes 2214 passing from the front surface 2212 of the base 2202 through to the back surface 2302 of the base 2202. Respective ones of the through holes 2214 are configured to receive a corresponding fastener to fasten, couple, and/or mount the RFID tag 100 of FIG. 1 to the base 2202 of the bracket 2200. The fastener(s) associated with the through hole(s) 2214 may include, for example, one or more screw(s), bolt(s), rivet(s), stud(s), boss(es), band(s), cable tie(s), etc. In the illustrated example of FIG. 22, the base 2202 of the bracket 2200 includes a total of two through holes 2214, with the two through holes 2214 being respectively located relative to one another at diagonally-opposed corners of the base 2202. In other examples, the base 2202 of the bracket 2200 may include a different number of through holes 2214 (e.g., one, three, four, etc.), and such through holes 1018 may be located at positions differing from those shown in FIG. 10.

The base 2202 of the bracket 2200 of FIG. 22 further includes an example notch 2216 and an example feed arm 2218. In the illustrated example of FIG. 22, the notch 2216 is located centrally along, and extends inwardly from, an example edge 2220 of the base 2202 that is adjacent the meandering amplification arm 2204 of the bracket 2200. The feed arm 2218 of the base 2202 is positioned centrally within the notch 2216, and extends from an example center portion 2222 of the base 2202 outwardly past the edge 2220 of the base 2202, thereafter connecting to and/or merging with (e.g., being integrally formed with) the meandering amplification arm 2204 of the bracket 2200. In some examples, the feed arm 2218 of the base 2202 is aligned (e.g., longitudinally aligned) with an internal antenna of an RFID tag (e.g., an internal antenna of the RFID tag 100 of FIG. 1) to be mounted to the base 2202 of the bracket 2200. Aligning the feed arm 2218 of the base 2202 with an internal antenna of an RFID tag mounted to the base 2202 further enhances the antenna gain improvements provided by the meandering amplification arm 2204 of the bracket 2200, as further described below.

In the illustrated example of FIG. 22, the base 2202 of the bracket 2200 has a flat, generally rectangular shape. For example, as shown in FIG. 22, the base 2202 of the bracket 2200 has a length of approximately 32.0 millimeters and a width of approximately 32.0 millimeters, where the length and width are the dimensions of the front surface 2212 of the base 2202. The base 2202 of the bracket 2200 additionally has a thickness of approximately 2.0 millimeters, where the thickness is the dimension between the front surface 2212 and the back surface 2302 of the base 2202. In other examples, the base 2202 of the bracket 2200 of FIG. 22 may have a shape and/or dimensions differing from that/those described above. For example, the base 2202 may have a circular shape, an elliptical shape, a triangular shape, etc., or may have dimensions that are greater than or less than the dimensions described above.

The meandering amplification arm 2204 of the bracket 2200 of FIG. 22 has an example meandering configuration 2224 that facilitates amplifying an antenna gain associated with an RFID tag (e.g., the RFID tag 100 of FIG. 1) to be mounted to the bracket 2200. The meandering configuration 2224 of the meandering amplification arm 2204 is described in greater detail below in connection with FIG. 38. Example alternate meandering configurations that may be implemented by the meandering amplification arm 2204 of the bracket 2200 of FIG. 22 are described in greater detail below in connection with FIGS. 39 and 44.

In the illustrated example of FIG. 22, the meandering amplification arm 2204 of the bracket 2200 has a flat, generally rectangular shape. For example, as shown in FIG. 22, the meandering amplification arm 2204 of the bracket 2200 has an overall length of approximately 26.0 millimeters and an overall width of approximately 32.0 millimeters, where the overall length and overall width are the general dimensions of the front surface 2212 of the meandering amplification arm 2204. The meandering amplification arm 2204 of the bracket 2200 additionally has a thickness of approximately 2.0 millimeters, where the thickness is the dimension between the front surface 2212 and the back surface 2302 of the meandering amplification arm 2204. In other examples, the meandering amplification arm 2204 of the bracket 2200 of FIG. 22 may have a shape and/or dimensions differing from that/those described above. For example, the meandering amplification arm 2204 may have a circular shape, an elliptical shape, a triangular shape, etc., or may have dimensions that are greater than or less than the dimensions described above.

In the illustrated example of FIG. 22, an example distance 2226 between the first end 2208 and the second end 2210 of the bracket 2200 is approximately 58.0 millimeters. In other examples, the distance 2226 between the first end 2208 and the second end 2210 of the bracket 2200 may range in value from approximately 48.0 millimeters to approximately 68.0 millimeters. In some examples, the distance 2226 between the first end 2208 and the second end 2210 of the bracket 2200 preferably does not exceed a distance value equal to one-half of the wavelength of the radio frequency (e.g., a 915 Mhz center frequency) at which an RFID tag (e.g., the RFID tag 100 of FIG. 1) to be mounted to the bracket 2200 operates and/or is responsive to.

Figure 24:
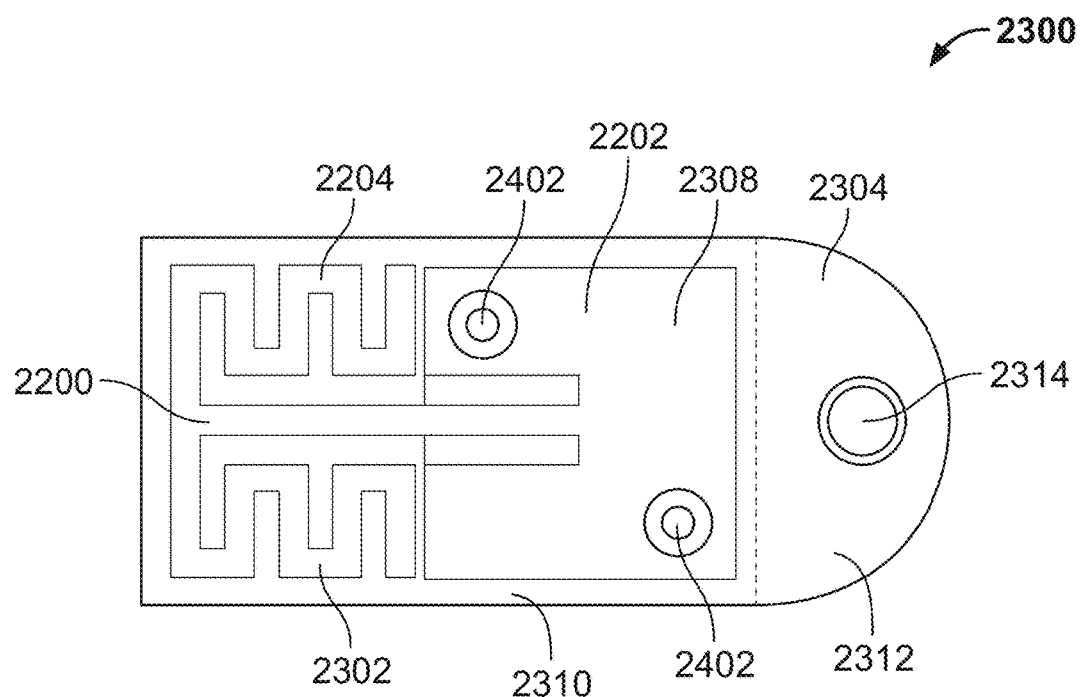
FIG. 24 is a rear view of the RFID hang tag of FIG. 23.

FIG. 23 is a perspective view of an example RFID hang tag 2300 including the RFID tag 100 of FIG. 1 mounted to the bracket 2200 of FIG. 22. FIG. 24 is a rear view of the RFID hang tag 2300 of FIG. 23. The RFID hang tag 2300 of FIGS. 23 and 24 includes an example casing 2304 having an example front surface 2306 oriented in a same direction as the front surface 2212 of the bracket 2200, and an example back surface 2308 located opposite the front surface 2306 and oriented in a same direction as the back surface 2302 of the bracket 2200. The casing 2304 supports and/or encases the meandering amplification arm 2204 of the bracket 2200 to increase the mechanical integrity thereof relative to the base 2202 of the bracket 2200 (e.g., to prevent bending of the meandering amplification arm 2204 relative to the base 2202 of the bracket 2200).

The casing 2304 of FIGS. 23 and 24 is configured (e.g., sized, shaped, and/or structured to cover, house, and/or encase at least a portion (e.g., substantially all) of the bracket 2200 of FIG. 22. For example, as shown in FIGS. 23 and 24, the casing 2304 covers, houses, and/or encases the substantial entirety of the bracket 2200 of FIG. 22 with the exception of the front surface 2212 of the of the base 2202 of the bracket 2200, which is an area reserved for placement and/or mounting of the RFID tag 100. The casing 2304 is preferably formed from a non-conductive material, such as plastic, rubber, ceramic, or porcelain. Forming the casing 2304 from such a non-conductive material advantageously shields and/or insulates the encased components (e.g., the meandering amplification arm 2204) of the bracket 2200 of the RFID hang tag 2300 from contacting one or more metallic component(s) of an object (e.g., a field device) from which the RFID hang tag 2300 may be hung, or to which the RFID hang tag 2300 may be coupled.

The casing 2304 of FIGS. 23 and 24 includes an example first portion 2310 configured (e.g., sized, shaped, and/or structured) to cover, house, and/or encase the bracket 2200 as described above, and an example second portion 2312 connected to and extending away from the first portion 2310 and configured (e.g., sized, shaped, and/or structured) to support a through hole to be spaced apart from the bracket 2200. In the illustrated example of FIGS. 23 and 24, the first portion 2310 of the casing 2304 has a flat, generally rectangular shape corresponding to the flat, generally rectangular shape of the bracket 2200. The second portion 2312 of the casing 2304 has a flat, generally hemispherical shape corresponding in width to the width of the first portion 2310 of the casing 2304. In other examples, the first portion 2310 and/or the second portion 2312 of the casing 2304 may have a shape that differs from that shown in FIGS. 23 and 24.

The first portion 2310 of the casing 2304 of FIGS. 23 and 24 includes example through holes 2402 passing through the back surface 2308 of the casing 2304 and positioned in alignment with the above-described through holes 2214 of the base 2202 of the bracket 2200. The RFID hang tag 2300 of FIGS. 23 and 24 is formed by positioning the RFID tag 100 on the base 2202 of the bracket 2200 (e.g., with the bracket 2200 being at least partially encased by the casing 2304) such that the back surface 104 of the RFID tag 100 faces and/or is in contact with the front surface 2212 of the base 2202 of the bracket 2200. When positioned on the bracket 2200 as shown in FIGS. 23 and 24, the RFID tag 100 can be fastened, coupled, and/or mounted to the bracket 2200 via fasteners (e.g., threaded rivets) passing from the back surface 2308 of the casing 2304, through the through holes 2402 of the casing 2304, through the through holes 2214 of the base 2202 of the bracket 2200, and into the through holes 106 of the RFID tag 100.

The second portion 2312 of the casing 2304 of FIGS. 23 and 24 includes an example through hole 2314 spaced apart from the bracket 2200 and passing from the front surface 2306 of the casing 2304 through to the back surface 2308 of the casing 2304. The assembled RFID hang tag 2300 of FIGS. 23 and 24 is structured to be hung from an object (e.g., a field device) via a fastener (e.g., a cable tie, a cable, a wire, a string, a band, etc.) passing through the through hole 2314 formed in the casing 2304.

In the illustrated example of FIGS. 23 and 24, the meandering amplification arm 2204 of the bracket 2200 amplifies an antenna gain associated with the RFID tag 100 (e.g., a gain of an internal antenna of the RFID tag 100). In response to amplifying the antenna gain associated with the RFID tag 100, the meandering amplification arm 2204 operates as a meandering monopole antenna that increases the maximum communication range (e.g., the maximum read range) associated with the RFID tag 100. For example, when the RFID tag 100 is mounted to the base 2202 of the bracket 2200 to form the RFID hang tag 2300 of FIGS. 23 and 24 as described above, the meandering amplification arm 2204 may increase the maximum communication range (e.g., the maximum read range) associated with the RFID tag 100 by a distance of thirty feet or more. In such examples, the maximum communication range associated with the mounted RFID tag 100 of the RFID hang tag 2300 may be thirty-five feet or more at a center frequency of 915 MHz, in comparison to the maximum communication range of the RFID tag 100 in isolation (e.g., not mounted to the bracket 2200 of FIG. 22) being just five feet or less at a center frequency of 915 MHz.

FIG. 25 is an example surface current density profile 2500 for the RFID hang tag 2300 of FIGS. 23 and 24. The surface current density profile 2500 of FIG. 25 shows the surface current density for the RFID hang tag 2300 at a center frequency of 915 MHz. As shown in FIG. 25, the meandering amplification arm 2204 of the bracket 2200 operates as a meandering monopole antenna and/or resonator for the RFID tag 100, with a majority of the resonant behavior occurring along an example feed arm 2502 of the meandering amplification arm 2204. Heightened resonant behavior is also visible along the feed arm 2218 of the base 2202 of the bracket 2200.

Figure 26:
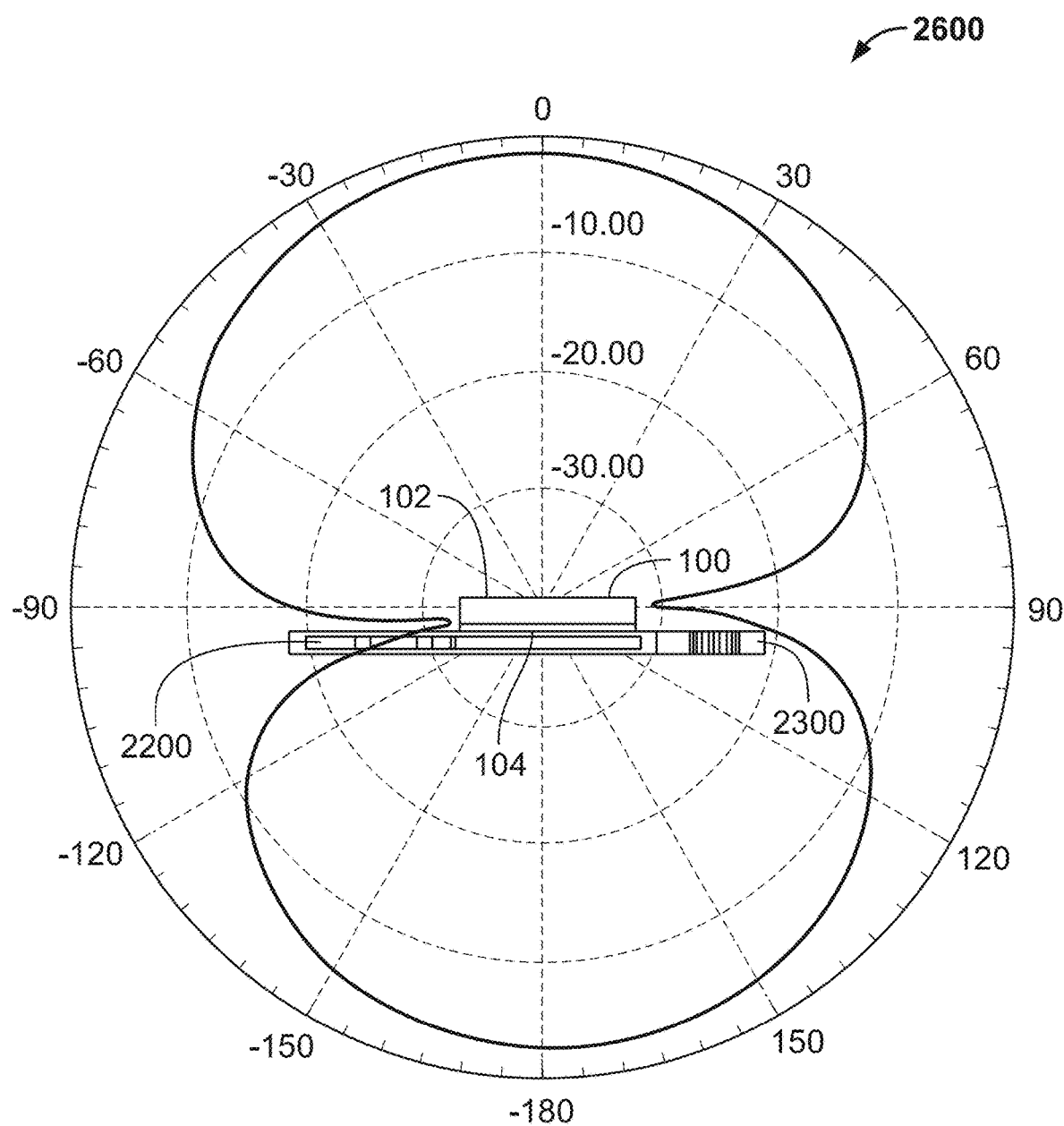
FIG. 26 is an example graph of antenna gain as a function of azimuthal angle for the RFID hang tag of FIGS. 23 and 24.

FIG. 26 is an example graph 2600 of antenna gain as a function of azimuthal angle for the RFID hang tag 2300 of FIGS. 23 and 24. In the illustrated example of FIG. 26, an azimuthal angle of zero degrees (0°) corresponds to the front surface 102 of the RFID tag 100, and an azimuthal angle of one hundred eighty degrees (180°) corresponds to the back surface 104 of the RFID tag 100. The maximum antenna gain associated with the RFID tag 100 in isolation is approximately −65 dBm at both the front surface 102 (e.g., at 0°) and the back surface (e.g., 180°) of the RFID tag 100. By comparison, the graph 2600 of FIG. 26 shows that the maximum antenna gain associated with the RFID hang tag 2300 is approximately −2 dBm at the front surface 102 (e.g., at 0°) of the RFID tag 100, and approximately −3 dBm at the back surface (e.g., 180°) of the RFID tag 100. Thus, the maximum antenna gain associated with the RFID tag 100 increases substantially in response to the RFID tag 100 being mounted to the bracket 2200 to form the RFID hang tag 2300 of FIGS. 23 and 24.

Figure 27:
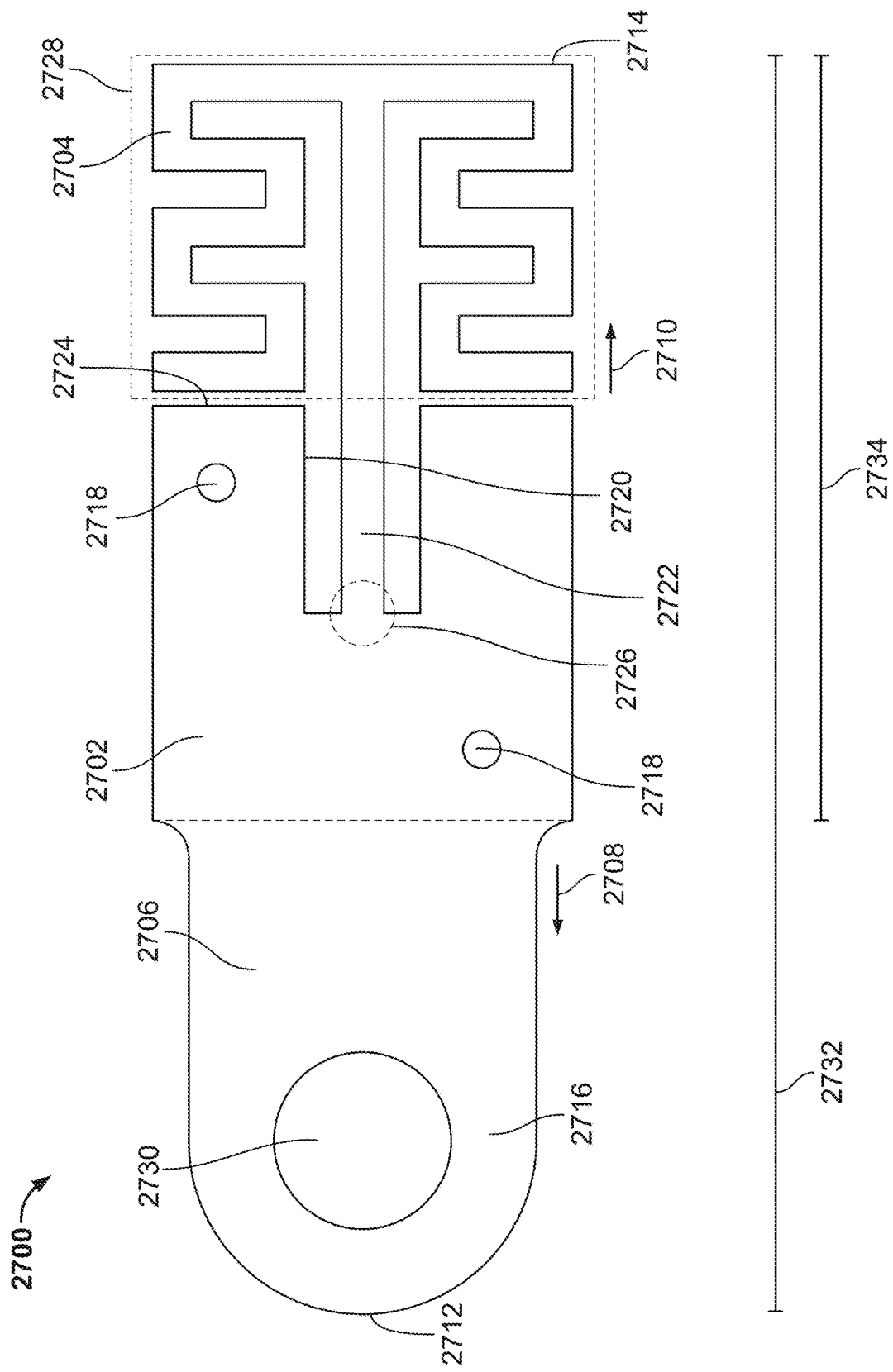
FIG. 27 is a front view of a sixth example bracket constructed in accordance with the teachings of this disclosure.
Figure 28:
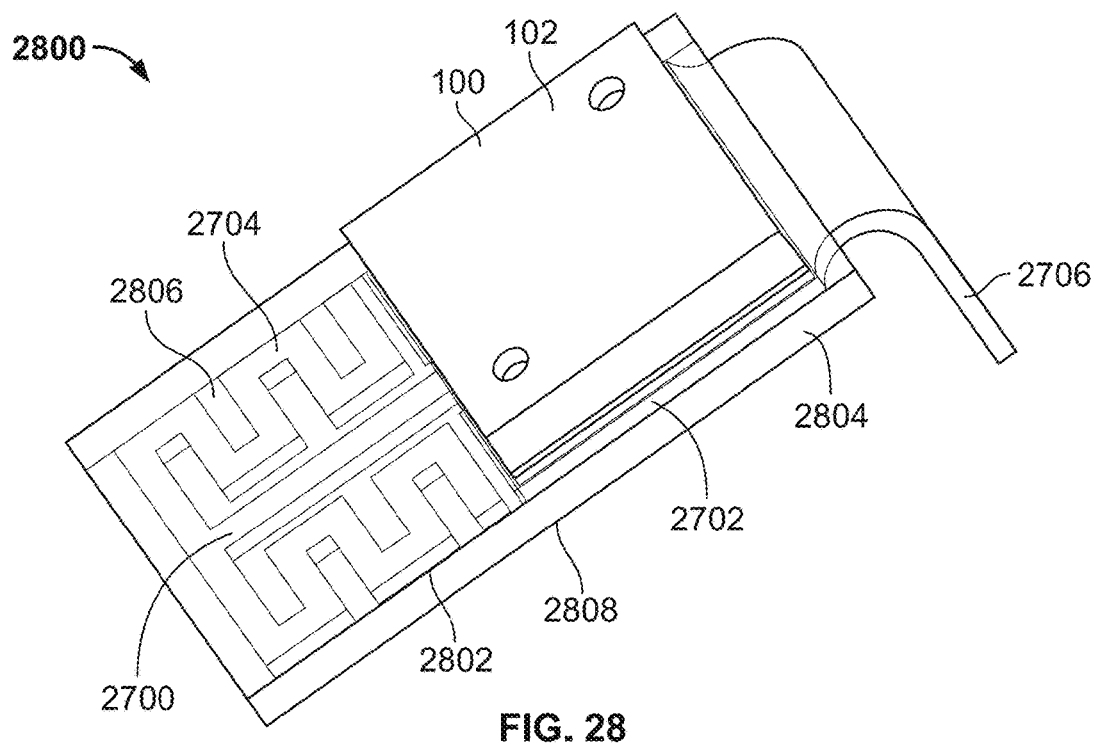
FIG. 28 is a perspective view of an example RFID mountable bracket including the RFID tag of FIG. 1 mounted to the bracket of FIG. 27.

FIG. 27 is a front view of a sixth example bracket 2700 constructed in accordance with the teachings of this disclosure. The bracket 2700 of FIG. 27 includes an example base 2702, an example meandering amplification arm 2704, and an example mounting arm 2706. The mounting arm 2706 is peripherally located relative to, and/or is connected to (e.g., integrally formed with) and extends away from the base 2702 in an example first direction 2708. The meandering amplification arm 2704 is peripherally located relative to, and/or is connected to (e.g., integrally formed with) and generally extends away from the base 2702 in an example second direction 2710 opposite the first direction 2708. The mounting arm 2706 forms and/or defines an example first end 2712 of the bracket 2700, and the meandering amplification arm 2704 forms and/or defines an example second end 2714 of the bracket 2700 located opposite the first end 2712 of the bracket 2700. In the illustrated example of FIG. 27, the base 2702, the meandering amplification arm 2704, the mounting arm 2706 and/or, more generally, the bracket 2700 has/have an example front surface 2716 and an example back surface 2802 (e.g., as shown in FIG. 28) located opposite the front surface 2716. The base 2702, the meandering amplification arm 2704, the mounting arm 2706, and/or, more generally, the bracket 2700 is/are preferably formed from one or more conductive metallic material(s) of any thickness (e.g., sheet metal, metallic tape, a signal trace on a printed circuit board, etc.).

The base 2702 of the bracket 2700 of FIG. 27 includes example through holes 2718 passing from the front surface 2716 of the base 2702 through to the back surface 2802 of the base 2702. Respective ones of the through holes 2718 are configured to receive a corresponding fastener to fasten, couple, and/or mount the RFID tag 100 of FIG. 1 to the base 2702 of the bracket 2700. The fastener(s) associated with the through hole(s) 2718 may include, for example, one or more screw(s), bolt(s), rivet(s), stud(s), boss(es), band(s), cable tie(s), etc. In the illustrated example of FIG. 27, the base 2702 of the bracket 2700 includes a total of two through holes 2718, with the two through holes 2718 being respectively located relative to one another at diagonally-opposed corners of the base 2702. In other examples, the base 2702 of the bracket 2700 may include a different number of through holes 2718 (e.g., one, three, four, etc.), and such through holes 2718 may be located at positions differing from those shown in FIG. 27.

The base 2702 of the bracket 2700 of FIG. 27 further includes an example notch 2720 and an example feed arm 2722. In the illustrated example of FIG. 27, the notch 2720 is located centrally along, and extends inwardly from, an example edge 2724 of the base 2702 that is adjacent the meandering amplification arm 2704 of the bracket 2700. The feed arm 2722 of the base 2702 is positioned centrally within the notch 2720, and extends from an example center portion 2726 of the base 2702 outwardly past the edge 2724 of the base 2702, thereafter connecting to and/or merging with (e.g., being integrally formed with) the meandering amplification arm 2704 of the bracket 2700. In some examples, the feed arm 2722 of the base 2702 is aligned (e.g., longitudinally aligned) with an internal antenna of an RFID tag (e.g., an internal antenna of the RFID tag 100 of FIG. 1) to be mounted to the base 2702 of the bracket 2700. Aligning the feed arm 2722 of the base 2702 with an internal antenna of an RFID tag mounted to the base 2702 further enhances the antenna gain improvements provided by the meandering amplification arm 2704 of the bracket 2700, as further described below.

In the illustrated example of FIG. 27, the base 2702 of the bracket 2700 has a flat, rectangular shape. For example, as shown in FIG. 27, the base 2702 of the bracket 2700 has a length of approximately 32.0 millimeters and a width of approximately 32.0 millimeters, where the length and width are the dimensions of the front surface 2716 of the base 2702. The base 2702 of the bracket 2700 additionally has a thickness of approximately 2.0 millimeters, where the thickness is the dimension between the front surface 2716 and the back surface 2802 of the base 2702. In other examples, the base 2702 of the bracket 2700 of FIG. 27 may have a shape and/or dimensions differing from that/those described above. For example, the base 2702 may have a circular shape, an elliptical shape, a triangular shape, etc., or may have dimensions that are greater than or less than the dimensions described above.

The meandering amplification arm 2704 of the bracket 2700 of FIG. 27 has an example meandering configuration 2728 that facilitates amplifying an antenna gain associated with an RFID tag (e.g., the RFID tag 100 of FIG. 1) to be mounted to the bracket 2700. The meandering configuration 2728 of the meandering amplification arm 2704 is described in greater detail below in connection with FIG. 38. Example alternate meandering configurations that may be implemented by the meandering amplification arm 2704 of the bracket 2700 of FIG. 27 are described in greater detail below in connection with FIGS. 39 and 44.

In the illustrated example of FIG. 27, the meandering amplification arm 2704 of the bracket 2700 has a flat, generally rectangular shape. For example, as shown in FIG. 27, the meandering amplification arm 2704 of the bracket 2700 has an overall length of approximately 26.0 millimeters and an overall width of approximately 32.0 millimeters, where the overall length and overall width are the general dimensions of the front surface 2716 of the meandering amplification arm 2704. The meandering amplification arm 2704 of the bracket 2700 additionally has a thickness of approximately 2.0 millimeters, where the thickness is the dimension between the front surface 2716 and the back surface 2802 of the meandering amplification arm 2704. In other examples, the meandering amplification arm 2704 of the bracket 2700 of FIG. 27 may have a shape and/or dimensions differing from that/those described above. For example, the meandering amplification arm 2704 may have a circular shape, an elliptical shape, a triangular shape, etc., or may have dimensions that are greater than or less than the dimensions described above.

Figure 29:
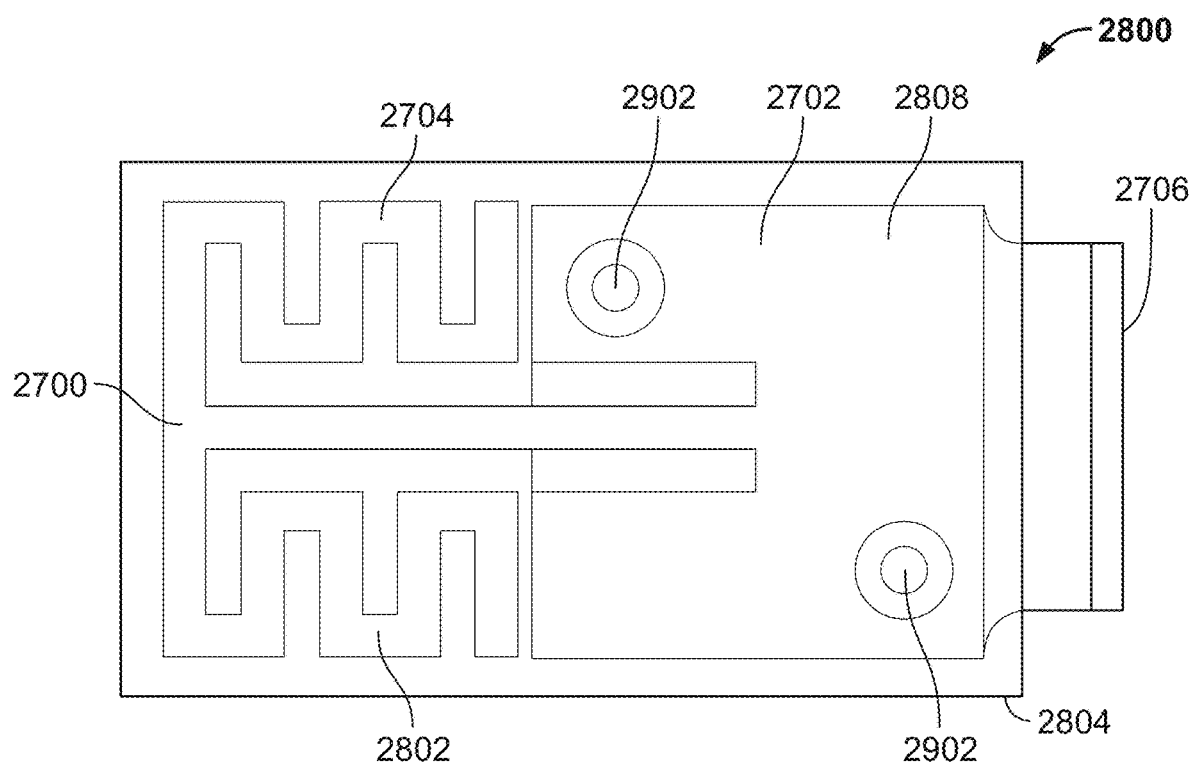
FIG. 29 is a rear view of the RFID mountable bracket of FIG. 28.

The mounting arm 2706 of the bracket 2700 of FIG. 27 includes an example through hole 2730 passing from the front surface 2716 of the mounting arm 2706 through to the back surface 2802 of the mounting arm 2706. The through hole 2730 is configured to receive a fastener to facilitate mounting the bracket 2700 to an object (e.g., a field device). The fastener associated with the through hole 2730 may include, for example, a screw, a bolt, a rivet, a stud, a boss, a band, a cable tie, etc. The mounting arm 2706 of the bracket 2700 of FIG. 27 has a flat, generally rectangular shape terminating in a rounded edge. As shown in FIG. 27, the mounting arm 2706 of the bracket 2700 is coplanar with the base 2702 of the bracket 2700. In other examples, the mounting arm 2706 of the bracket 2700 can instead be bent and/or positioned at an angle relative to the base 2702 of the bracket 2700. For example, as shown in FIGS. 28 and 29 described below, the mounting arm 2706 of the bracket 2700 is bent and/or positioned at an angle of approximately ninety degrees (90°) relative to the base 2702 of the bracket 2700. Bending and/or positioning the mounting arm 2706 of the bracket 2700 at an angle relative to the base 2702 of the bracket 2700 as shown in FIGS. 28 and 29 advantageously reduces the profile and/or form factor of the bracket 2700 when viewed from the front (e.g., from the front surface 2716 of the base 2702 of the bracket 2700).

In the illustrated example of FIG. 27, an example distance 2732 between the first end 2712 and the second end 2714 of the bracket 2700 is approximately 96.0 millimeters when the mounting arm 2706 is coplanar relative to the base 2702. In other examples, the distance 2732 between the first end 2712 and the second end 2714 of the bracket 2700 may range in value from approximately 86.0 millimeters to approximately 106.0 millimeters. In some examples, the distance 2732 between the first end 2712 and the second end 2714 of the bracket 2700 preferably does not exceed a distance value equal to one-half of the wavelength of the radio frequency (e.g., a 915 Mhz center frequency) at which an RFID tag (e.g., the RFID tag 100 of FIG. 1) to be mounted to the bracket 2700 operates and/or is responsive to. When the mounting arm 2706 is bent to a ninety degree (90°) angle relative to the base 2702 (e.g., as shown in FIGS. 28 and 29), an example distance 2734 between the second end 2714 of the bracket 2700 and the end of the base 2702 proximate the mounting arm 2706 of the bracket 2700 is approximately 58.0 millimeters.

FIG. 28 is a perspective view of an example RFID mountable bracket 2800 including the RFID tag 100 of FIG. 1 mounted to the bracket 2700 of FIG. 27. FIG. 29 is a rear view of the RFID mountable bracket 2800 of FIG. 28. The RFID mountable bracket 2800 of FIGS. 28 and 29 includes an example casing 2804 having an example front surface 2806 oriented in a same direction as the front surface 2716 of the base 2702 of the bracket 2700, and an example back surface 2808 located opposite the front surface 2806 and oriented in a same direction as the back surface 2802 of the base 2702 of the bracket 2700. The casing 2804 supports and/or encases the meandering amplification arm 2704 of the bracket 2700 to increase the mechanical integrity thereof relative to the base 2702 of the bracket 2700 (e.g., to prevent bending of the meandering amplification arm 2704 relative to the base 2702 of the bracket 2700).

The casing 2804 of FIGS. 28 and 29 is configured (e.g., sized, shaped, and/or structured to cover, house, and/or encase at least a portion of the bracket 2700 of FIG. 27. For example, as shown in FIGS. 28 and 29, the casing 2804 covers, houses, and/or encases the substantial entirety of the bracket 2700 of FIG. 27 with the exception of the mounting arm 2706 of the bracket 2700, and with further exception to the front surface 2716 of the of the base 2702 of the bracket 2700, which is an area reserved for placement and/or mounting of the RFID tag 100. The casing 2804 is preferably formed from a non-conductive material, such as plastic, rubber, ceramic, or porcelain. Forming the casing 2804 from such a non-conductive material advantageously shields and/or insulates the encased components (e.g., the meandering amplification arm 2704) of the bracket 2700 of the RFID mountable bracket 2800 from contacting one or more metallic component(s) of an object (e.g., a field device) to which the RFID mountable bracket 2800 may be coupled.

The casing 2804 of FIGS. 28 and 29 has a flat, generally rectangular shape corresponding to the flat, generally rectangular shape defined by the base 2702 and the meandering amplification arm 2704 of the bracket 2700. In other examples, the casing 2804 may have a shape that differs from that shown in FIGS. 28 and 29. In the illustrated example of FIGS. 28 and 29, the casing 2804 includes example through holes 2902 passing through the back surface 2808 of the casing 2804 and positioned in alignment with the above-described through holes 2718 of the base 2702 of the bracket 2700. The RFID mountable bracket 2800 of FIGS. 28 and 29 is formed by positioning the RFID tag 100 on the base 2702 of the bracket 2700 (e.g., with the bracket 2700 being at least partially encased by the casing 2804) such that the back surface 104 of the RFID tag 100 faces and/or is in contact with the front surface 2716 of the base 2702 of the bracket 2700. When positioned on the bracket 2700 as shown in FIGS. 28 and 29, the RFID tag 100 can be fastened, coupled, and/or mounted to the bracket 2700 via fasteners (e.g., threaded rivets) passing from the back surface 2808 of the casing 2804, through the through holes 2902 of the casing 2804, through the through holes 2718 of the base 2702 of the bracket 2700, and into the through holes 106 of the RFID tag 100. The assembled RFID mountable bracket 2800 of FIGS. 28 and 29 is structured to be mounted to an object (e.g., a field device) via a fastener (e.g., a screw, a bolt, a rivet, a stud, a boss, a band, a cable tie, etc.) passing through the through hole 2730 formed in the mounting arm 2706 of the bracket 2700.

In the illustrated example of FIGS. 28 and 29, the meandering amplification arm 2704 of the bracket 2700 amplifies an antenna gain associated with the RFID tag 100 (e.g., a gain of an internal antenna of the RFID tag 100). By amplifying the antenna gain associated with the RFID tag 100, the meandering amplification arm 2704 operates as a meandering monopole antenna that increases the maximum communication range (e.g., the maximum read range) associated with the RFID tag 100. For example, when the RFID tag 100 is mounted to the base 2702 of the bracket 2700 to form the RFID mountable bracket 2800 of FIGS. 28 and 29 as described above, the meandering amplification arm 2704 may increase the maximum communication range (e.g., the maximum read range) associated with the RFID tag 100 by a distance of fifteen feet or more. In such examples, the maximum communication range associated with the mounted RFID tag 100 of the RFID mountable bracket 2800 of FIGS. 28 and 29 may be twenty feet or more at a center frequency of 915 MHz, in comparison to the maximum communication range of the RFID tag 100 in isolation (e.g., not mounted to the bracket 2700 of FIG. 27) being just five feet or less at a center frequency of 915 MHz.

FIG. 30 is an example surface current density profile 3000 for the RFID mountable bracket 2800 of FIGS. 28 and 29. The surface current density profile 3000 of FIG. 30 shows the surface current density for the RFID mountable bracket 2800 at a center frequency of 915 MHz. As shown in FIG. 30, the meandering amplification arm 2704 of the bracket 2700 operates as a meandering monopole antenna and/or resonator for the RFID tag 100, with a majority of the resonant behavior occurring along an example feed arm 4802 of the meandering amplification arm 2704. Heightened resonant behavior is also visible along the feed arm 2722 of the base 2702 of the bracket 2700.

Figure 31:
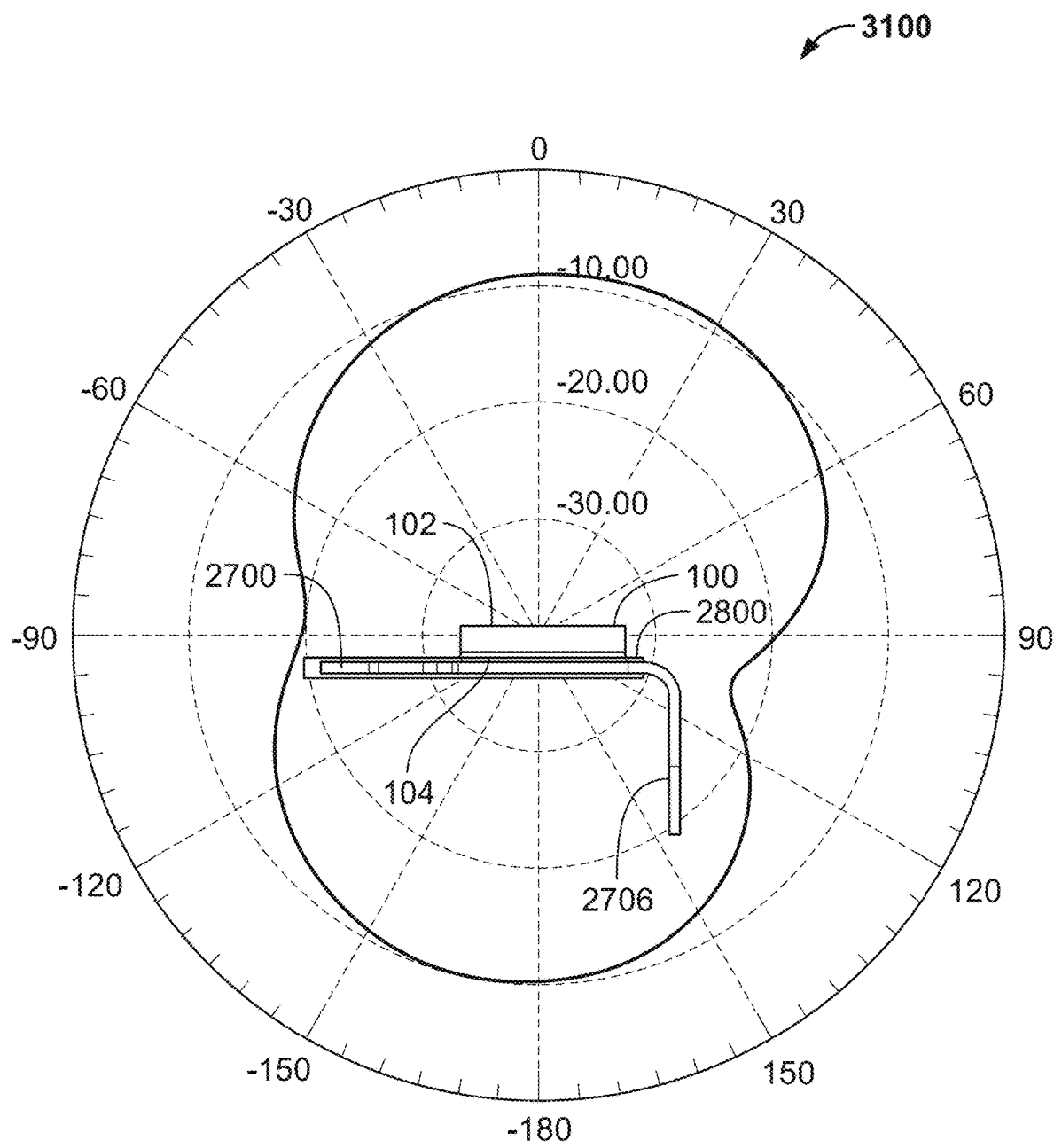
FIG. 31 is an example graph of antenna gain as a function of azimuthal angle for the RFID mountable bracket of FIGS. 28 and 29.

FIG. 31 is an example graph 3100 of antenna gain as a function of azimuthal angle for the RFID mountable bracket 2800 of FIGS. 28 and 29. In the illustrated example of FIG. 31, an azimuthal angle of zero degrees (0°) corresponds to the front surface 102 of the RFID tag 100, and an azimuthal angle of one hundred eighty degrees (180°) corresponds to the back surface 104 of the RFID tag 100. The maximum antenna gain associated with the RFID tag 100 in isolation is approximately −65 dBm at both the front surface 102 (e.g., at 0°) and the back surface (e.g., 180°) of the RFID tag 100. By comparison, the graph 3100 of FIG. 31 shows that the maximum antenna gain associated with the RFID mountable bracket 2800 is approximately −9 dBm at the front surface 102 (e.g., at 0°) of the RFID tag 100, and approximately −10 dBm at the back surface (e.g., 180°) of the RFID tag 100. Thus, the maximum antenna gain associated with the RFID tag 100 increases substantially in response to the RFID tag 100 being mounted to the bracket 2700 to form the RFID mountable bracket 2800 of FIGS. 28 and 29.

Figure 32:
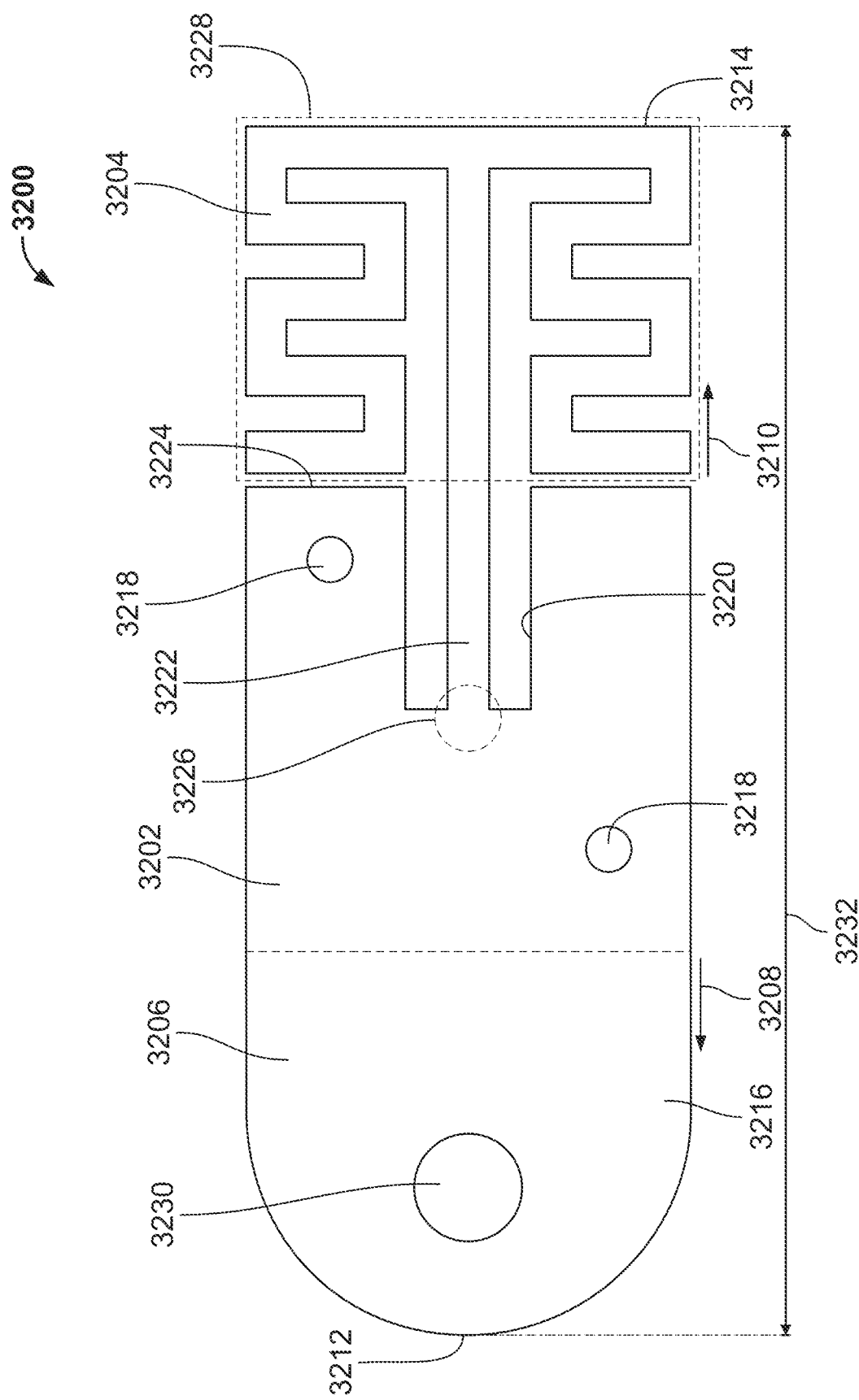
FIG. 32 is a front view of a seventh example bracket constructed in accordance with the teachings of this disclosure.
Figure 33:
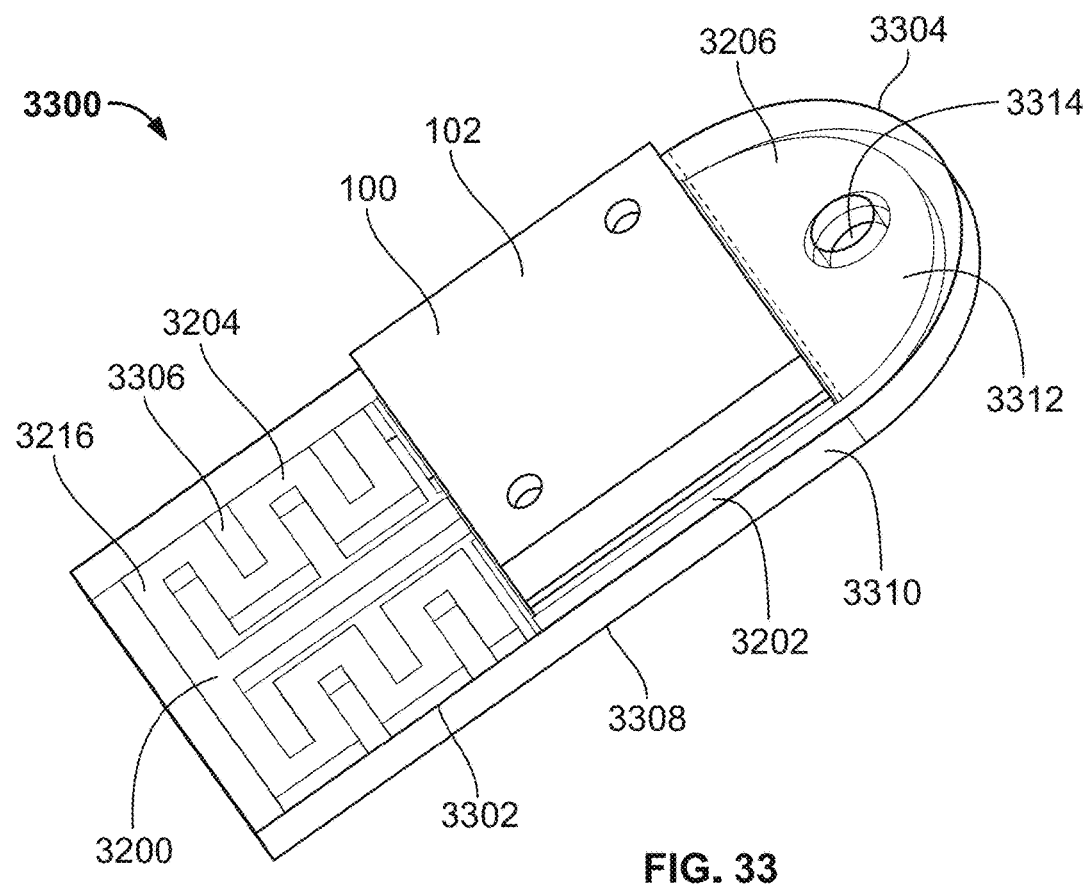
FIG. 33 is a perspective view of an example RFID hang tag including the RFID tag of FIG. 1 mounted to the bracket of FIG. 32.

FIG. 32 is a front view of a seventh example bracket 3200 constructed in accordance with the teachings of this disclosure. The bracket 3200 of FIG. 32 includes an example base 3202, an example meandering amplification arm 3204, and a hang tab 3206. The hang tab 3206 is peripherally located relative to, and/or is connected to (e.g., integrally formed with) and extends away from the base 3202 in an example first direction 3208. The meandering amplification arm 3204 is peripherally located relative to, and/or is connected to (e.g., integrally formed with) and generally extends away from the base 3202 in an example second direction 3210 opposite the first direction 3208. The hang tab 3206 forms and/or defines an example first end 3212 of the bracket 3200, and the meandering amplification arm 3204 forms and/or defines an example second end 3214 of the bracket 3200 located opposite the first end 3212 of the bracket 3200. In the illustrated example of FIG. 32, the base 3202, the meandering amplification arm 3204, the hang tab 3206 and/or, more generally, the bracket 3200 has/have an example front surface 3216 and an example back surface 3302 (e.g., as shown in FIG. 33) located opposite the front surface 3216. The base 3202, the meandering amplification arm 3204, the hang tab 3206 and/or, more generally, the bracket 3200 is/are preferably formed from one or more conductive metallic material(s) of any thickness (e.g., sheet metal, metallic tape, a signal trace on a printed circuit board, etc.).

The base 3202 of the bracket 3200 of FIG. 32 includes example through holes 3218 passing from the front surface 3216 of the base 3202 through to the back surface 3302 of the base 3202. Respective ones of the through holes 3218 are configured to receive a corresponding fastener to fasten, couple, and/or mount the RFID tag 100 of FIG. 1 to the base 3202 of the bracket 3200. The fastener(s) associated with the through hole(s) 3218 may include, for example, one or more screw(s), bolt(s), rivet(s), stud(s), boss(es), band(s), cable tie(s), etc. In the illustrated example of FIG. 32, the base 3202 of the bracket 3200 includes a total of two through holes 3218, with the two through holes 3218 being respectively located relative to one another at diagonally-opposed corners of the base 3202. In other examples, the base 3202 of the bracket 3200 may include a different number of through holes 3218 (e.g., one, three, four, etc.), and such through holes 3218 may be located at positions differing from those shown in FIG. 32.

The base 3202 of the bracket 3200 of FIG. 32 further includes an example notch 3220 and an example feed arm 3222. In the illustrated example of FIG. 32, the notch 3220 is located centrally along, and extends inwardly from, an example edge 3224 of the base 3202 that is adjacent the meandering amplification arm 3204 of the bracket 3200. The feed arm 3222 of the base 3202 is positioned centrally within the notch 3220, and extends from an example center portion 3226 of the base 3202 outwardly past the edge 3224 of the base 3202, thereafter connecting to and/or merging with (e.g., being integrally formed with) the meandering amplification arm 3204 of the bracket 3200. In some examples, the feed arm 3222 of the base 3202 is aligned (e.g., longitudinally aligned) with an internal antenna of an RFID tag (e.g., an internal antenna of the RFID tag 100 of FIG. 1) to be mounted to the base 3202 of the bracket 3200. Aligning the feed arm 3222 of the base 3202 with an internal antenna of an RFID tag mounted to the base 3202 further enhances the antenna gain improvements provided by the meandering amplification arm 3204 of the bracket 3200, as further described below.

In the illustrated example of FIG. 32, the base 3202 of the bracket 3200 has a flat, rectangular shape. For example, as shown in FIG. 32, the base 3202 of the bracket 3200 has a length of approximately 32.0 millimeters and a width of approximately 32.0 millimeters, where the length and width are the dimensions of the front surface 3216 of the base 3202. The base 3202 of the bracket 3200 additionally has a thickness of approximately 2.0 millimeters, where the thickness is the dimension between the front surface 3216 and the back surface 3302 of the base 3202. In other examples, the base 3202 of the bracket 3200 of FIG. 32 may have a shape and/or dimensions differing from that/those described above. For example, the base 3202 may have a circular shape, an elliptical shape, a triangular shape, etc., or may have dimensions that are greater than or less than the dimensions described above.

The meandering amplification arm 3204 of the bracket 3200 of FIG. 32 has an example meandering configuration 3228 that facilitates amplifying an antenna gain associated with an RFID tag (e.g., the RFID tag 100 of FIG. 1) to be mounted to the bracket 3200. The meandering configuration 3228 of the meandering amplification arm 3204 is described in greater detail below in connection with FIG. 38. Example alternate meandering configurations that may be implemented by the meandering amplification arm 3204 of the bracket 3200 of FIG. 32 are described in greater detail below in connection with FIGS. 39 and 44.

In the illustrated example of FIG. 32, the meandering amplification arm 3204 of the bracket 3200 has a flat, generally rectangular shape. For example, as shown in FIG. 32, the meandering amplification arm 3204 of the bracket 3200 has an overall length of approximately 26.0 millimeters and an overall width of approximately 32.0 millimeters, where the overall length and overall width are the general dimensions of the front surface 3216 of the meandering amplification arm 3204. The meandering amplification arm 3204 of the bracket 3200 additionally has a thickness of approximately 2.0 millimeters, where the thickness is the dimension between the front surface 3216 and the back surface 3302 of the meandering amplification arm 3204. In other examples, the meandering amplification arm 3204 of the bracket 3200 of FIG. 32 may have a shape and/or dimensions differing from that/those described above. For example, the meandering amplification arm 3204 may have a circular shape, an elliptical shape, a triangular shape, etc., or may have dimensions that are greater than or less than the dimensions described above.

The hang tab 3206 of the bracket 3200 of FIG. 32 includes an example through hole 3230 located proximate the first end 3212 of the bracket 3200 and passing from the front surface 3216 of the hang tab 3206 through to the back surface 3302 of the hang tab 3206. The through hole 3230 is configured to receive a fastener to facilitate hanging the bracket 3200 from and/or otherwise coupling the bracket 3200 to an object (e.g., a field device). The fastener associated with the through hole 3230 may include, for example, a cable tie, a cable, a wire, a string, a band, etc. As shown in FIG. 32, the hang tab 3206 of the bracket 3200 is coplanar with the base 3202 and the meandering amplification arm 3204 of the bracket 3200. In other examples, the hang tab 3206 of the bracket 3200 can instead be bent and/or positioned at an angle relative to one or more of the base 3202 and/or the meandering amplification arm 3204 of the bracket 3200.

In the illustrated example of FIG. 32, the hang tab 3206 of the bracket 3200 has a flat, generally hemispherical shape. For example, as shown in FIG. 32, the hang tab 3206 of the bracket 3200 has an overall length of approximately 16.0 millimeters and an overall width of approximately 32.0 millimeters, where the overall length and overall width are the general dimensions of the front surface 3216 of the hang tab 3206. The hang tab 3206 of the bracket 3200 additionally has a thickness of approximately 2.0 millimeters, where the thickness is the dimension between the front surface 3216 and the back surface 3302 of the hang tab 3206. In other examples, the hang tab 3206 of the bracket 3200 of FIG. 32 may have a shape and/or dimensions differing from that/ those described above. For example, the hang tab 3206 may have an annular and/or arc-like shape, a circular shape, a rectangular shape, an elliptical shape, a triangular shape, etc., or may have dimensions that are greater than or less than the dimensions described above.

In the illustrated example of FIG. 32, an example distance 3232 between the first end 3212 and the second end 3214 of the bracket 3200 is approximately 74.0 millimeters. In other examples, the distance 3232 between the first end 3212 and the second end 3214 of the bracket 3200 may range in value from approximately 64.0 millimeters to approximately 84.0 millimeters. In some examples, the distance 3232 between the first end 3212 and the second end 3214 of the bracket 3200 preferably does not exceed a distance value equal to one-half of the wavelength of the radio frequency (e.g., a 915 Mhz center frequency) at which an RFID tag (e.g., the RFID tag 100 of FIG. 1) to be mounted to the bracket 3200 operates and/or is responsive to.

Figure 34:
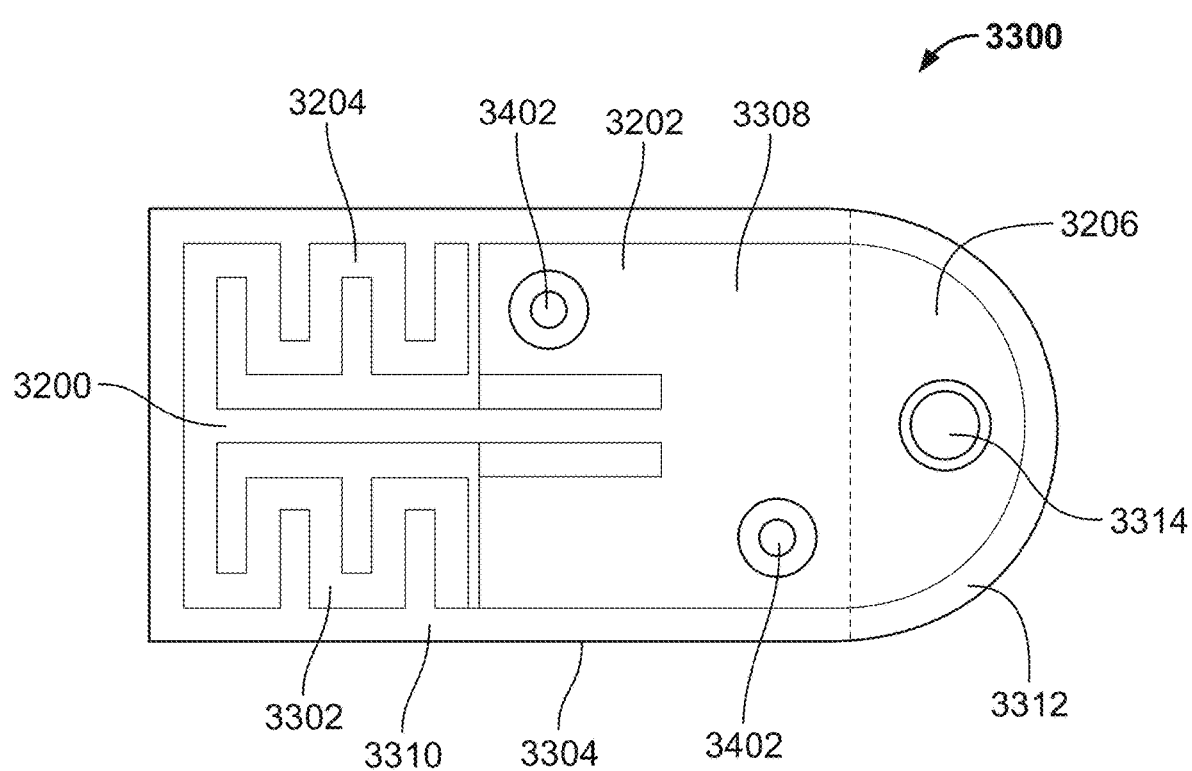
FIG. 34 is a rear view of the RFID hang tag of FIG. 33.

FIG. 33 is a perspective view of an example RFID hang tag 3300 including the RFID tag 100 of FIG. 1 mounted to the bracket 3200 of FIG. 32. FIG. 34 is a rear view of the RFID hang tag 3300 of FIG. 33. The RFID hang tag 3300 of FIGS. 33 and 34 includes an example casing 3304 having an example front surface 3306 oriented in a same direction as the front surface 3216 of the bracket 3200, and an example back surface 3308 located opposite the front surface 3306 and oriented in a same direction as the back surface 3302 of the bracket 3200. The casing 3304 supports and/or encases the meandering amplification arm 3204 of the bracket 3200 to increase the mechanical integrity thereof relative to the base 3202 of the bracket 3200 (e.g., to prevent bending of the meandering amplification arm 3204 relative to the base 3202 of the bracket 3200).

The casing 3304 of FIGS. 33 and 34 is configured (e.g., sized, shaped, and/or structured to cover, house, and/or encase at least a portion (e.g., substantially all) of the bracket 3200 of FIG. 32. For example, as shown in FIGS. 33 and 34, the casing 3304 covers, houses, and/or encases the substantial entirety of the bracket 3200 of FIG. 32 with the exception of the front surface 3216 of the of the base 3202 of the bracket 3200, which is an area reserved for placement and/or mounting of the RFID tag 100. The casing 3304 is preferably formed from a non-conductive material, such as plastic, rubber, ceramic, or porcelain. Forming the casing 3304 from such a non-conductive material advantageously shields and/or insulates the encased components (e.g., the meandering amplification arm 3204) of the bracket 3200 of the RFID hang tag 3300 from contacting one or more metallic component(s) of an object (e.g., a field device) from which the RFID hang tag 3300 may be hung, or to which the RFID hang tag 3300 may be coupled.

The casing 3304 of FIGS. 33 and 34 includes an example first portion 3310 configured (e.g., sized, shaped, and/or structured) to cover, house, and/or encase the base 3202 and the meandering amplification arm 3204 of the bracket 3200 as described above, and an example second portion 3312 connected to and extending away from the first portion 3310 and configured (e.g., sized, shaped, and/or structured) to encase the hang tab 3206 of the bracket 3200 as described above. In the illustrated example of FIGS. 33 and 34, the first portion 3310 of the casing 3304 has a flat, generally rectangular shape corresponding to the flat, generally rectangular shape of the base 3202 and the meandering amplification arm 3204 of the bracket 3200. The second portion 3312 of the casing 3304 has a flat, generally hemispherical shape corresponding to the flat, generally hemispherical shape of the hang tab 3206 of the bracket 3200. In other examples, the first portion 3310 and/or the second portion 3312 of the casing 3304 may have a shape that differs from that shown in FIGS. 33 and 34

In the illustrated example of FIGS. 33 and 34, the first portion 3310 of the casing 3304 includes example through holes 3402 passing through the back surface 3308 of the casing 3304 and positioned in alignment with the above-described through holes 3218 of the base 3202 of the bracket 3200. The RFID hang tag 3300 of FIGS. 33 and 34 is formed by positioning the RFID tag 100 on the base 3202 of the bracket 3200 (e.g., with the bracket 3200 being at least partially encased by the casing 3304) such that the back surface 104 of the RFID tag 100 faces and/or is in contact with the front surface 3216 of the base 3202 of the bracket 3200. When positioned on the bracket 3200 as shown in FIGS. 33 and 34, the RFID tag 100 can be fastened, coupled, and/or mounted to the bracket 3200 via fasteners (e.g., threaded rivets) passing from the back surface 3308 of the casing 3304, through the through holes 3402 of the casing 3304, through the through holes 3218 of the base 3202 of the bracket 3200, and into the through holes 106 of the RFID tag 100.

In the illustrated example of FIGS. 33 and 34, the second portion 3312 of the casing 3304 includes an example through hole 3314 passing from the front surface 3306 of the casing 3304 through to the back surface 3308 of the casing 3304, and positioned in alignment with the above-described through hole 3230 of the hang tab 3206 of the bracket 3200. The assembled RFID hang tag 3300 of FIGS. 33 and 34 is structured to be hung from an object (e.g., a field device) via a fastener (e.g., a cable tie, a cable, a wire, a string, a band, etc.) passing through the through hole 3314 formed in the casing 3304 and the through hole 3230 formed in the hang tab 3206.

In the illustrated example of FIGS. 33 and 34, the meandering amplification arm 3204 of the bracket 3200 amplifies an antenna gain associated with the RFID tag 100 (e.g., a gain of an internal antenna of the RFID tag 100). By amplifying the antenna gain associated with the RFID tag 100, the meandering amplification arm 3204 operates as a meandering monopole antenna that increases the maximum communication range (e.g., the maximum read range) associated with the RFID tag 100. For example, when the RFID tag 100 is mounted to the base 3202 of the bracket 3200 to form the RFID hang tag 3300 of FIGS. 33 and 34 as described above, the meandering amplification arm 3204 may increase the maximum communication range (e.g., the maximum read range) associated with the RFID tag 100 by a distance of twenty-five feet or more. In such examples, the maximum communication range associated with the mounted RFID tag 100 of the RFID hang tag 3300 may be thirty feet or more at a center frequency of 915 MHz, in comparison to the maximum communication range of the RFID tag 100 in isolation (e.g., not mounted to the bracket 3200 of FIG. 32) being just five feet or less at a center frequency of 915 MHz.

Figure 35:
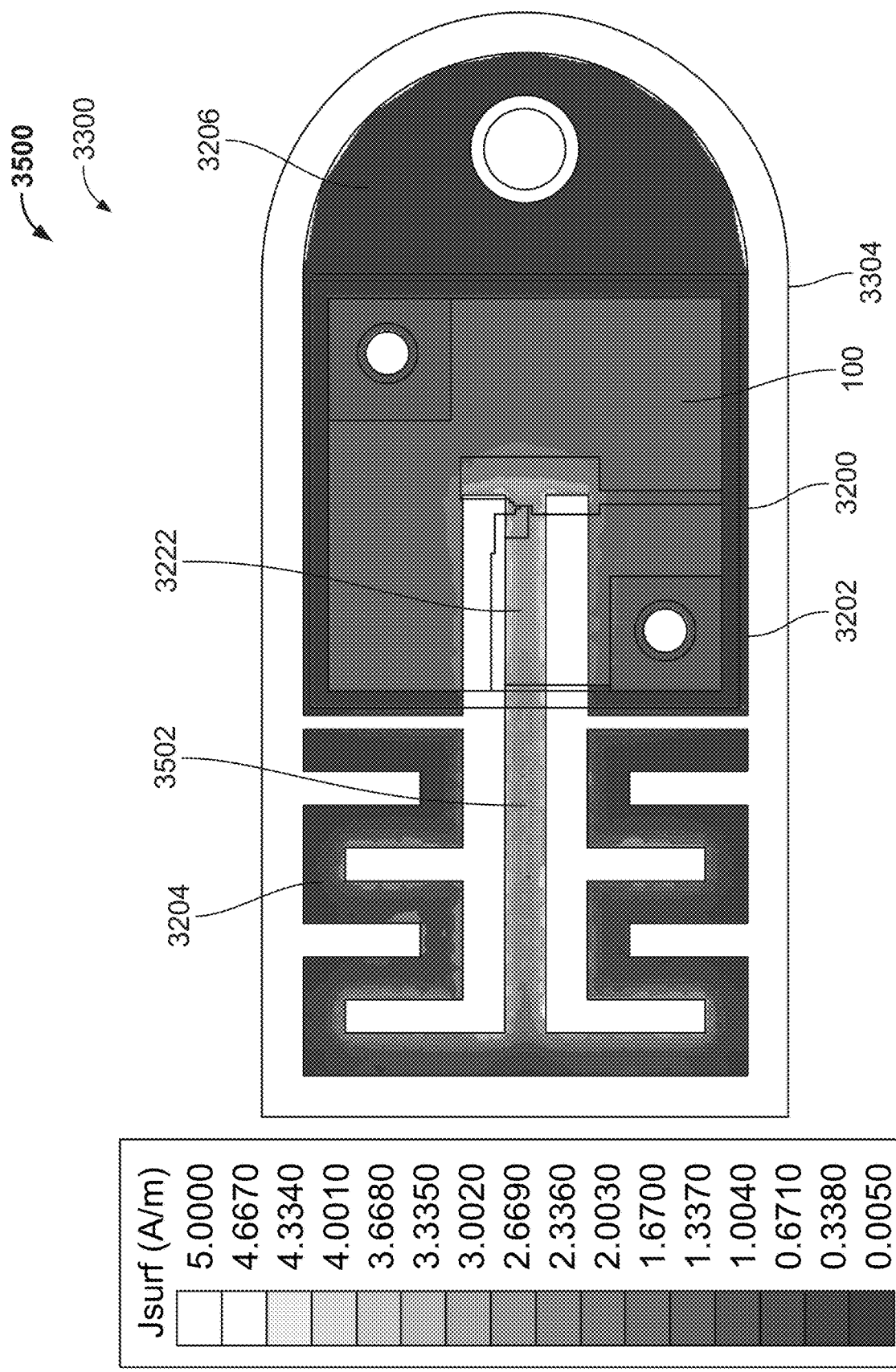
FIG. 35 is an example surface current density profile for the RFID hang tag of FIGS. 33 and 34.

FIG. 35 is an example surface current density profile 3500 for the RFID hang tag 3300 of FIGS. 33 and 34. The surface current density profile 3500 of FIG. 35 shows the surface current density for the RFID hang tag 3300 at a center frequency of 915 MHz. As shown in FIG. 35, the meandering amplification arm 3204 of the bracket 3200 operates as a meandering monopole antenna and/or resonator for the RFID tag 100, with a majority of the resonant behavior occurring along an example feed arm 3502 of the meandering amplification arm 3204. Heightened resonant behavior is also visible along the feed arm 3222 of the base 3202 of the bracket 3200. The through hole 3230 formed in the hang tab 3206 of the bracket 3200 is located in a quiescent region of the hang tab 3206, thereby enabling the RFID hang tag 3300 of FIGS. 33 and 34 to be hung in a vertical orientation from a metallic object (e.g., a metallic casing of a field device) via a metallic fastener (e.g., a metal wire) passing through the through hole 3230 without the metallic fastener crossing the resonating portions of the meandering amplification arm 3204 of the bracket 3200.

Figure 36:
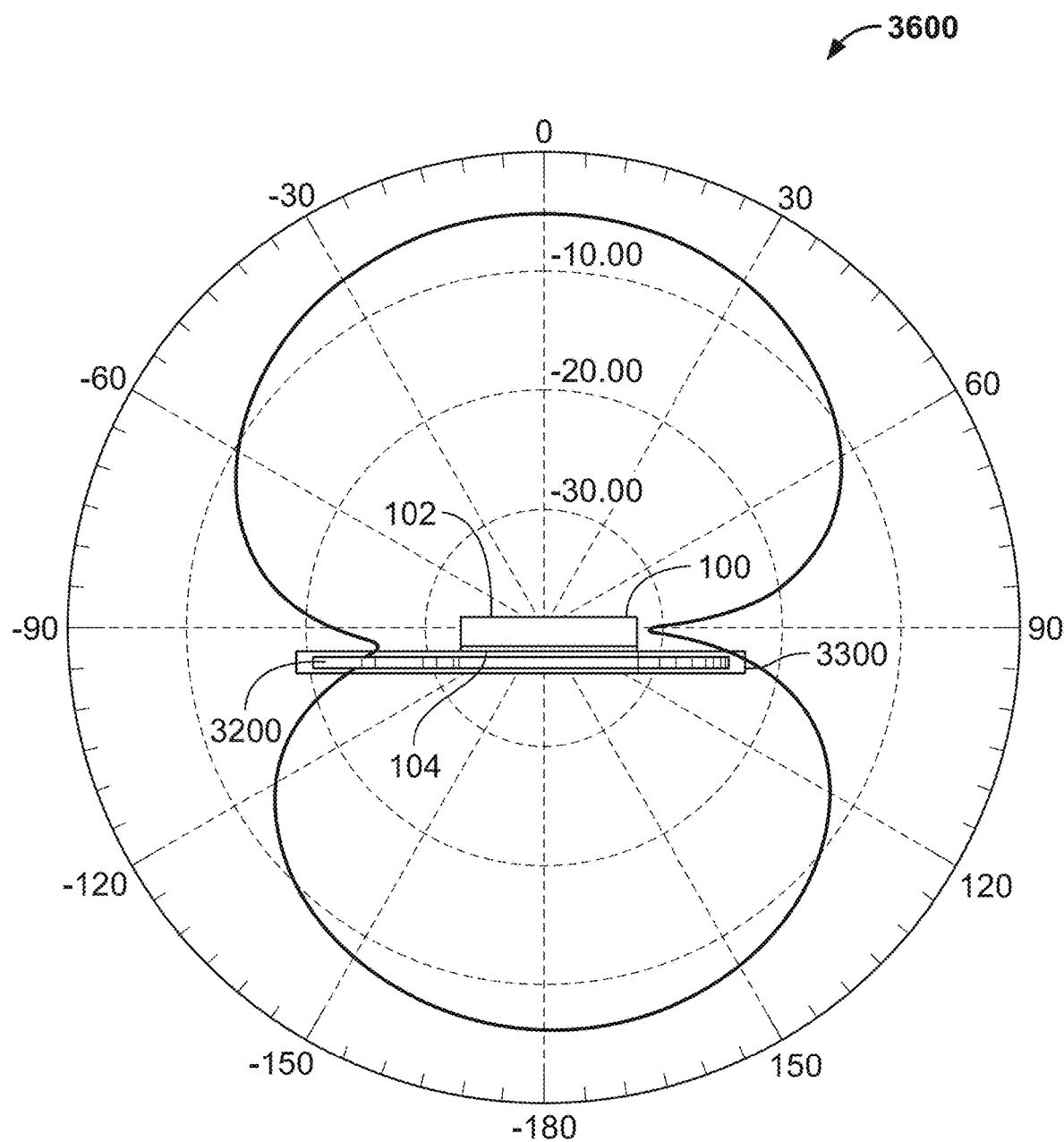
FIG. 36 is an example graph of antenna gain as a function of azimuthal angle for the RFID hang tag of FIGS. 33 and 34.

FIG. 36 is an example graph 3600 of antenna gain as a function of azimuthal angle for the RFID hang tag 3300 of FIGS. 33 and 34. In the illustrated example of FIG. 36, an azimuthal angle of zero degrees (0°) corresponds to the front surface 102 of the RFID tag 100, and an azimuthal angle of one hundred eighty degrees (180°) corresponds to the back surface 104 of the RFID tag 100. The maximum antenna gain associated with the RFID tag 100 in isolation is approximately −65 dBm at both the front surface 102 (e.g., at 0°)and the back surface (e.g., 180°) of the RFID tag 100. By comparison, the graph 3600 of FIG. 36 shows that the maximum antenna gain associated with the RFID hang tag 3300 is approximately −5 dBm at the front surface 102 (e.g., at 0°) of the RFID tag 100, and approximately −6 dBm at the back surface (e.g., 180°) of the RFID tag 100. Thus, the maximum antenna gain associated with the RFID tag 100 increases substantially in response to the RFID tag 100 being mounted to the bracket 3200 to form the RFID hang tag 3300 of FIGS. 33 and 34.

Figure 37:
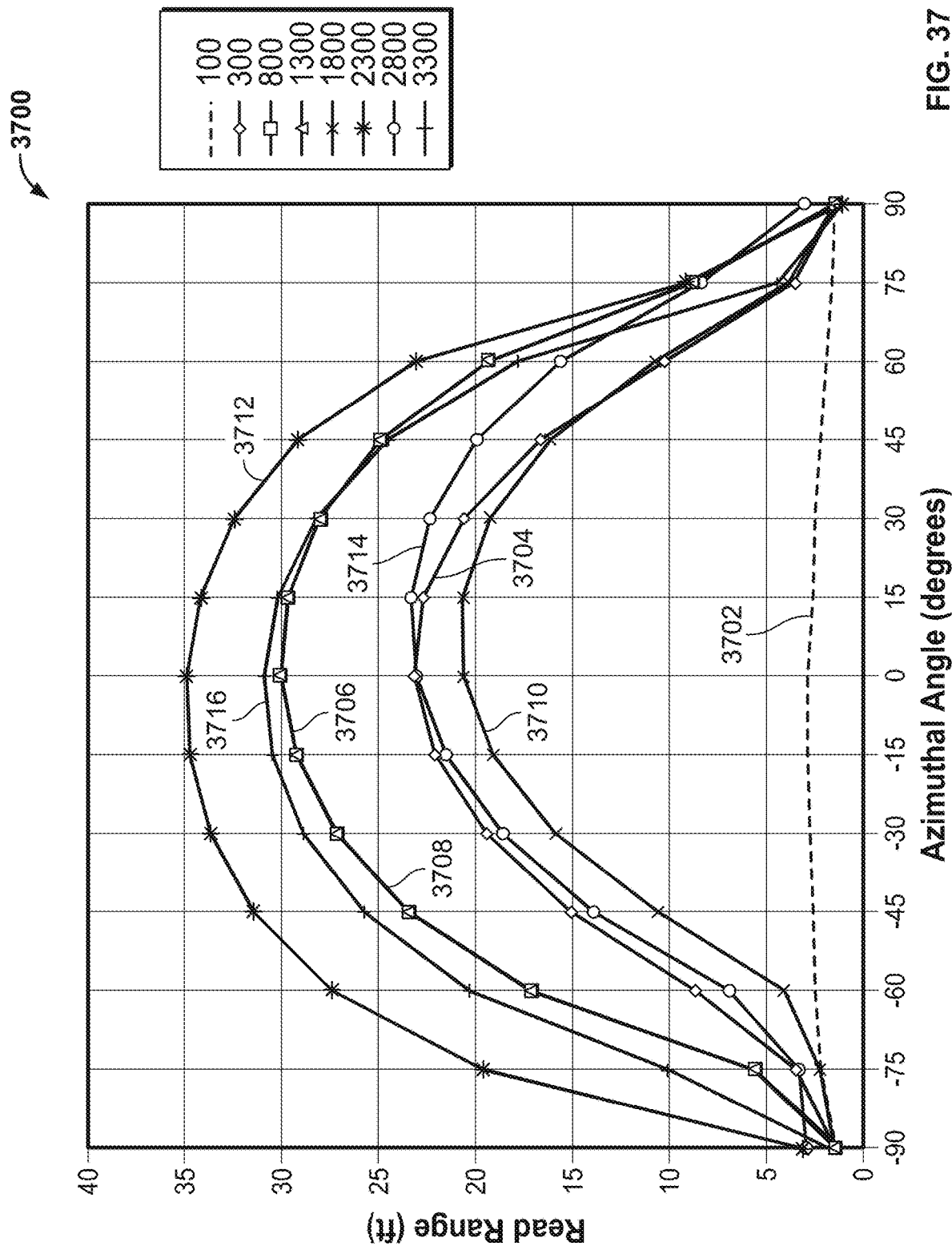
FIG. 37 is an example graph of read range as a function of azimuthal angle.

FIG. 37 is an example graph 3700 of read range as a function of azimuthal angle. The graph 3700 includes a first example plot 3702 corresponding to the RFID tag 100 of FIG. 1 in isolation. The graph 3700 also includes a second example plot 3704 corresponding to the RFID tag 100 of FIG. 1 mounted to the bracket 200 of FIG. 2, as shown in FIGS. 3 and 4. The graph 3700 also includes a third example plot 3706 corresponding to the RFID tag 100 of FIG. 1 mounted to the bracket 700 of FIG. 70, as shown in FIGS. 8 and 9. The graph 3700 also includes a fourth example plot 3708 corresponding to the RFID tag 100 of FIG. 1 mounted to the bracket 1200 of FIG. 12, as shown in FIGS. 13 and 14. The graph 3700 also includes a fifth example plot 3710 corresponding to the RFID tag 100 of FIG. 1 mounted to the bracket 1700 of FIG. 17, as shown in FIGS. 18 and 19. The graph 3700 also includes a sixth example plot 3712 corresponding to the RFID tag 100 of FIG. 1 mounted to the bracket 2200 of FIG. 22, as shown in FIGS. 22 and 23. The graph 3700 also includes a seventh example plot 3714 corresponding to the RFID tag 100 of FIG. 1 mounted to the bracket 2700 of FIG. 27, as shown in FIGS. 28 and 29. The graph 3700 also includes an eighth example plot 3716 corresponding to the RFID tag 100 of FIG. 1 mounted to the bracket 3200 of FIG. 32, as shown in FIGS. 33 and 34.

In the illustrated example of FIG. 37, an azimuthal angle of zero degrees (0°) on the graph 3700 corresponds to the front surface 102 of the RFID tag 100 of FIG. 1. As shown in the first plot 3702, the maximum read range associated with the RFID tag 100 of FIG. 1 in isolation is approximately four feet at the front surface 102 (e.g., at 0°) of the RFID tag 100. The second plot 3704 shows that the maximum read range associated with the RFID tag 100 of FIG. 1 mounted to the bracket 200 of FIG. 2 is approximately twenty-three feet at the front surface 102 (e.g., at 0°) of the RFID tag 100. The third plot 3706 shows that the maximum read range associated with the RFID tag 100 of FIG. 1 mounted to the bracket 700 of FIG. 7 is approximately thirty feet at the front surface 102 (e.g., at 0°) of the RFID tag 100. The fourth plot 3708 shows that the maximum read range associated with the RFID tag 100 of FIG. 1 mounted to the bracket 1200 of FIG. 12 is approximately thirty feet at the front surface 102 (e.g., at 0°) of the RFID tag 100. The fifth plot 3710 shows that the maximum read range associated with the RFID tag 100 of FIG. 1 mounted to the bracket 1700 of FIG. 17 is approximately twenty-one feet at the front surface 102 (e.g., at 0°) of the RFID tag 100. The sixth plot 312 shows that the maximum read range associated with the RFID tag 100 of FIG. 1 mounted to the bracket 2200 of FIG. 22 is approximately thirty-five feet at the front surface 102 (e.g., at 0°) of the RFID tag 100. The seventh plot 3714 shows that the maximum read range associated with the RFID tag 100 of FIG. 1 mounted to the bracket 2700 of FIG. 27 is approximately twenty-three feet at the front surface 102 (e.g., at 0°) of the RFID tag 100. The eighth plot 3716 shows that the maximum read range associated with the RFID tag 100 of FIG. 1 mounted to the bracket 3200 of FIG. 32 is approximately thirty-one feet at the front surface 102 (e.g., at 0°) of the RFID tag 100. Thus, the maximum read range associated with the RFID tag 100 of FIG. 1 increases substantially in response to the RFID tag 100 being mounted to the bracket 200 of FIG. 2, the bracket 700 of FIG. 7, the bracket 1200 of FIG. 12, the bracket 1700 of FIG. 17, the bracket 2200 of FIG. 22, the bracket 2700 of FIG. 27, or the bracket 3200 of FIG. 32.

Figure 38:
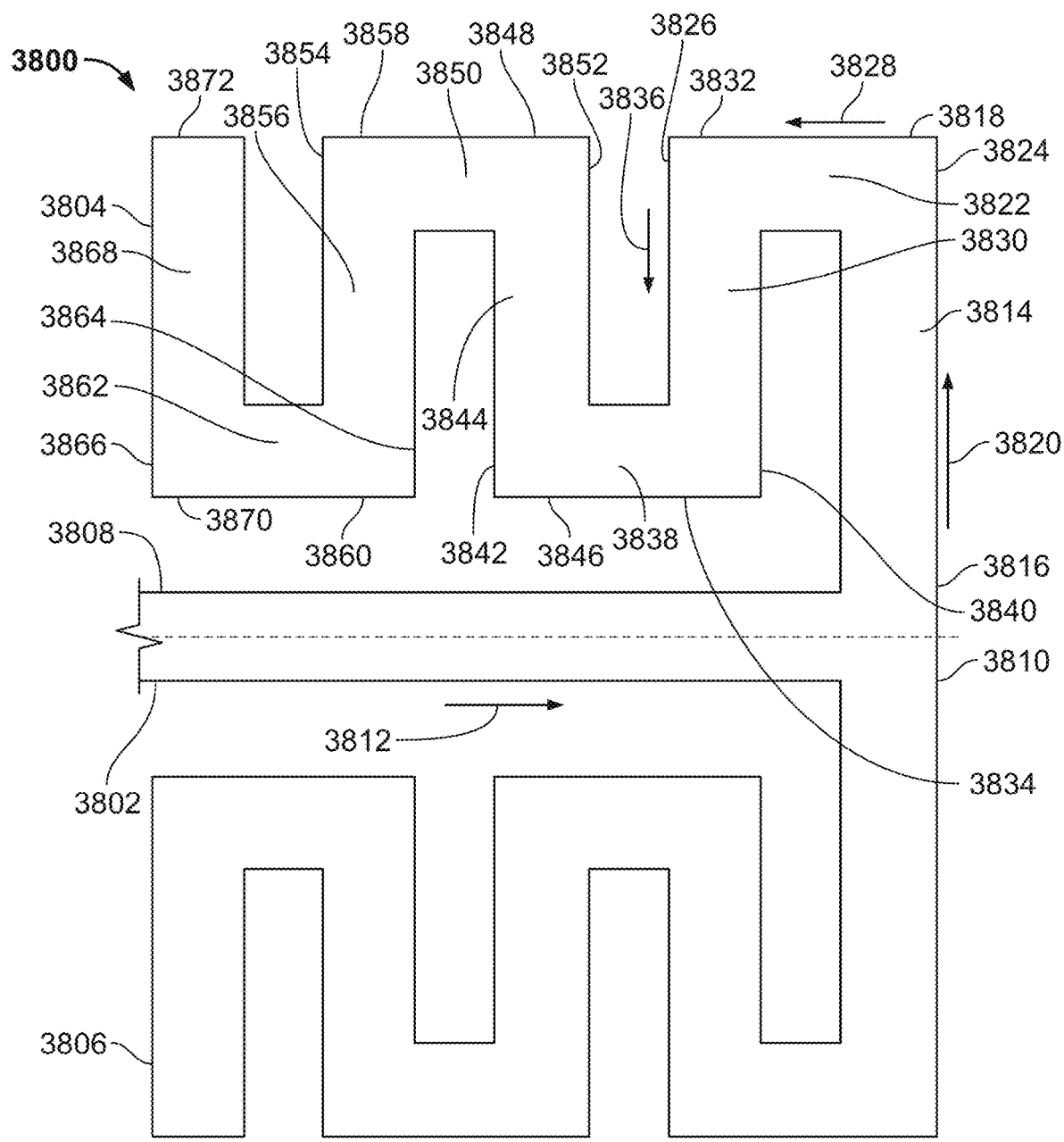
FIG. 38 is an enlarged front view of an example meandering configuration.

FIG. 38 is an enlarged front view of an example meandering configuration 3800. The meandering configuration 3800 of FIG. 38 corresponds to the meandering configuration 720 of FIG. 7, the meandering configuration 1224 of FIG. 12, the meandering configuration 1722 of FIG. 17, the meandering configuration 2224 of FIG. 22, the meandering configuration 2728 of FIG. 27, and the meandering configuration 3228 of FIG. 32. The meandering configuration 3800 of FIG. 38 can accordingly be implemented by the first meandering amplification arm 704 and/or the second meandering amplification arm 706 of the bracket 700 of FIG. 7, by the first meandering amplification arm 1204 and/or the second meandering amplification arm 1206 of the bracket 1200 of FIG. 12, by the first meandering amplification arm 1704 and/or the second meandering amplification arm 1706 of the bracket 1700 of FIG. 17, by the meandering amplification arm 2704 of the bracket 2700 of FIG. 27, and/or by the meandering amplification arm 3204 of the bracket 3200 of FIG. 32.

The meandering configuration 3800 of FIG. 38 includes an example feed arm 3802, a first example meandering portion 3804, and a second example meandering portion 3806. In the illustrated example of FIG. 38, the feed arm 3802 is centrally located between the first meandering portion 3804 and the second meandering portion 3806, with the first meandering portion 3804 and the second meandering portion 3806 respectively being structured as mirror images of one another relative to the feed arm 3802, as further described below. The feed arm 3802 of FIG. 38 includes an example first end 3808 and an example second end 3810 located opposite the first end 3808. The first end 3808 of the feed arm 3802 is structured to be connected to (e.g., integrally formed with) a base of a bracket (e.g., the base 702 of the bracket 700 of FIG. 7, the base 1202 of the bracket 1200 of FIG. 12, the base 1702 of the bracket 1700 of FIG. 17, etc.), or to a component of a base of a bracket (e.g., the feed arm 2218 of the base 2202 of the bracket 2200 of FIG. 22, the feed arm 2722 of the base 2702 of the bracket 2700 of FIG. 27, the feed arm 3222 of the base 3202 of the bracket 3200 of FIG. 32, etc.). The feed arm 3802 extends in a first example direction 3812 away from the position and/or location defined by the first end 3808 of the feed arm 3802.

The first meandering portion 3804 of FIG. 38 includes a first example segment 3814 having an example first end 3816 and an example second end 3818 located opposite the first end 3816. The first end 3816 of the first segment 3814 is connected to (e.g., integrally formed with) the second end 3810 of the feed arm 3802 such that the first segment 3814 is oriented perpendicular to the feed arm 3802 and extends from the feed arm 3802 in a second example direction 3820 oriented perpendicular to the first direction 3812.

The first meandering portion 3804 of FIG. 38 further includes a second example segment 3822 having an example first end 3824 and an example second end 3826 located opposite the first end 3824. The first end 3824 of the second segment 3822 is connected to (e.g., integrally formed with) the second end 3818 of the first segment 3814 such that the second segment 3822 is oriented perpendicular to the first segment 3814 and extends from the first segment 3814 in a third example direction 3828 oriented perpendicular to the second direction 3820 and opposite the first direction 3812.

The first meandering portion 3804 of FIG. 38 further includes a third example segment 3830 having an example first end 3832 and an example second end 3834 located opposite the first end 3832. The first end 3832 of the third segment 3830 is connected to (e.g., integrally formed with) the second end 3826 of the second segment 3822 such that the third segment 3830 is oriented perpendicular to the second segment 3822 and extends from the second segment 3822 in a fourth example direction 3836 oriented perpendicular to the third direction 3828 and opposite the second direction 3820.

The first meandering portion 3804 of FIG. 38 further includes a fourth example segment 3838 having an example first end 3840 and an example second end 3842 located opposite the first end 3840. The first end 3840 of the fourth segment 3838 is connected to (e.g., integrally formed with) the second end 3834 of the third segment 3830 such that the fourth segment 3838 is oriented perpendicular to the third segment 3830 and extends from the third segment 3830 in the third direction 3828.

The first meandering portion 3804 of FIG. 38 further includes a fifth example segment 3844 having an example first end 3846 and an example second end 3848 located opposite the first end 3846. The first end 3846 of the fifth segment 3844 is connected to (e.g., integrally formed with) the second end 3842 of the fourth segment 3838 such that the fifth segment 3844 is oriented perpendicular to the fourth segment 3838 and extends from the fourth segment 3838 in the second direction 3820.

The first meandering portion 3804 of FIG. 38 further includes a sixth example segment 3850 having an example first end 3852 and an example second end 3854 located opposite the first end 3852. The first end 3852 of the sixth segment 3850 is connected to (e.g., integrally formed with) the second end 3848 of the fifth segment 3844 such that the sixth segment 3850 is oriented perpendicular to the fifth segment 3844 and extends from the fifth segment 3844 in the third direction 3828.

The first meandering portion 3804 of FIG. 38 further includes a seventh example segment 3856 having an example first end 3858 and an example second end 3860 located opposite the first end 3858. The first end 3858 of the seventh segment 3856 is connected to (e.g., integrally formed with) the second end 3854 of the sixth segment 3850 such that the seventh segment 3856 is oriented perpendicular to the sixth segment 3850 and extends from the sixth segment 3850 in the fourth direction 3836.

The first meandering portion 3804 of FIG. 38 further includes an eighth example segment 3862 having an example first end 3864 and an example second end 3866 located opposite the first end 3864. The first end 3864 of the eighth segment 3862 is connected to (e.g., integrally formed with) the second end 3860 of the seventh segment 3856 such that the eighth segment 3862 is oriented perpendicular to the seventh segment 3856 and extends from the seventh segment 3856 in the third direction 3828.

The first meandering portion 3804 of FIG. 38 further includes a ninth example segment 3868 having an example first end 3870 and an example second end 3872 located opposite the first end 3870. The first end 3870 of the ninth segment 3868 is connected to (e.g., integrally formed with) the second end 3866 of the eighth segment 3862 such that the ninth segment 3868 is oriented perpendicular to the eighth segment 3862 and extends from the eighth segment 3862 in the second direction 3820. In the illustrated example of FIG. 38, the second end 3872 of the ninth segment 3868 is a free (e.g., unconnected) end of the first meandering portion 3804.

As shown in FIG. 38, the second meandering portion 3806 of the meandering configuration 3800 is structured in a manner that mirrors the above-described structure of the first meandering portion 3804 of the meandering configuration 3800 when viewed relative to the centrally-positioned feed arm 3802 of the meandering configuration 3800. In other examples, the second meandering portion 3806 can be structured in a manner that differs from that shown in FIG. 38. For example, the second meandering portion 3806 of the meandering configuration 3800 can be structured in a manner that does not mirror the above-described structure of the first meandering portion 3804 of the meandering configuration 3800 when viewed relative to the centrally-positioned feed arm 3802 of the meandering configuration 3800.

Figure 39:
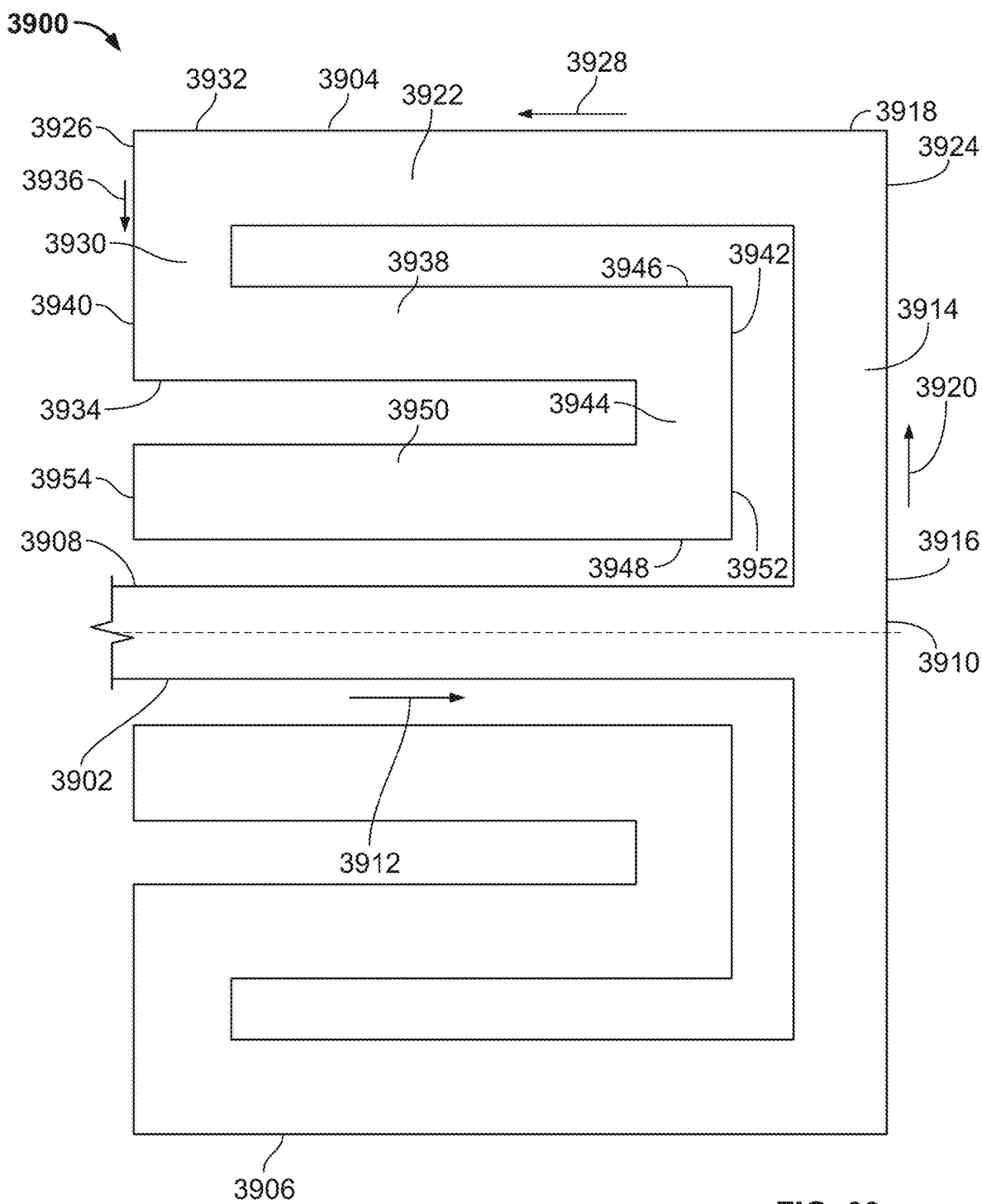
FIG. 39 is an enlarged front view of a first example alternate meandering configuration.

FIG. 39 is an enlarged front view of a first example alternate meandering configuration 3900. The first alternate meandering configuration 3900 of FIG. 39 includes an example feed arm 3902, a first example meandering portion 3904, and a second example meandering portion 3906. In the illustrated example of FIG. 39, the feed arm 3902 is centrally located between the first meandering portion 3904 and the second meandering portion 3906, with the first meandering portion 3904 and the second meandering portion 3906 respectively being structured as mirror images of one another relative to the feed arm 3902, as further described below. The feed arm 3902 of FIG. 39 includes an example first end 3908 and an example second end 3910 located opposite the first end 3908. The first end 3908 of the feed arm 3902 is structured to be connected to (e.g., integrally formed with) a base of a bracket (e.g., the base 702 of the bracket 700 of FIG. 7, the base 1202 of the bracket 1200 of FIG. 12, the base 1702 of the bracket 1700 of FIG. 17, etc.), or to a component of a base of a bracket (e.g., the feed arm 2218 of the base 2202 of the bracket 2200 of FIG. 22, the feed arm 2722 of the base 2702 of the bracket 2700 of FIG. 27, the feed arm 3222 of the base 3202 of the bracket 3200 of FIG. 32, etc.). The feed arm 3902 extends in a first example direction 3912 away from the position and/or location defined by the first end 3908 of the feed arm 3902.

The first meandering portion 3904 of FIG. 39 includes a first example segment 3914 having an example first end 3916 and an example second end 3918 located opposite the first end 3916. The first end 3916 of the first segment 3914 is connected to (e.g., integrally formed with) the second end 3910 of the feed arm 3902 such that the first segment 3914 is oriented perpendicular to the feed arm 3902 and extends from the feed arm 3902 in a second example direction 3920 oriented perpendicular to the first direction 3912.

The first meandering portion 3904 of FIG. 39 further includes a second example segment 3922 having an example first end 3924 and an example second end 3926 located opposite the first end 3924. The first end 3924 of the second segment 3922 is connected to (e.g., integrally formed with) the second end 3918 of the first segment 3914 such that the second segment 3922 is oriented perpendicular to the first segment 3914 and extends from the first segment 3914 in a third example direction 3928 oriented perpendicular to the second direction 3920 and opposite the first direction 3912.

The first meandering portion 3904 of FIG. 39 further includes a third example segment 3930 having an example first end 3932 and an example second end 3934 located opposite the first end 3932. The first end 3932 of the third segment 3930 is connected to (e.g., integrally formed with) the second end 3926 of the second segment 3922 such that the third segment 3930 is oriented perpendicular to the second segment 3922 and extends from the second segment 3922 in a fourth example direction 3936 oriented perpendicular to the third direction 3928 and opposite the second direction 3920.

The first meandering portion 3904 of FIG. 39 further includes a fourth example segment 3938 having an example first end 3940 and an example second end 3942 located opposite the first end 3940. The first end 3940 of the fourth segment 3938 is connected to (e.g., integrally formed with) the second end 3934 of the third segment 3930 such that the fourth segment 3938 is oriented perpendicular to the third segment 3930 and extends from the third segment 3930 in the first direction 3912.

The first meandering portion 3904 of FIG. 39 further includes a fifth example segment 3944 having an example first end 3946 and an example second end 3948 located opposite the first end 3946. The first end 3946 of the fifth segment 3944 is connected to (e.g., integrally formed with) the second end 3942 of the fourth segment 3938 such that the fifth segment 3944 is oriented perpendicular to the fourth segment 3938 and extends from the fourth segment 3938 in the fourth direction 3936.

The first meandering portion 3904 of FIG. 39 further includes a sixth example segment 3950 having an example first end 3952 and an example second end 3954 located opposite the first end 3952. The first end 3952 of the sixth segment 3950 is connected to (e.g., integrally formed with) the second end 3948 of the fifth segment 3944 such that the sixth segment 3950 is oriented perpendicular to the fifth segment 3944 and extends from the fifth segment 3944 in the third direction 3928. In the illustrated example of FIG. 39, the second end 3954 of the sixth segment 3950 is a free (e.g., unconnected) end of the first meandering portion 3904.

As shown in FIG. 39, the second meandering portion 3906 of the meandering configuration 3900 is structured in a manner that mirrors the above-described structure of the first meandering portion 3904 of the meandering configuration 3900 when viewed relative to the centrally-positioned feed arm 3902 of the meandering configuration 3900. In other examples, the second meandering portion 3906 can be structured in a manner that differs from that shown in FIG. 39. For example, the second meandering portion 3906 of the meandering configuration 3900 can be structured in a manner that does not mirror the above-described structure of the first meandering portion 3904 of the meandering configuration 3900 when viewed relative to the centrally-positioned feed arm 3902 of the meandering configuration 3900.

Figure 40:
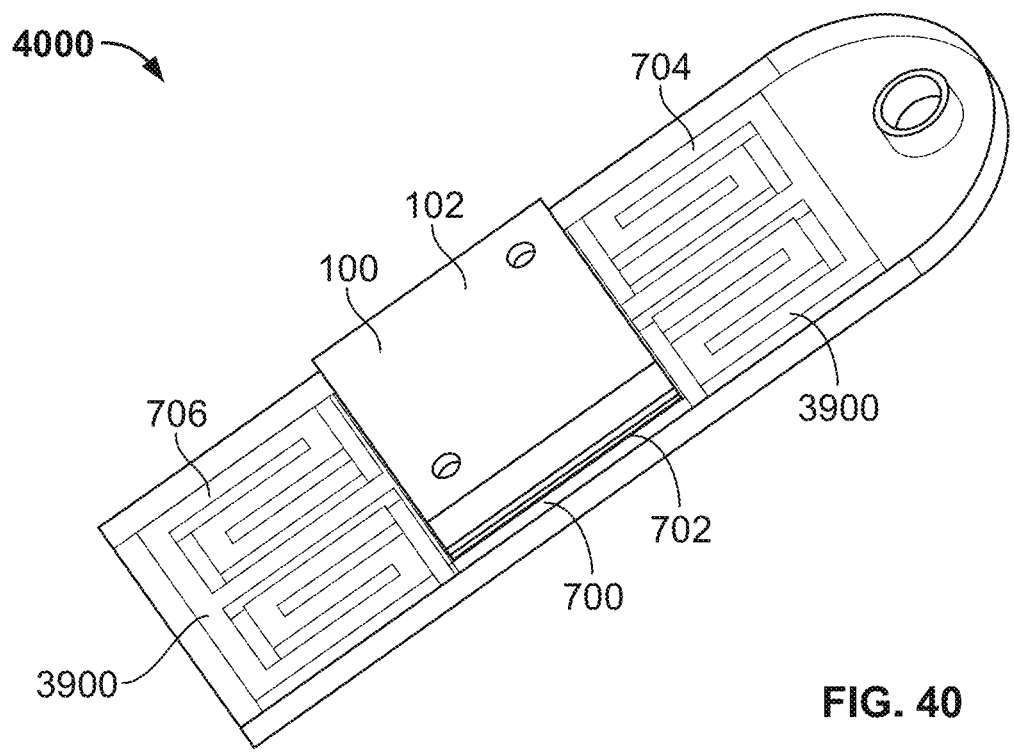
FIG. 40 is a perspective view of an example RFID hang tag including the RFID tag of FIG. 1 mounted to the bracket of FIG. 7 modified to include the first alternate meandering configuration of FIG. 39.
Figure 41:
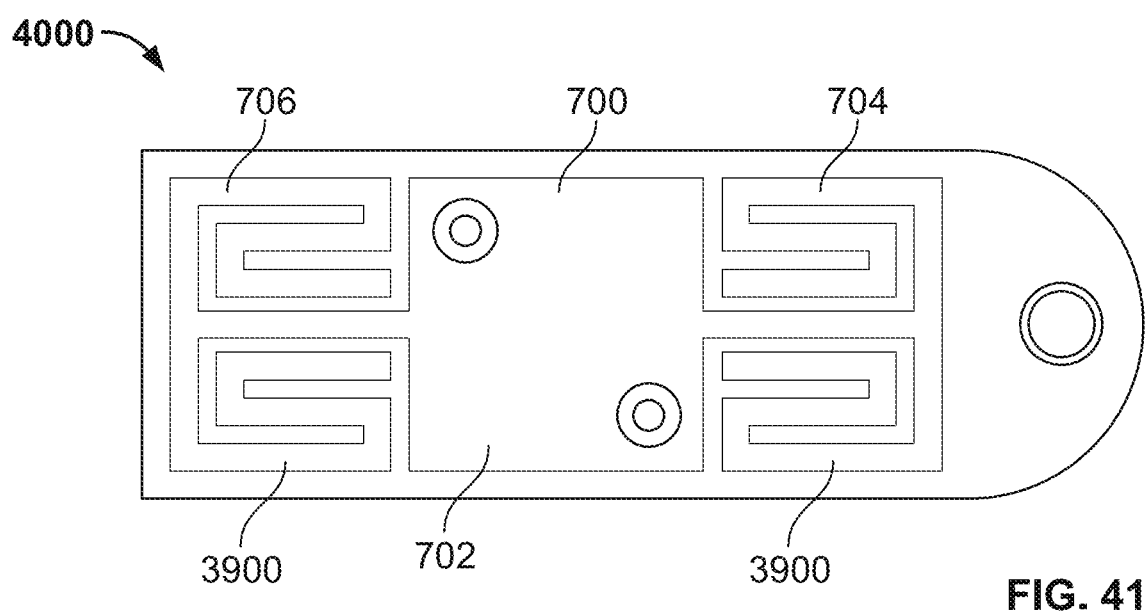
FIG. 41 is a rear view of the RFID hang tag of FIG. 40.
Figure 42:
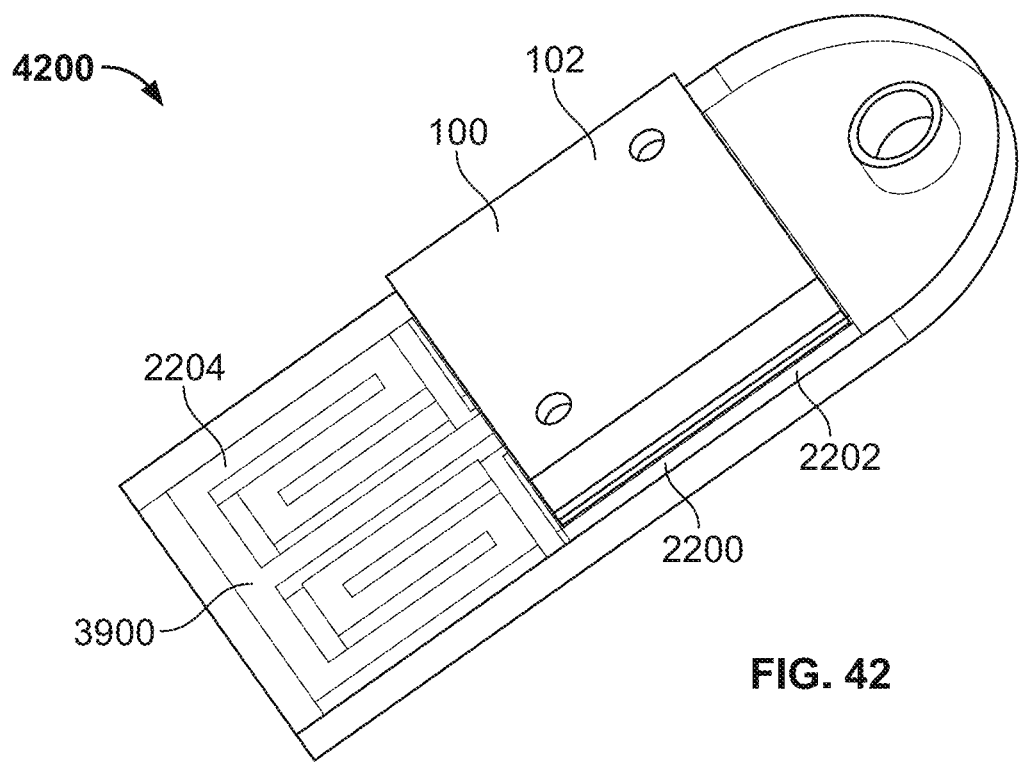
FIG. 42 is a perspective view of an example RFID hang tag including the RFID tag of FIG. 1 mounted to the bracket of FIG. 17 modified to include the first alternate meandering configuration of FIG. 39.
Figure 43:
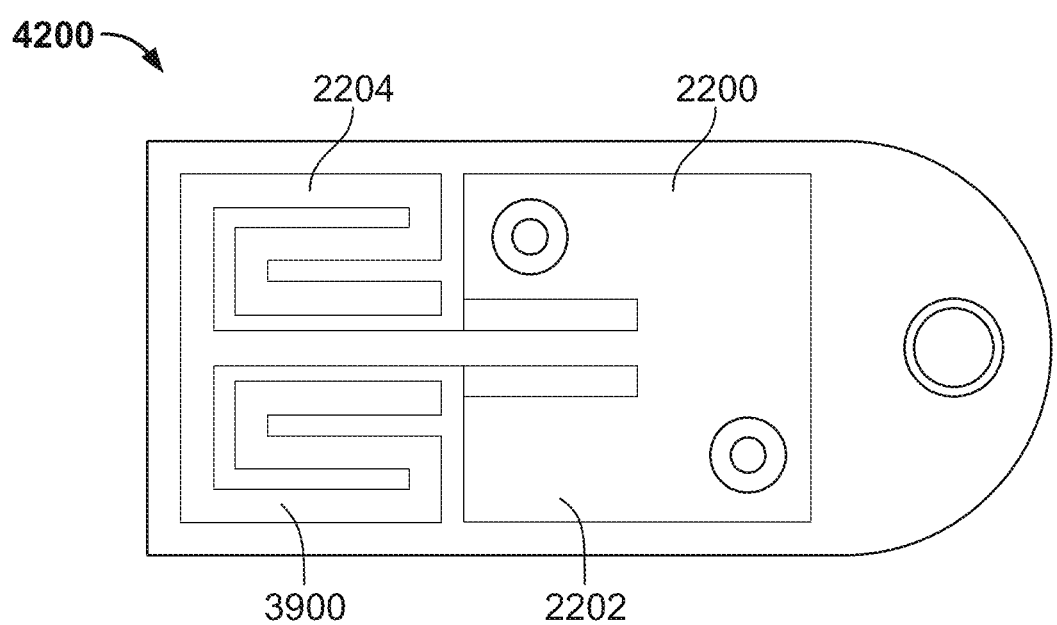
FIG. 43 is a rear view of the RFID hang tag of FIG. 42.

The first alternate meandering configuration 3900 of FIG. 39 can be implemented by any meandering amplification arm of any bracket described above in lieu of the meandering configuration 3800 of FIG. 38. For example, FIG. 40 is a perspective view of an example RFID hang tag 4000 including the RFID tag 100 of FIG. 1 mounted to the bracket 700 of FIG. 7 modified to include the first alternate meandering configuration 3900 of FIG. 39. FIG. 41 is a rear view of the RFID hang tag 4000 of FIG. 41. As another example, FIG. 42 is a perspective view of an example RFID hang tag 4200 including the RFID tag 100 of FIG. 1 mounted to the bracket 2200 of FIG. 22 modified to include the first alternate meandering configuration 3900 of FIG. 39. FIG. 43 is a rear view of the RFID hang tag 4200 of FIG. 42.

Figure 44:
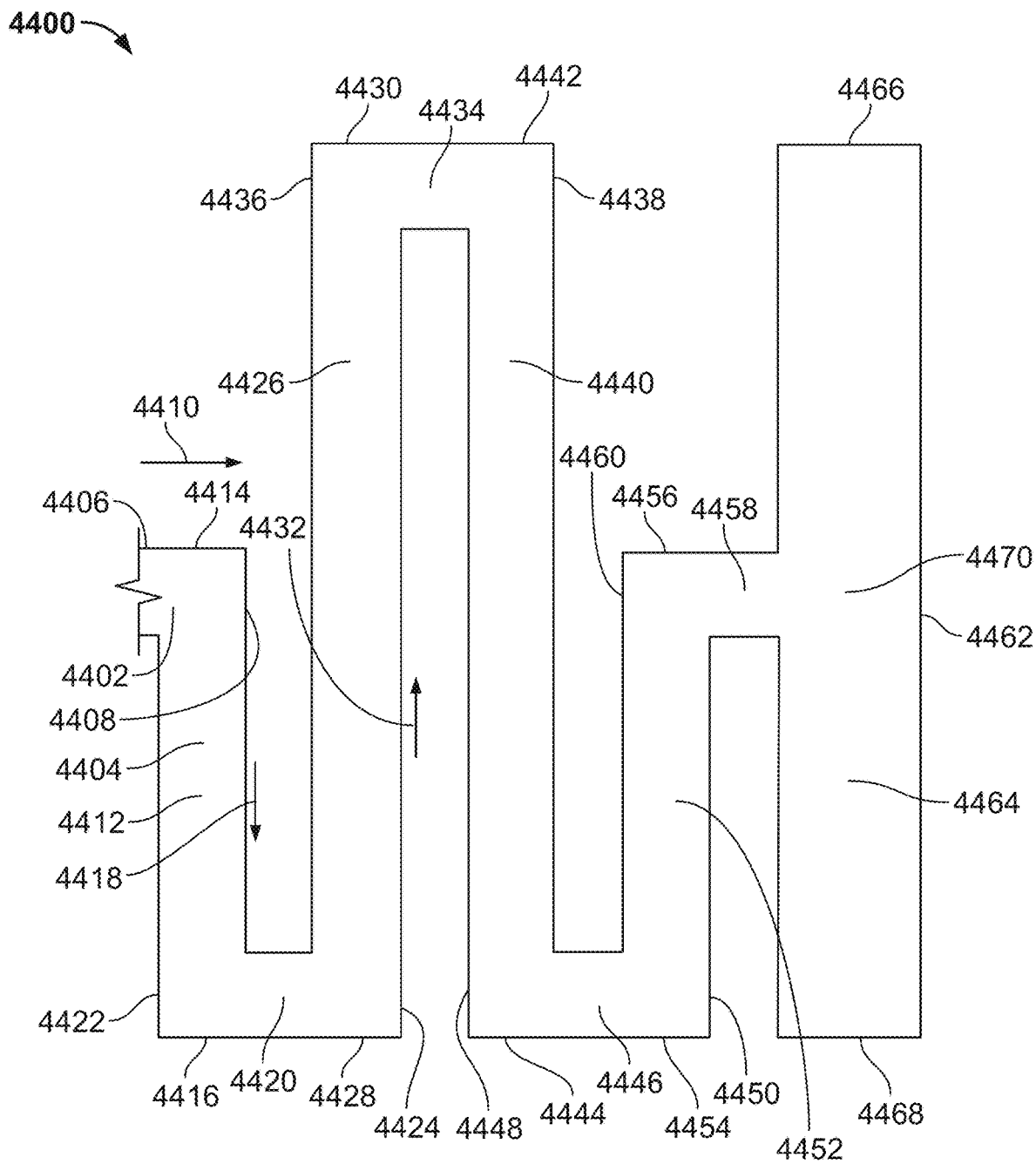
FIG. 44 is an enlarged front view of a second example alternate meandering configuration.

FIG. 44 is an enlarged front view of a second example alternate meandering configuration 4400. The second alternate meandering configuration 4400 of FIG. 44 includes an example feed arm 4402 and an example meandering portion 4404. In the illustrated example of FIG. 44, the feed arm 4402 is centrally located relative to the meandering portion 4404. The feed arm 4402 of FIG. 44 includes an example first end 4406 and an example second end 4408 located opposite the first end 4406. The first end 4406 of the feed arm 4402 is structured to be connected to (e.g., integrally formed with) a base of a bracket (e.g., the base 702 of the bracket 700 of FIG. 7, the base 1202 of the bracket 1200 of FIG. 12, the base 1702 of the bracket 1700 of FIG. 17, etc.), or to a component of a base of a bracket (e.g., the feed arm 2218 of the base 2202 of the bracket 2200 of FIG. 22, the feed arm 2722 of the base 2702 of the bracket 2700 of FIG. 27, the feed arm 3222 of the base 3202 of the bracket 3200 of FIG. 32, etc.). The feed arm 4402 extends in a first example direction 4410 away from the position and/or location defined by the first end 4406 of the feed arm 4402.

The meandering portion 4404 of FIG. 44 includes a first example segment 4412 having an example first end 4414 and an example second end 4416 located opposite the first end 4414. The first end 4414 of the first segment 4412 is connected to (e.g., integrally formed with) the second end 4408 of the feed arm 4402 such that the first segment 4412 is oriented perpendicular to the feed arm 4402 and extends from the feed arm 4402 in a second example direction 4418 oriented perpendicular to the first direction 4410.

The meandering portion 4404 of FIG. 44 further includes a second example segment 4420 having an example first end 4422 and an example second end 4424 located opposite the first end 4422. The first end 4422 of the second segment 4420 is connected to (e.g., integrally formed with) the second end 4416 of the first segment 4412 such that the second segment 4420 is oriented perpendicular to the first segment 4412 and extends from the first segment 4412 in the first direction 4410.

The meandering portion 4404 of FIG. 44 further includes a third example segment 4426 having an example first end 4428 and an example second end 4430 located opposite the first end 4428. The first end 4428 of the third segment 4426 is connected to (e.g., integrally formed with) the second end 4424 of the second segment 4420 such that the third segment 4426 is oriented perpendicular to the second segment 4420 and extends from the second segment 4420 in a third example direction 4432 oriented perpendicular to the first direction 4410 and opposite the second direction 4418.

The meandering portion 4404 of FIG. 44 further includes a fourth example segment 4434 having an example first end 4436 and an example second end 4438 located opposite the first end 4436. The first end 4436 of the fourth segment 4434 is connected to (e.g., integrally formed with) the second end 4430 of the third segment 4426 such that the fourth segment 4434 is oriented perpendicular to the third segment 4426 and extends from the third segment 4426 in the first direction 4410.

The meandering portion 4404 of FIG. 44 further includes a fifth example segment 4440 having an example first end 4442 and an example second end 4444 located opposite the first end 4442. The first end 4442 of the fifth segment 4440 is connected to (e.g., integrally formed with) the second end 4438 of the fourth segment 4434 such that the fifth segment 4440 is oriented perpendicular to the fourth segment 4434 and extends from the fourth segment 4434 in the second direction 4418.

The meandering portion 4404 of FIG. 44 further includes a sixth example segment 4446 having an example first end 4448 and an example second end 4450 located opposite the first end 4448. The first end 4448 of the sixth segment 4446 is connected to (e.g., integrally formed with) the second end 4444 of the fifth segment 4440 such that the sixth segment 4446 is oriented perpendicular to the fifth segment 4440 and extends from the fifth segment 4440 in the first direction 4410.

The meandering portion 4404 of FIG. 44 further includes a seventh example segment 4452 having an example first end 4454 and an example second end 4456 located opposite the first end 4454. The first end 4454 of the seventh segment 4452 is connected to (e.g., integrally formed with) the second end 4450 of the sixth segment 4446 such that the seventh segment 4452 is oriented perpendicular to the sixth segment 4446 and extends from the sixth segment 4446 in the third direction 4432.

The meandering portion 4404 of FIG. 44 further includes an eighth example segment 4458 having an example first end 4460 and an example second end 4462 located opposite the first end 4460. The first end 4460 of the eighth segment 4458 is connected to (e.g., integrally formed with) the second end 4456 of the seventh segment 4452 such that the eighth segment 4458 is oriented perpendicular to the seventh segment 4452 and extends from the seventh segment 4452 in the first direction 4410.

The meandering portion 4404 of FIG. 44 further includes a ninth example segment 4464 having an example first end 4466, an example second end 4468 located opposite the first end 4466, and an example midpoint 4470 located approximately midway between the first end 4466 and the second end 4468. The midpoint 4470 of the ninth segment 4464 is connected to (e.g., integrally formed with) the second end 4462 of the eighth segment 4458 such that the ninth segment 4464 is oriented perpendicular to the eighth segment 4458 and extends from the eighth segment 4458 in both the second direction 4418 and the third direction 4432. In the illustrated example of FIG. 44, the first end 4466 and the second end 4468 of the ninth segment 4464 are free (e.g., unconnected) ends of the meandering portion 4404.

Figure 45:
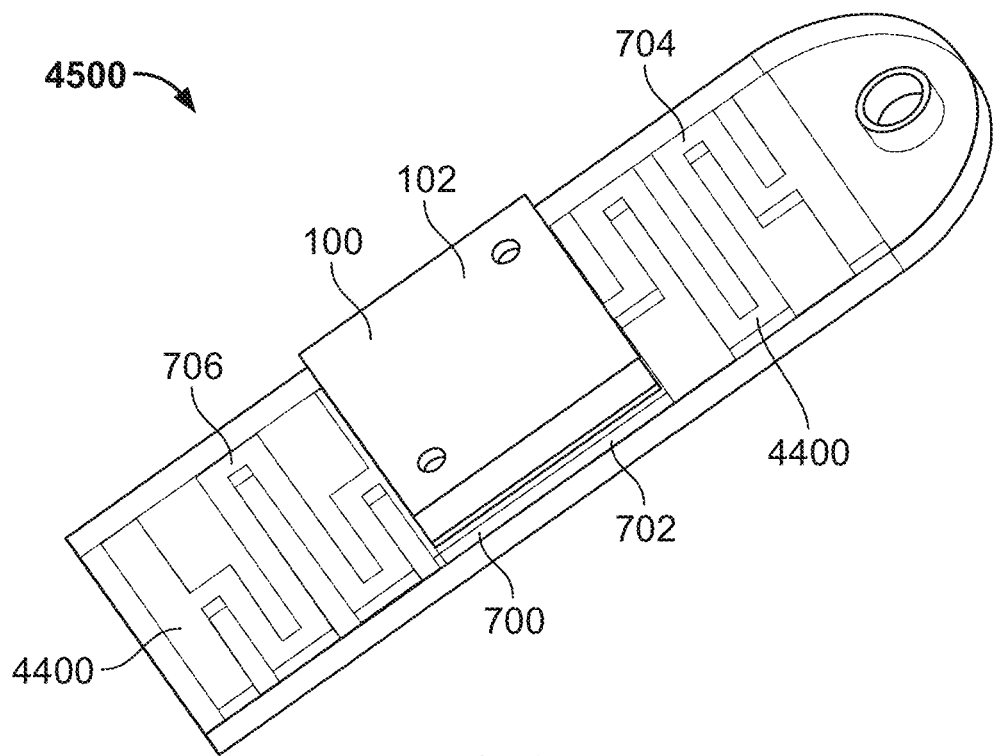
FIG. 45 is a perspective view of an example RFID hang tag including the RFID tag of FIG. 1 mounted to the bracket of FIG. 7 modified to include the second alternate meandering configuration of FIG. 44.
Figure 46:
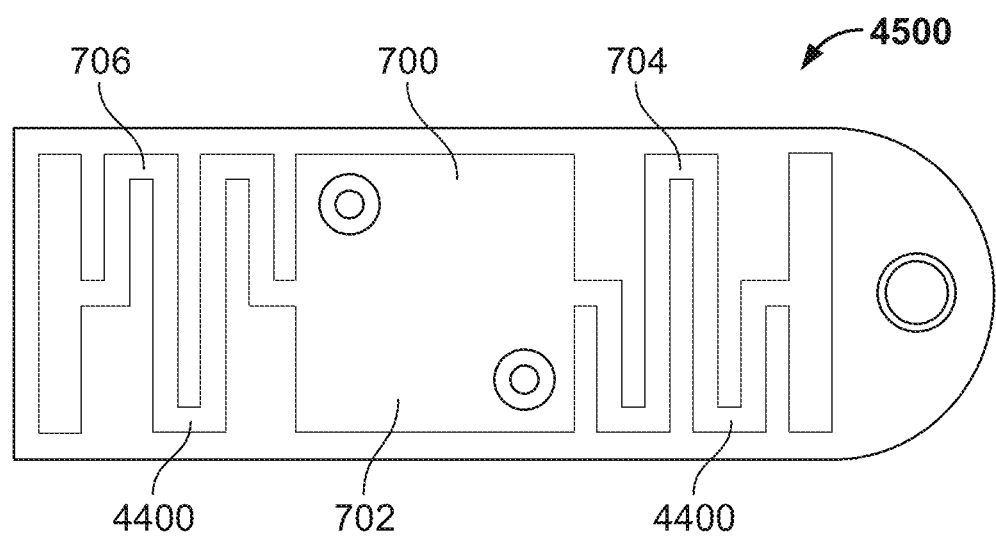
FIG. 46 is a rear view of the RFID hang tag of FIG. 45.
Figure 47:
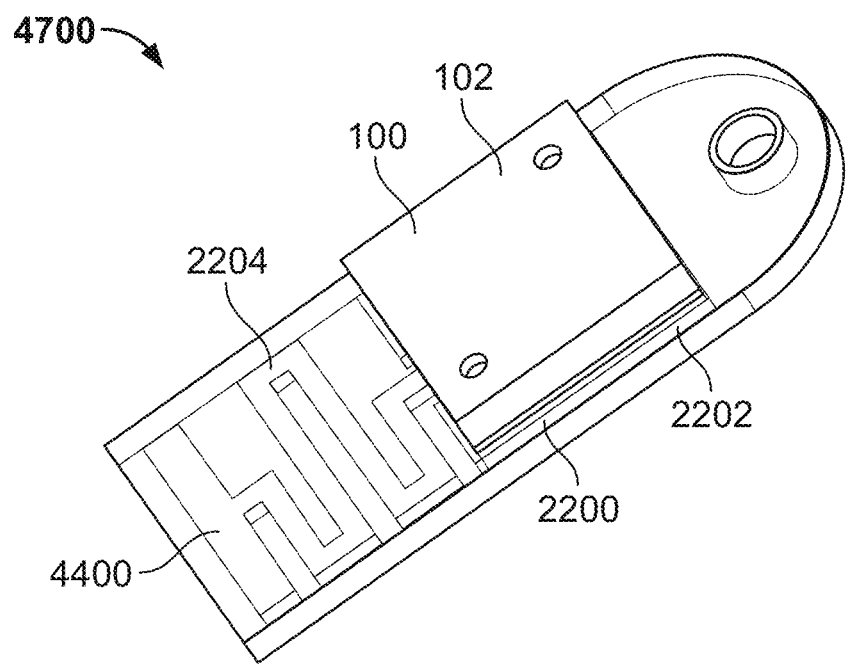
FIG. 47 is a perspective view of an example RFID hang tag including the RFID tag of FIG. 1 mounted to the bracket of FIG. 17 modified to include the second alternate meandering configuration of FIG. 44.
Figure 48:
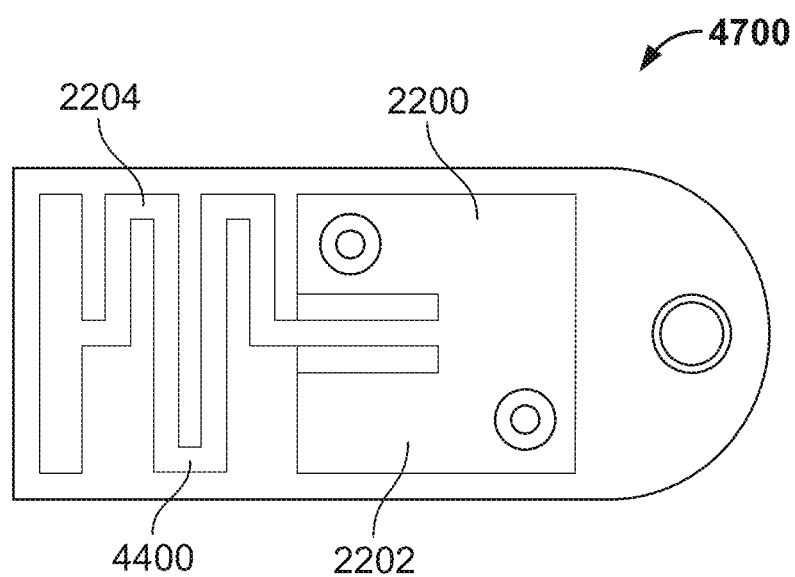
FIG. 48 is a rear view of the RFID hang tag of FIG. 47.

The second alternate meandering configuration 4400 of FIG. 44 can be implemented by any meandering amplification arm of any bracket described above in lieu of the meandering configuration 3800 of FIG. 38, or in lieu of the first alternate meandering configuration 3900 of FIG. 39. For example, FIG. 45 is a perspective view of an example RFID hang tag 4500 including the RFID tag 100 of FIG. 1 mounted to the bracket 700 of FIG. 7 modified to include the second alternate meandering configuration 4400 of FIG. 44. FIG. 46 is a rear view of the RFID hang tag 4500 of FIG. 45. As another example, FIG. 47 is a perspective view of an example RFID hang tag 4700 including the RFID tag 100 of FIG. 1 mounted to the bracket 2200 of FIG. 22 modified to include the second alternate meandering configuration 4400 of FIG. 44. FIG. 48 is a rear view of the RFID hang tag 4700 of FIG. 47.

From the foregoing, it will be appreciated that the disclosed brackets advantageously amplify the antenna gains associated with known RFID tags, and accordingly increase the maximum communication ranges (e.g., maximum read ranges) associated with such RFID tags. In some examples, the disclosed brackets can increase the maximum communication ranges (e.g., maximum read ranges) associated with such RFID tags from a distance of five feet or less to an improved distance of thirty feet or more. The disclosed brackets accordingly enable an RFID tag reader and/or interrogator to determine, from a safely-positioned remote location, one or more of: (1) the identity and/or location of the RFID tag; (2) the identity and/or location an object (e.g., a field device) from which the bracket-mounted RFID tag is hung; and/or (3) the identity and/or location of an object (e.g., a field device) to which the bracket-mounted RFID tag is mounted.

In some disclosed examples, an apparatus comprises a bracket and a radio frequency identification (RFID) tag. In some disclosed examples, the bracket includes a base, a first meandering amplification arm connected to and extending away from the base in a first direction, and a second meandering amplification arm connected to and extending away from the base in a second direction opposite the first direction. In some disclosed examples, the RFID tag is mounted to the base of the bracket. In some disclosed examples, the first meandering amplification arm and the second meandering amplification arm are respectively structured to at least one of: amplify an antenna gain associated with the RFID tag; or increase a communication range associated with the RFID tag.

In some disclosed examples, the apparatus further comprises a casing structured to encase at least a portion of the bracket, the casing being formed of a non-conductive material. In some disclosed examples, the casing is structured to fully encase the first meandering amplification arm and the second meandering amplification arm. In some disclosed examples, the casing includes a first portion structured to encase the at least the portion of the bracket, and a second portion connected to and extending away from the first portion in the first direction. In some disclosed examples, the second portion includes a through hole spaced apart from the bracket and structured to receive a fastener to hang the casing from an object.

In some disclosed examples, the bracket further includes a mounting arm connected to and extending away from the base in a third direction oriented orthogonal to the first direction and orthogonal to the second direction. In some disclosed examples, the mounting arm includes a through hole structured to receive a fastener to mount the bracket to an object. In some disclosed examples, the apparatus further comprises a casing structured to encase at least a portion of the bracket, the casing being formed of a non-conductive material. In some disclosed examples, the mounting arm is oriented at an angle relative to the base.

In some disclosed examples, the bracket further includes a hang tab connected to and extending away from the first meandering amplification arm in the first direction. In some disclosed examples, the hang tab includes a through hole structured to receive a fastener to hang the bracket from an object. In some disclosed examples, the apparatus further comprises a casing structured to encase at least a portion of the bracket, the casing being formed of a non-conductive material. In some disclosed examples, the hang tab is coplanar with the first meandering amplification arm.

In some disclosed examples, an apparatus comprises a bracket and a radio frequency identification (RFID) tag. In some disclosed examples, the bracket includes a base and a meandering amplification arm connected to and extending away from the base in a first direction. In some disclosed examples, the RFID tag is mounted to the base of the bracket. In some disclosed examples, the meandering amplification arm is structured to at least one of: amplify an antenna gain associated with the RFID tag; or increase a communication range associated with the RFID tag.

In some disclosed examples, the apparatus further comprises a casing structured to encase at least a portion of the bracket, the casing being formed of a non-conductive material. In some disclosed examples, the casing is structured to fully encase the meandering amplification arm. In some disclosed examples, the casing includes a first portion structured to encase the at least the portion of the bracket, and a second portion connected to and extending away from the first portion in a second direction opposite the first direction. In some disclosed examples, the second portion includes a through hole spaced apart from the bracket and structured to receive a fastener to hang the casing from an object.

In some disclosed examples, the bracket further includes a mounting arm connected to and extending away from the base in a second direction opposite the first direction. In some disclosed examples, the mounting arm includes a through hole structured to receive a fastener to mount the bracket to an object. In some disclosed examples, the apparatus further comprises a casing structured to encase at least a portion of the bracket, the casing being formed of a non-conductive material. In some disclosed examples, the mounting arm is oriented at an angle relative to the base.

In some disclosed examples, the bracket further includes a hang tab connected to and extending away from the base in a second direction opposite the first direction. In some disclosed examples, the hang tab includes a through hole structured to receive a fastener to hang the bracket from an object. In some disclosed examples, the apparatus further comprises a casing structured to encase at least a portion of the bracket, the casing being formed of a non-conductive material. In some disclosed examples, the hang tab is coplanar with the base.

In some disclosed examples, the base includes a notch and a feed arm. In some disclosed examples, the notch extends inwardly from an edge of the base located adjacent the meandering amplification arm. In some disclosed examples, the feed arm is positioned centrally within the notch. In some disclosed examples, the feed arm extends from a center portion of the base outwardly, past the edge of the base, to the meandering amplification arm. In some disclosed examples, the notch is centrally located along the edge. In some disclosed examples, the feed arm is aligned with an internal antenna of the RFID tag.

In some disclosed examples, an apparatus comprises a bracket and a radio frequency identification (RFID) tag. In some disclosed examples, the bracket includes a central portion, a first amplification arm connected to and extending away from the central portion in a first direction, and a second amplification arm connected to and extending away from the central portion in a second direction opposite the first direction. In some disclosed examples, the first amplification arm includes a through hole structured to receive a fastener to hang the bracket from an object. In some disclosed examples, the RFID tag is mounted to the central portion of the bracket. In some disclosed examples, the first amplification arm and the second amplification arm are respectively structured to at least one of: amplify an antenna gain associated with the RFID tag; or increase a communication range associated with the RFID tag.

In some disclosed example, the central portion, the first amplification arm, and the second amplification arm are coplanar. In some disclosed examples, the first amplification arm defines a first end of the bracket, the second amplification arm defines a second end of the bracket opposite the first end, and the second end is separated from the first end by a distance equal to approximately one-half of a wavelength of a radio frequency at which the RFID tag is to operate.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
a bracket having a base, a first meandering amplification arm connected to and extending away from the base in a first direction, and a second meandering amplification arm connected to and extending away from the base in a second direction opposite the first direction, the first meandering amplification arm including:
a feed arm have a first end connected to the base and a second end located opposite the first end;
a first meandering portion connected to the second end of the feed arm, the first meandering portion including a first series of orthogonal bends; and
a second meandering portion connected to the second end of the feed arm, the second meandering portion including a second series of orthogonal bends, the feed arm centrally located between the first meandering portion and the second meandering portion, the second meandering portion structured as a mirror image of the first meandering portion about the feed arm; and
a radio frequency identification (RFID) tag mounted to the base of the bracket;
wherein the first meandering amplification arm and the second meandering amplification arm are respectively structured to at least one of:
amplify an antenna gain associated with the RFID tag; or
increase a communication range associated with the RFID tag.

2. The apparatus of claim 1, further comprising a casing structured to encase at least a portion of the bracket, the casing being formed of a non-conductive material.

3. The apparatus of claim 2, wherein the casing is structured to fully encase the first meandering amplification arm and the second meandering amplification arm.

4. The apparatus of claim 2, wherein the casing includes a first portion structured to encase the at least the portion of the bracket, and a second portion connected to and extending away from the first portion in the first direction, the second portion including a through hole spaced apart from the bracket and structured to receive a fastener to hang the casing from an object.

5. The apparatus of claim 1, wherein the bracket further includes a mounting arm connected to and extending away from the base in a third direction oriented orthogonal to the first direction and orthogonal to the second direction, the mounting arm including a through hole structured to receive a fastener to mount the bracket to an object.

6. The apparatus of claim 5, further comprising a casing structured to encase at least a portion of the bracket, the casing being formed of a non-conductive material.

7. The apparatus of claim 5, wherein the mounting arm is oriented at an angle relative to the base.

8. The apparatus of claim 1, wherein the bracket further includes a hang tab connected to and extending away from the first meandering amplification arm in the first direction, the hang tab including a through hole structured to receive a fastener to hang the bracket from an object.

9. The apparatus of claim 8, further comprising a casing structured to encase at least a portion of the bracket, the casing being formed of a non-conductive material.

10. The apparatus of claim 8, wherein the hang tab is coplanar with the first meandering amplification arm.

11. The apparatus of claim 1, wherein the first meandering portion extends from the second end of the feed arm toward the base, the first meandering portion including a free end that is not connected to the base.

12. The apparatus of claim 11, wherein the first meandering portion includes a first plurality of segments having a first orientation and a second plurality of segments having a second orientation, the first orientation being perpendicular to the feed arm, the second orientation being perpendicular to the first orientation.

13. The apparatus of claim 12, wherein the first and second plurality of segments collectively form the first series of orthogonal bends, the first series of orthogonal bends originating from the second end of the feed arm.

14. The apparatus of claim 13, wherein the first series of orthogonal bends is coplanar with the base.

15. An apparatus, comprising:
a bracket having a base and a meandering amplification arm connected to and extending away from the base in a first direction, the meandering amplification arm including:
a feed arm have a first end connected to the base and a second end located opposite the first end;
a first meandering portion connected to the second end of the feed arm, the first meandering portion including a first series of orthogonal bends; and
a second meandering portion connected to the second end of the feed arm, the second meandering portion including a second series of orthogonal bends, the feed arm centrally located between the first meandering portion and the second meandering portion, the second meandering portion structured as a mirror image of the first meandering portion about the feed arm; and a radio frequency identification (RFID) tag mounted to the base of the bracket;
wherein the meandering amplification arm is structured to at least one of:
amplify an antenna gain associated with the RFID tag; or
increase a communication range associated with the RFID tag.

16. The apparatus of claim 15, further comprising a casing structured to encase at least a portion of the bracket, the casing being formed of a non-conductive material.

17. The apparatus of claim 16, wherein the casing is structured to fully encase the meandering amplification arm.

18. The apparatus of claim 16, wherein the casing includes a first portion structured to encase the at least the portion of the bracket, and a second portion connected to and extending away from the first portion in a second direction opposite the first direction, the second portion including a through hole spaced apart from the bracket and structured to receive a fastener to hang the casing from an object.

19. The apparatus of claim 15, wherein the bracket further includes a mounting arm connected to and extending away from the base in a second direction opposite the first direction, the mounting arm including a through hole structured to receive a fastener to mount the bracket to an object.

20. The apparatus of claim 19, further comprising a casing structured to encase at least a portion of the bracket, the casing being formed of a non-conductive material.

21. The apparatus of claim 19, wherein the mounting arm is oriented at an angle relative to the base.

22. The apparatus of claim 15, wherein the bracket further includes a hang tab connected to and extending away from the base in a second direction opposite the first direction, the hang tab including a through hole structured to receive a fastener to hang the bracket from an object.

23. The apparatus of claim 22, further comprising a casing structured to encase at least a portion of the bracket, the casing being formed of a non-conductive material.

24. The apparatus of claim 22, wherein the hang tab is coplanar with the base.

25. The apparatus of claim 15, wherein the base includes a notch, the notch extending inwardly from an edge of the base located adjacent the meandering amplification arm, the feed arm being positioned centrally within the notch, the feed arm extending from a center portion of the base outwardly, past the edge of the base, to the first and second meandering portions.

26. The apparatus of claim 25, wherein the notch is centrally located along the edge.

27. The apparatus of claim 25, wherein the feed arm is aligned with an internal antenna of the RFID tag.

28. The apparatus of claim 15, wherein the first meandering portion extends from the second end of the feed arm toward the base, the first meandering portion including a free end that is not connected to the base.

29. The apparatus of claim 28, wherein the first meandering portion includes a first plurality of segments having a first orientation and a second plurality of segments having a second orientation, the first orientation being perpendicular to the feed arm, the second orientation being perpendicular to the first orientation.

30. The apparatus of claim 29, wherein the first and second plurality of segments collectively form the first series of orthogonal bends, the first series of orthogonal bends originating from the second end of the feed arm.

* * * * *